(12) United States Patent
Take

(10) Patent No.: US 8,503,099 B2
(45) Date of Patent: Aug. 6, 2013

(54) ZOOM LENS SYSTEM AND OPTICAL APPARATUS USING THE SAME

(75) Inventor: Toshinori Take, Yokohama (JP)

(73) Assignee: Nikon Corporation, Tokyo (JP)

( * ) Notice: Subject to any disclaimer, the term of this patent is extended or adjusted under 35 U.S.C. 154(b) by 978 days.

(21) Appl. No.: 12/161,000

(22) PCT Filed: Apr. 25, 2007

(86) PCT No.: PCT/JP2007/059419
§ 371 (c)(1),
(2), (4) Date: Jul. 15, 2008

(87) PCT Pub. No.: WO2007/129677
PCT Pub. Date: Nov. 15, 2007

(65) Prior Publication Data
US 2010/0238562 A1    Sep. 23, 2010

(30) Foreign Application Priority Data

May 1, 2006  (JP) ................................ 2006-127714
May 1, 2006  (JP) ................................ 2006-127719
Apr. 20, 2007 (JP) ................................ 2007-112167

(51) Int. Cl.
G02B 15/14    (2006.01)

(52) U.S. Cl.
USPC ........................................................ 359/687

(58) Field of Classification Search
USPC .......................................... 359/684–687, 683
See application file for complete search history.

(56) References Cited

U.S. PATENT DOCUMENTS

| | | | |
|---|---|---|---|
| 6,010,537 A * | 1/2000 | Konno et al. | 359/687 |
| 6,473,231 B2 * | 10/2002 | Hamano et al. | 359/687 |
| 6,955,922 B1 | 10/2005 | Liu et al. | |
| 7,068,429 B1 * | 6/2006 | Ori | 359/686 |
| 7,199,941 B2 * | 4/2007 | Ohtake | 359/687 |
| 7,242,529 B2 * | 7/2007 | Sato et al. | 359/676 |
| 7,336,419 B2 | 2/2008 | Yamada et al. | |
| 7,457,048 B2 * | 11/2008 | Heu | 359/687 |

(Continued)

FOREIGN PATENT DOCUMENTS

EP    1 748 310 A2    1/2007
JP    2002-287028 A   10/2002

(Continued)

OTHER PUBLICATIONS

Geary, Joseph M. Introduction to Lens Design: with Practical ZEMAX Examples. Richmond, VA: Willmann-Bell, 2002. 23. Print.*

*Primary Examiner* — Zachary Wilkes
(74) *Attorney, Agent, or Firm* — Miles & Stockbridge P.C.

(57) ABSTRACT

Providing a zoom lens system being compact and simple having excellent optical performance suitable for an optical apparatus with a limited space for a zoom lens, and capable of shifting an image, and an optical apparatus equipped therewith. The system includes, in order from an object: a first group having positive power and an optical path bending element; a second group having negative power; a third group having positive power; and a fourth group having positive power. Upon zooming from a wide-angle end to a telephoto end, the first and third groups are fixed relative to an image plane, the second group and the fourth group are moved along the optical axis, an image on the image plane can be shifted by shifting the third group or a portion thereof substantially perpendicularly to the optical axis. The first group includes at least one negative lens, and satisfies a given condition.

25 Claims, 33 Drawing Sheets

U.S. PATENT DOCUMENTS

| | | |
|---|---|---|
| 7,515,352 B2 * | 4/2009 | Arai ............................. 359/687 |
| 2003/0193722 A1 | 10/2003 | Mihara |
| 2005/0088756 A1 * | 4/2005 | Yamada ....................... 359/687 |
| 2005/0128604 A1 | 6/2005 | Kuba |
| 2005/0248669 A1 | 11/2005 | Iwasawa |
| 2005/0275948 A1 | 12/2005 | Sueyoshi |
| 2006/0215277 A1 | 9/2006 | Sato |
| 2006/0279853 A1 | 12/2006 | Morooka et al. |
| 2006/0285841 A1 | 12/2006 | Masui et al. |

FOREIGN PATENT DOCUMENTS

| | | |
|---|---|---|
| JP | 2003-302576 A | 10/2003 |
| JP | 2004-061677 A | 2/2004 |
| JP | 2004-264585 A | 9/2004 |
| JP | 2005-173191 A | 6/2005 |
| JP | 2005-321545 A | 11/2005 |
| JP | 2005-352347 A | 12/2005 |

* cited by examiner

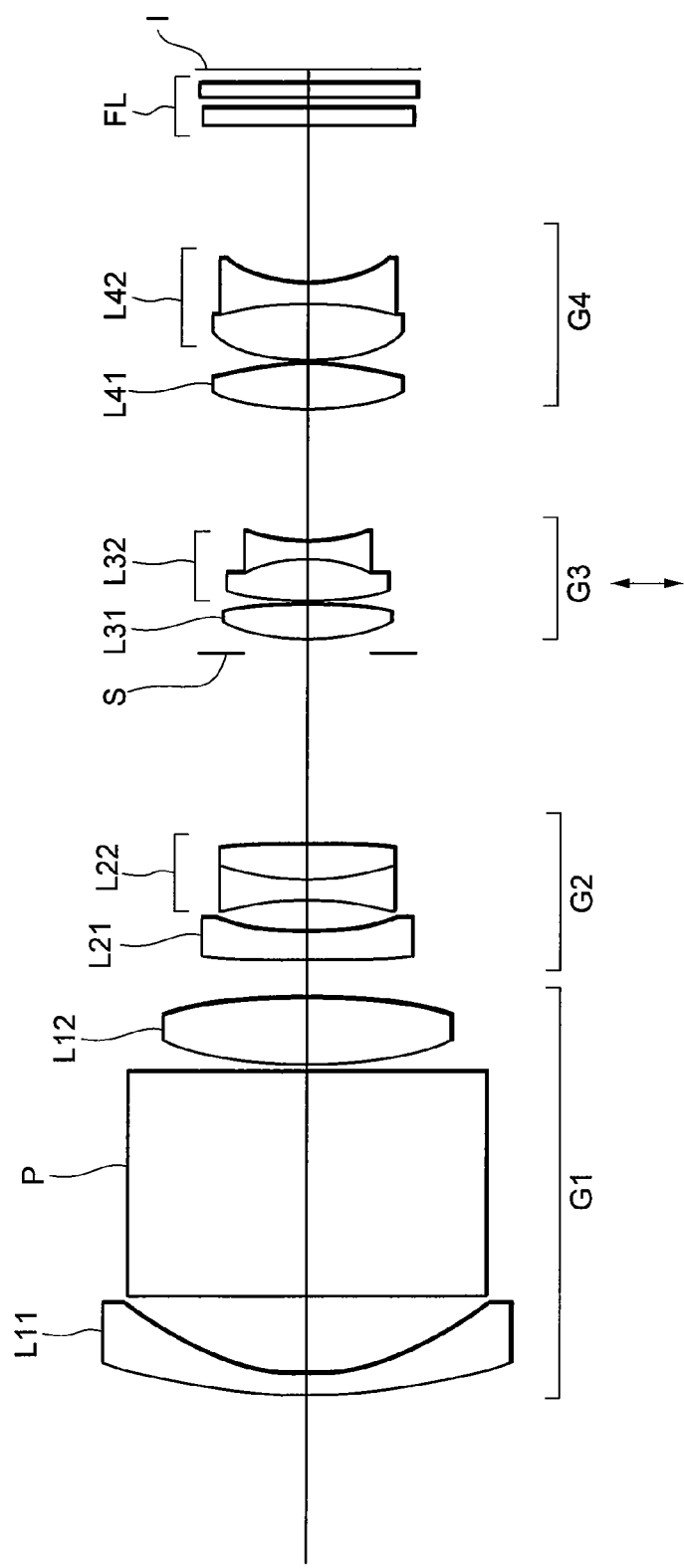

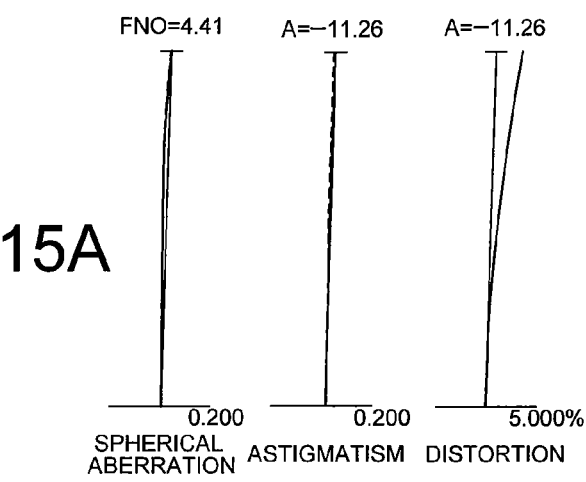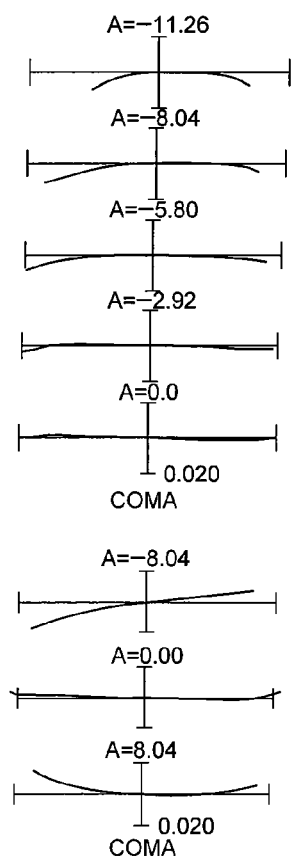

ZOOM LENS SYSTEM AND OPTICAL APPARATUS USING THE SAME

TECHNICAL FIELD

The present invention relates to a zoom lens system suitable for a video camera and a digital still camera using a solid-state imaging device and an optical apparatus using the zoom lens system.

BACKGROUND ART

An optical apparatus such as a digital still camera or a video camera for capturing subject images by using a solid-state imaging device such as CCD and CMOS has generally equipped with a zoom lens.

However, in most zoom lenses, as the focal length in the telephoto end state becomes longer, an outer diameter of the lens in the most object side lens group becomes large as well as the total lens length becomes long, as a result the lens barrel becomes large causing a problem in portability.

In order to increase portability, each lens group is accommodated in the camera body such that each distance between lens groups are narrowed to become minimum upon carrying a digital still camera.

Moreover, in order to make the thickness of the camera body thin, the lens barrel is composed of partial lens barrels and the length of each partial lens barrels is shortened. However, it is impossible that the thickness of the camera is thinner than the length of each partial lens barrel.

Nowadays portability upon carrying a digital still camera is considered to be most important, so that in order to make a camera body compact, thin, and light, a zoom lens as an image-taking lens is made to be compact and light.

Then, there has been devised a zoom lens in which an optical element capable of bending an optical path substantially 90 degrees is included in a portion of lens group thereof. With equipping such a zoom lens, upon moving from an accommodating state to a using state, lens groups do not protrude from the camera body, so that excellent portability is secured in the using state. Moreover, it greatly contributes for making the camera compact and thin. Furthermore, since moving elements are disposed in the camera body, and no moving elements exist on the surface of the camera body, it is effectively used for various purposes such as waterproof, drip-proof, dustproof, and the like.

There has been proposed a positive-negative-positive-positive, four-lens-group type zoom lens that is capable of bending an optical path, and composed of, in order from an object, a first lens group having positive refractive power, a second lens group having negative refractive power, a third lens group having positive refractive power, and a fourth lens group having positive refractive power in such as Japanese Patent Application Laid-Open Nos. 2003-302576 and 2004-264585.

Although the one disclosed in Japanese Patent Application Laid-Open No. 2003-302576 contributes to be compact by effectively varying distances between the second lens group, the third lens group and the fourth lens group upon zooming, since three lens groups have to be moved, there is a problem that the moving mechanism becomes complicated.

In a zoom lens disclosed in Japanese Patent Application Laid-Open No. 2004-264585, there is a problem that imaging performance deteriorates by an image blur caused by a camera shake happened upon depressing a shutter release button by a user. Accordingly, there has long been desired a zoom lens having a vibration reduction function for correcting an image blur on the image plane by shifting a portion of the optical system of the zoom lens substantially perpendicular to the optical axis on the basis of an output of a detector for detecting a camera shake.

DISCLOSURE OF THE INVENTION

The present invention is made in view of the aforementioned problems and has an object to provide a compact zoom lens system having excellent optical performance with a simple moving mechanism, suitable for an optical apparatus with a limited space for disposing a zoom lens, and a zoom lens system capable of shifting an image. Moreover, the present invention has another object to provide an optical apparatus equipped with the zoom lens system.

According to a first aspect of the present invention, there is provided a zoom lens system comprising, in order from an object along an optical axis: a first lens group having positive refractive power and an optical path bending element; a second lens group having negative refractive power; a third lens group having positive refractive power; and a fourth lens group having positive refractive power; upon varying a focal length from a wide-angle end state to a telephoto end state, the first lens group being fixed with respect to an image plane, a distance between the first lens group and the second lens group increasing, a distance between the second lens group and third lens group decreasing, and a distance between the third lens group and the fourth lens group decreasing, the first lens group including at least one negative lens, and the following conditional expression being satisfied:

$$1.900 < nd1$$

where $nd1$ denotes refractive index of the negative lens at d-line (wavelength $\lambda = 587.6$ nm).

According to a second aspect of the present invention, there is provided a zoom lens system comprising, in order from an object along an optical axis: a first lens group having positive refractive power and an optical path bending element; a second lens group having negative refractive power; a third lens group having positive refractive power; and a fourth lens group having positive refractive power; upon varying a focal length from a wide-angle end state to a telephoto end state, the first lens group being fixed with respect to an image plane, a distance between the first lens group and the second lens group increasing, a distance between the second lens group and third lens group decreasing, and a distance between the third lens group and the fourth lens group decreasing, and an image on the image plane being able to be shifted by shifting the third lens group or a portion of the third lens group as a shift lens group in a direction substantially perpendicular to the optical axis.

According to a third aspect of the present invention, there is provided an optical apparatus equipped with the zoom lens system according to any one of the first aspect and the second aspect.

According to a fourth aspect of the present invention, there is provided a method for varying a focal length of a zoom lens system comprising steps of: providing the zoom lens system comprising, in order from an object along an optical axis, a first lens group having positive refractive power and an optical path bending element, a second lens group having negative refractive power, a third lens group having positive refractive power, and a fourth lens group having positive refractive power, the first lens group including at least one negative lens, the negative lens satisfying the following conditional expression:

$$1.900 < nd1$$

where nd1 denotes a refractive index of the negative lens at d-line (wavelength λ=587.6 nm); and moving the second lens group and the fourth lens group along the optical axis such that upon varying a focal length from a wide-angle end state to a telephoto end state, the first lens group is fixed with respect to the image plane, a distance between the first lens group and the second lens group increases, a distance between the second lens group and the third lens group decreases, and a distance between the third lens group and the fourth lens group decreases.

According to a fifth aspect of the present invention, there is provided a method for focusing a zoom lens system comprising steps of: providing the zoom lens system comprising, in order from an object along an optical axis, a first lens group having positive refractive power and an optical path bending element, a second lens group having negative refractive power, a third lens group having positive refractive power, and a fourth lens group having positive refractive power, upon varying a focal length from a wide-angle end state to a telephoto end state, the first lens group being fixed with respect to the image plane, a distance between the first lens group and the second lens group increasing, a distance between the second lens group and the third lens group decreasing, and a distance between the third lens group and the fourth lens group decreasing, the first lens group including at least one negative lens, and the negative lens satisfying the following conditional expression:

$$1.900 < nd1$$

where nd1 denotes a refractive index of the negative lens at d-line (wavelength λ=587.6 nm); and moving the second lens group along the optical axis to the object side to carry out focusing from infinity to a close object.

According to a sixth aspect of the present invention, there is provided a method for shifting an image on an image plane of a zoom lens system comprising steps of: providing the zoom lens system comprising, in order from an object along an optical axis, a first lens group having positive refractive power and an optical path bending element, a second lens group having negative refractive power, a third lens group having positive refractive power, and a fourth lens group having positive refractive power, upon varying a focal length from a wide-angle end state to a telephoto end state, the first lens group being fixed with respect to the image plane, a distance between the first lens group and the second lens group increasing, a distance between the second lens group and the third lens group decreasing, and a distance between the third lens group and the fourth lens group decreasing; and shifting the third lens group or a portion of the third lens group in a direction substantially perpendicular to the optical axis so as to shift the image on the image plane.

According to a seventh aspect of the present invention, there is provided a method for varying a focal length of a zoom lens system comprising steps of: providing the zoom lens system comprising, in order from an object along an optical axis, a first lens group having positive refractive power and an optical path bending element, a second lens group having negative refractive power, a third lens group having positive refractive power, and a fourth lens group having positive refractive power, and the third lens group or a portion of the third lens group shifting in a direction substantially perpendicular to the optical axis so as to shift an image on an image plane; and moving the second lens group and the fourth lens group along the optical axis such that upon varying a focal length from a wide-angle end state to a telephoto end state, the first lens group is fixed with respect to the image plane, a distance between the first lens group and the second lens group increases, a distance between the second lens group and the third lens group decreases, and a distance between the third lens group and the fourth lens group decreases.

The present invention makes it possible to provide a bending zoom lens system having excellent optical performance with a simple moving mechanism, suitable for an optical apparatus with a limited space for disposing a zoom lens, and a zoom lens system capable of shifting an image. Moreover, the present invention makes it possible to provide an optical apparatus equipped with the zoom lens system.

BRIEF DESCRIPTION OF THE DRAWINGS

FIGS. 1A and 1B are diagrams showing an electronic still camera as an optical apparatus equipped with a zoom lens system according to an embodiment of the present application, in which FIG. 1A is a front view, and FIG. 1B is a rear view.

FIGS. 5A and 5B are graphs showing various aberrations of the zoom lens system according to Example 1 of the first embodiment at d-line (λ=587.6 nm) in the wide-angle end state (f=6.49 mm) upon focusing on infinity, in which FIG. 5A shows various aberrations without a lens shift, FIG. 5B shows coma with a lens shift.

FIGS. 6A and 6B are graphs showing various aberrations of the zoom lens system according to Example 1 of the first embodiment at d-line (λ=587.6 nm) in an intermediate focal length state (f=13.00 mm) upon focusing on infinity, in which FIG. 6A shows various aberrations without a lens shift, FIG. 6B shows coma with a lens shift.

FIGS. 7A and 7B are graphs showing various aberrations of the zoom lens system according to Example 1 of the first embodiment at d-line (λ=587.6 nm) in the telephoto end state (f=18.35 mm) upon focusing on infinity, in which FIG. 7A shows various aberrations without a lens shift, FIG. 7B shows coma with a lens shift.

FIG. 8 is a diagram showing lens configuration of a zoom lens system according to Example 2 of the first embodiment extended along an optical axis.

FIGS. 9A and 9B are graphs showing various aberrations of the zoom lens system according to Example 2 of the first embodiment at d-line (λ=587.6 nm) in the wide-angle end state (f=6.49 mm) upon focusing on infinity, in which FIG. 9A shows various aberrations without a lens shift, FIG. 9B shows coma with a lens shift.

FIGS. 10A and 10B are graphs showing various aberrations of the zoom lens system according to Example 2 of the first embodiment at d-line (λ=587.6 nm) in the intermediate focal length state (f=12.42 mm) upon focusing on infinity, in which FIG. 10A shows various aberrations without a lens shift, FIG. 10B shows coma with a lens shift.

FIGS. 11A and 11B are graphs showing various aberrations of the zoom lens system according to Example 2 of the first embodiment at d-line (λ=587.6 nm) in the telephoto end state (f=18.35 mm) upon focusing on infinity, in which FIG. 11A shows various aberrations without a lens shift, FIG. 11B shows coma with a lens shift.

FIGS. 13A and 13B are graphs showing various aberrations of the zoom lens system according to Example 3 of the first embodiment at d-line ($\lambda$=587.6 nm) in the wide-angle end state (f=6.49 mm) upon focusing on infinity, in which FIG. 13A shows various aberrations without a lens shift, FIG. 13B shows coma with a lens shift.

FIGS. 14A and 14B are graphs showing various aberrations of the zoom lens system according to Example 3 of the first embodiment at d-line ($\lambda$=587.6 nm) in the intermediate focal length state (f=12.42 mm) upon focusing on infinity, in which FIG. 14A shows various aberrations without a lens shift, FIG. 14B shows coma with a lens shift.

FIGS. 15A and 15B are graphs showing various aberrations of the zoom lens system according to Example 3 of the first embodiment at d-line ($\lambda$=587.6 nm) in the telephoto end state (f=18.35 mm) upon focusing on infinity, in which FIG. 15A shows various aberrations without a lens shift, FIG. 15B shows coma with a lens shift.

FIGS. 17A and 17B are graphs showing various aberrations of the zoom lens system according to Example 4 of the first embodiment at d-line ($\lambda$=587.6 nm) in the wide-angle end state (f=6.49 mm) upon focusing on infinity, in which FIG. 17A shows various aberrations without a lens shift, FIG. 17B shows coma with a lens shift.

FIGS. 18A and 18B are graphs showing various aberrations of the zoom lens system according to Example 4 of the first embodiment at d-line ($\lambda$=587.6 nm) in the intermediate focal length state (f=12.42 mm) upon focusing on infinity, in which FIG. 18A shows various aberrations without a lens shift, FIG. 18B shows coma with a lens shift.

FIGS. 19A and 19B are graphs showing various aberrations of the zoom lens system according to Example 4 of the first embodiment at d-line ($\lambda$=587.6 nm) in the telephoto end state (f=18.35 mm) upon focusing on infinity, in which FIG. 19A shows various aberrations without a lens shift, FIG. 19B shows coma with a lens shift.

FIGS. 21A, 21B and 21C are graphs showing various aberrations of the zoom lens system according to Example 5 of the second embodiment at d-line ($\lambda$=587.6 nm) upon focusing on infinity, in which FIG. 21A shows in the wide-angle end state (f=6.49 mm), FIG. 21B shows in the intermediate focal length state (f=13.00 mm), and FIG. 21C shows in the telephoto end state (f=18.35 mm).

FIGS. 23A, 23B and 23C are graphs showing various aberrations of the zoom lens system according to Example 6 of the second embodiment at d-line ($\lambda$=587.6 nm) upon focusing on infinity, in which FIG. 23A shows in the wide-angle end state (f=6.49 mm), FIG. 23B shows in the intermediate focal length state (f=12.42 mm), and FIG. 23C shows in the telephoto end state (f=18.35 mm).

FIGS. 25A, 25B and 25C are graphs showing various aberrations of the zoom lens system according to Example 7 of the second embodiment at d-line ($\lambda$=587.6 nm) upon focusing on infinity, in which FIG. 25A shows in the wide-angle end state (f=6.49 mm), FIG. 25B shows in the intermediate focal length state (f=12.42 mm), and FIG. 25C shows in the telephoto end state (f=18.35 mm).

FIGS. 27A, 27B and 27C are graphs showing various aberrations of the zoom lens system according to Example 8 of the second embodiment at d-line ($\lambda$=587.6 nm) upon focusing on infinity, in which FIG. 27A shows in the wide-angle end state (f=6.49 mm), FIG. 27B shows in the intermediate focal length state (f=12.42 mm), and FIG. 27C shows in the telephoto end state (f=18.35 mm).

THE BEST MODE FOR CARRYING OUT THE INVENTION

Each embodiment according to the present application is explained with reference to accompanying drawings.

Figure 1A:
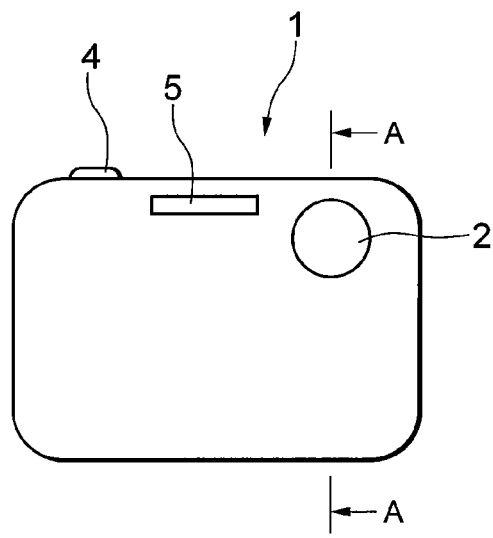
Figure 1B:
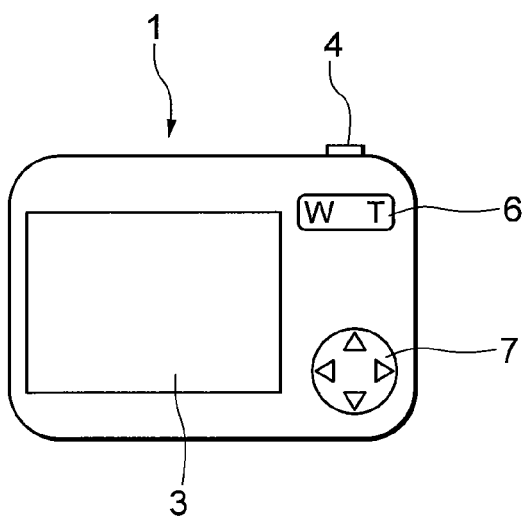

FIGS. 1A and 1B are diagrams showing an electronic still camera as an optical apparatus equipped with a zoom lens system according to an embodiment of the present application explained later, in which FIG. 1A is a front view, and FIG. 1B is a rear view.

Figure 2:
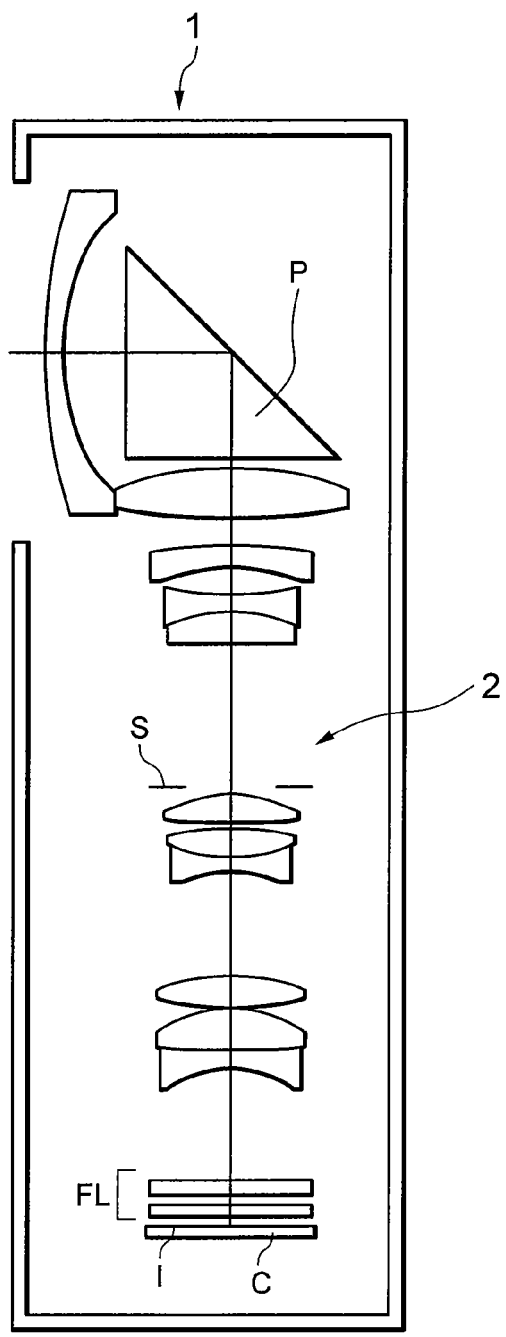
FIG. 2 is a sectional view along A-A line of FIG. 1A in which disposition of the zoom lens system according to an embodiment of the present application is shown.

FIG. 2 is a sectional view along A-A line of FIG. 1A in which disposition of the zoom lens system according to an embodiment of the present application explained later is shown.

In an electronic still camera 1 according to the present embodiment shown in FIGS. 1A, 1B and 2, when a power switch button (not shown) is pressed, a shutter (not shown) is opened and light from an object (not shown) is collected by the image-taking lens 2 and an image is formed on an imaging device C disposed on an image plane I. The object image formed on the imaging device C is displayed on a liquid crystal monitor 3 disposed backside of the electronic still camera 1. After fixing the composition of the object image with observing the liquid crystal monitor 3, a photographer depresses a release button 4 to take a picture of the object image by the imaging device C, and stores in a memory (not shown).

The image-taking lens 2 is composed of a zoom lens system according to an embodiment of the present application explained later. Accordingly, light incident on the front surface of the electronic still camera 1 is deflected below substantially 90 degrees (downward on the plane of FIG. 2) by a prism P disposed in the zoom lens 2 explained later, so that the electronic still camera 1 can be thin.

Moreover, in the electronic still camera 1, the following members are disposed such as an auxiliary light emitter 5 that emits auxiliary light when the subject is dark, a W-T button 6 that makes the zoom lens system, which is the image-taking lens 2, zoom from a wide-angle end state (W) to a telephoto end state (T), and a function button 7 that is used for setting various conditions of the electronic still camera 1.

Moreover, in the electronic still camera 1, the following members are disposed such as an auxiliary light emitter 5 that emits auxiliary light when the object is dark, a W-T button 6 that makes the zoom lens system, which is the image-taking lens 2, zoom from a wide-angle end state (W) to a telephoto end state (T), and a function button 7 that is used for setting various conditions of the electronic still camera 1.

In this manner, the electronic still camera 1, which is an optical apparatus, equipped with the zoom lens system 2 according to an embodiment of the present application is constructed.

Then, a zoom lens system according to each embodiment of the present application is explained.

FIRST EMBODIMENT

Then, a zoom lens system according to a first embodiment is explained.

A zoom lens system according to the first embodiment of the present application includes, in order from an object along an optical path, a first lens group having positive refractive power and an optical path bending element, a second lens group having negative refractive power, a third lens group having positive refractive power, and a fourth lens group having positive refractive power. Upon varying a focal length from a wide-angle end state to a telephoto end state, the first lens group and the third lens group are fixed with respect to an image plane, a distance between the first lens group and the second lens group increases, a distance between the second lens group and third lens group decreases, and a distance between the third lens group and the fourth lens group decreases. An image on the image plane can be shifted by shifting the third lens group or a portion of the third lens group in a direction substantially perpendicular to the optical axis.

The first lens group has a function of bending the optical path by substantially 90 degrees and a function of converging a light flux. Upon varying a focal length from the wide-angle end state to the telephoto end state, the first lens group is always fixed. Accordingly, by fixing the largest and heaviest lens group in respective lens groups, it becomes possible to simplify the construction.

The second lens group has a function of enlarging the object image formed by the first lens group. As a state of lens group positions varies from the wide-angle end state to the telephoto end state, the distance between the first lens group and the second lens group is made to be wider, so that an enlargement ratio is increased, and a focal length is varied.

The third lens group has a function of converging the light flux expanded by the second lens group. In order to accomplish high optical performance, it is preferable to construct the third lens group by a plurality of lenses.

Moreover, in order to obtain excellent images even upon shifting lenses, the third lens group has to be in a state spherical aberration, sine condition and Petzval sum are excellently corrected. Correcting spherical aberration and sine condition are for suppressing decentering coma generated at the center of the image frame upon shifting the shift lens group in a direction substantially perpendicular to the optical axis. Correcting Petzval sum is for suppressing curvature of field generated on the periphery of the image frame upon shifting the shift lens group in a direction substantially perpendicular to the optical axis.

An image blur on the image plane caused by a camera shake is corrected by shifting the image by means of shifting the third lens group or a portion of the third lens group in a direction substantially perpendicular to the optical axis.

The fourth lens group has a function of further converging the light flux converged by the third lens group. Upon varying a focal length from the wide-angle end state to the telephoto end state variation in the image plane with respect to variation in the focal length can be suppressed by aggressively varying the distance between the third lens group and the fourth lens group.

With constructing each lens group as shown above, it becomes possible to shift the image upon happening a camera shake, so that a compact zoom lens system having excellent optical performance can be accomplished.

In a zoom lens system according to the first embodiment of the present application, it is preferable that the third lens group excellently corrects spherical aberration produced independently in the third lens group, and is composed of a positive single lens and a cemented negative lens in order to make a position of the exit pupil further away from the image plane, so that the third lens group is preferably composed of, in order from the object along the optical axis, a positive lens having a convex surface facing the object, and a cemented negative lens constructed by a positive lens having a convex surface facing the object cemented with a negative lens having a concave surface facing the image.

Off-axis light flux is converged and not left from the optical axis by the positive lens having a convex surface facing the object, so that the diameter of the lens can be compact.

In a zoom lens system according to the first embodiment of the present application, in order to suppress variation in optical performance upon shifting to the lowest level, the following conditional expression (1) is preferably satisfied:

$$0.75 < \beta bt \times (1 - \beta at) < 1.2 \quad (1)$$

where $\beta at$ denotes lateral magnification of the third lens group in the telephoto end state, and $\beta bt$ denotes lateral magnification of an optical system locating between the third lens group and the image plane in the telephoto end state.

Conditional expression (1) is a so-called vibration reduction coefficient, and defines an appropriate range of the moving amount of the image on the image plane in a direction perpendicular to the optical axis with respect to a moving amount of the third lens group in a direction substantially perpendicular to the optical axis in the telephoto end state.

Here, when an image on the image plane is shifted by shifting a shift lens group in a direction substantially perpendicular to the optical axis, the vibration reduction coefficient is an image shift amount $\Delta$ with respect to a shifting amount $\delta$ of the shift lens group, and is expressed by the following expression (a):

$$\Delta = \delta \times (1 - \beta a) \times \beta b$$

is transformed into $$\Delta / \delta = (1 - \beta a) \times \beta b \quad (a)$$

where $\beta a$ denotes lateral magnification of the shift lens group, and $\beta b$ denotes lateral magnification of the lens group disposed to the image side of the shift lens group. Right side of expression (a) $(1 - \beta a) \times \beta b$ is called a vibration reduction coefficient.

When the value exceeds the upper limit of conditional expression (1), the moving amount of the image with respect to the moving amount of the third lens group from the optical axis becomes too large, and the image moves largely even if the third lens group moves a minute amount, so that it becomes difficult to control the position of the shift lens group and sufficient accuracy cannot be secured. Moreover, coma becomes worse, so that it is undesirable.

On the other hand, when the value falls below the lower limit of conditional expression (1), the moving amount of the image with respect to the moving amount of the third lens group from the optical axis becomes relatively small, and the moving amount of the shift lens group necessary for correcting an image blur caused by a camera shake becomes extremely large. Accordingly, a driving mechanism for moving the shift lens group becomes large, so that it becomes impossible to make the lens diameter compact. Moreover, coma becomes worse, so that it is undesirable.

In order to secure the effect of the present application, it is preferable to set the upper limit of conditional expression (1) to 1.1. In order to further secure the effect of the present application, it is most preferable to set the upper limit of conditional expression (1) to 1.05. In order to secure the effect of the present application, it is preferable to set the lower limit of conditional expression (1) to 0.80. In order to further secure the effect of the present application, it is most preferable to set the lower limit of conditional expression (1) to 0.85.

In a zoom lens system according to the first embodiment of the present application, the following conditional expression (2) is preferably satisfied:

$$0.3 < fw/f3 < 0.5 \quad (2)$$

where f3 denotes a focal length of the third lens group, and fw denotes a focal length of the zoom lens system in the wide-angle end state.

Conditional expression (2) defines an appropriate range of the focal length of the third lens group.

When the value exceeds the upper limit of conditional expression (2), refractive power of the third lens group becomes large, and spherical aberration generated independently by the third lens group becomes large.

When the value falls below the lower limit of conditional expression (2), refractive power of the third lens group becomes weak, and not afocal, so that when the lens group is shifted, variation in curvature of field becomes large.

In order to secure the effect of the present application, it is preferable to set the upper limit of conditional expression (2) to 0.47. In order to further secure the effect of the present application, it is most preferable to set the upper limit of conditional expression (2) to 0.45. In order t secure the effect of the present application, it is preferable to set the lower limit of conditional expression (2) to 0.32. In order to further secure the effect of the present application, it is most preferable to set the lower limit of conditional expression (2) to 0.35.

In a zoom lens system according to the first embodiment of the present application, the following conditional expression (3) is preferably satisfied:

$$0.5 < f4/f3 < 1.1 \quad (3)$$

where f3 denotes a focal length of the third lens group, and f4 denotes a focal length of the fourth lens group.

Conditional expression (3) defines an appropriate range of a ratio of the focal length of the third lens group to that of the fourth lens group.

When the ratio exceeds the upper limit of conditional expression (3), refractive power of the third lens group becomes relatively weak, and it becomes difficult for the third lens group to effectively contribute to zooming, so that it becomes difficult to secure a high zoom ratio of about three. Moreover, refractive power of the fourth lens group becomes relatively strong, so that coma and astigmatism become too large. Accordingly, it becomes impossible to accomplish the object of the present invention for obtaining excellent optical performance.

When the ratio falls below the lower limit of conditional expression (3), refractive power of the third lens group becomes relatively strong, so that variation in curvature of field generated by the third lens group upon zooming becomes large. Moreover, refractive power of the fourth lens group becomes relatively weak, so that a moving amount upon zooming becomes large, and variations in coma and astigmatism generated in the fourth lens group become large. Accordingly, it becomes difficult to suppress deterioration in optical performance over entire zoom range from the wide-angle end state to the telephoto end state.

In order to secure the effect of the present application, it is preferable to set the upper limit of conditional expression (3) to 0.95. In order to secure the effect of the present application, it is preferable to set the lower limit of conditional expression (3) to 0.55. In order to further secure the effect of the present application, it is most preferable to set the lower limit of conditional expression (3) to 0.60.

In a zoom lens system according to the first embodiment of the present application, in order to balance higher optical performance against deterioration in optical performance upon shifting, it is preferable that an aperture stop is disposed between the second lens group and the third lens group, and the aperture stop is located adjacent to the object side of the third lens group.

In a lens group capable of shifting the image, in order to suppress deterioration in optical performance upon shifting to the lowest level, shifting is generally carried out by a lens group locating near to the aperture stop where off-axis light flux passes near to the optical axis upon zooming, so that it becomes possible to secure optical performance excellently.

In a zoom lens system according to the first embodiment of the present application, the optical path bending element is a rectangular prism and the following conditional expression (4) is preferably satisfied:

$$1.800 < ndp \quad (4)$$

where ndp denotes a refractive index of the rectangular prism at d-line (wavelength λ=587.6 nm).

Conditional expression (4) defines an appropriate range of a refractive index of the rectangular prism for bending the optical path. The rectangular prism makes it possible to deflect the optical path by means of total internal reflection so as to reduce loss of light amount, and to configure the optical system to be compact.

When the value falls below the lower limit of conditional expression (4), the dimension of the rectangular prism becomes large, and the whole of the zoom lens system becomes large, so that it is undesirable. Moreover, coma and lateral chromatic aberration generated in the first lens group become worse. As a result, the thickness of the camera is affected, so that it becomes impossible to make the camera compact. In an optical path bending element, a mirror or an optical fiber may be used other than a rectangular prism.

In order to secure the effect of the present application, it is preferable to set the lower limit of conditional expression (4) to 1.820. In order to further secure the effect of the present application, it is most preferable to set the lower limit of conditional expression (4) to 1.830.

In a zoom lens system according to the first embodiment of the present application, it is preferable that the first lens group includes a negative lens, and the following conditional expression (5) is preferably satisfied:

$$1.900 < nd1 \quad (5)$$

where nd1 denotes a refractive index of the negative lens in the first lens group at d-line.

Conditional expression (5) defines a refractive index of the negative lens in the first lens group.

When the value falls below the lower limit of conditional expression (5), an effective diameter and an outer diameter of the negative lens in the first lens group become large, and the whole of the zoom lens system becomes large, so that it is undesirable. As a result, the thickness of the camera is affected, so that it becomes impossible to make the camera compact. Moreover, coma and distortion become worse, so that it is undesirable.

In order to secure the effect of the present application, it is preferable to set the lower limit of conditional expression (5) to 1.910. In order to further secure the effect of the present application, it is most preferable to set the lower limit of conditional expression (5) to any one of 1.920, 1.930, and 1.940. Moreover, there may be a plurality of negative lenses satisfying conditional expression (5).

In a zoom lens system according to the first embodiment of the present application, the following conditional expression (6) is preferably satisfied:

$$1.5 < f1/(-f2) < 4.0 \quad (6)$$

where f1 denotes a focal length of the first lens group, and f2 denotes a focal length of the second lens group.

Conditional expression (6) defines an appropriate range of a ratio of the focal length of the first lens group to that of the second lens group.

When the ratio exceeds the upper limit of conditional expression (6), refractive power of the first lens group becomes relatively small, and the outer diameter of the first lens group becomes large, so that it becomes impossible to contribute to be compact. Moreover, refractive power of the second lens group becomes relatively strong, and generation of coma cannot be suppressed, so that high optical performance cannot be obtained.

When the ratio falls below the lower limit of conditional expression (6), refractive power of the first lens group becomes relatively strong. Although it is advantageous to be compact, variations in spherical aberration and curvature of field upon zooming become large, so that it is undesirable. Moreover, since refractive power of the second lens group becomes relatively weak, the second lens group cannot effectively contribute to zooming, so that a moving amount necessary for zooming cannot be secured.

In order to secure the effect of the present application, it is preferable to set the upper limit of conditional expression (6) to 3.5. In order to secure the effect of the present application, it is preferable to set the lower limit of conditional expression (6) to 3.0. In order to secure the effect of the present application, it is preferable to set the lower limit of conditional expression (6) to 1.7. In order to further secure the effect of the present application, it is most preferable to set the lower limit of conditional expression (6) to 2.0.

In a zoom lens system according to the first embodiment of the present application, in order to excellently correct spherical aberration independently generated in the fourth lens group, and to make a position of the entrance pupil away from the image plane as much as possible, the fourth lens group is preferably composed of, a positive single lens and a cemented negative lens, so that the fourth lens group is preferably composed of, in order from the object along the optical axis, a positive lens having a convex surface facing the object, and a cemented negative lens constructed by a positive lens having a convex surface facing the object cemented with a negative lens having a concave surface facing the image.

Off-axis light flux is converged and not left from the optical axis by the positive lens having a convex surface facing the object, so that the diameter of the lens can be compact. Moreover, since the fourth lens group has positive refractive power as a whole, the position of the exit pupil can be away from the image plane, so that it is suitable for an optical system using a solid-state imaging device as a light-sensitive element.

In a zoom lens system according to the first embodiment of the present application, an aspherical lens is preferably included in each of the first through fourth lens groups.

For example, with disposing an aspherical lens in the first lens group, variation in coma generated upon varying a focal length from the wide-angle end state to the telephoto end state can be excellently corrected. Moreover, it contributes for the first lens group to be compact.

With disposing an aspherical lens in the second lens group, variations in coma and astigmatism generated upon varying a focal length from the wide-angle end state to the telephoto end state can be excellently corrected.

With disposing an aspherical lens in the third lens group, variations in spherical aberration and coma generated independently in the third lens group can be excellently corrected, deterioration in optical performance upon shifting can be suppressed in a minimum level, and it is also advantageous for correcting curvature of field.

With disposing an aspherical lens in the fourth lens group, variation in spherical aberration independently generated in the fourth lens group can be excellently corrected.

A method for shifting an image on an image plane of a zoom lens system according to a first embodiment of the present application comprising steps of: providing the zoom lens system comprising, in order from an object along an optical axis, a first lens group having positive refractive power and an optical path bending element, a second lens group having negative refractive power, a third lens group having positive refractive power, and a fourth lens group having positive refractive power, upon varying a focal length from a wide-angle end state to a telephoto end state, the first lens group being fixed with respect to the image plane, a distance between the first lens group and the second lens group increasing, a distance between the second lens group and the third lens group decreasing, and a distance between the third lens group and the fourth lens group decreasing; and shifting the third lens group or a portion of the third lens group in a direction substantially perpendicular to the optical axis so as to shift the image on the image plane.

With adopting such a method for shifting an image, since shifting is carried out at a position along the optical axis away from the object in a direction perpendicular to the optical axis, it becomes possible to accomplish a method for shifting an image capable of making a shift amount small.

A method for varying a focal length of a zoom lens system according to a first embodiment of the present application comprising steps of: providing the zoom lens system comprising, in order from an object along an optical axis, a first lens group having positive refractive power and an optical path bending element, a second lens group having negative refractive power, a third lens group having positive refractive power, and a fourth lens group having positive refractive power, and the third lens group or a portion of the third lens group shifting in a direction substantially perpendicular to the optical axis so as to shift an image on an image plane; and moving the second lens group and the fourth lens group along the optical axis such that upon varying a focal length from a wide-angle end state to a telephoto end state, the first lens group is fixed with respect to the image plane, a distance between the first lens group and the second lens group increases, a distance between the second lens group and the third lens group decreases, and a distance between the third lens group and the fourth lens group decreases.

With adopting such a method for varying a focal length, it becomes possible to make movable lens groups fewer and a driving mechanism simple.

Examples

Each example of a zoom lens system according to the first embodiment of the present application is explained below with reference to accompanying drawings.

Figure 3:
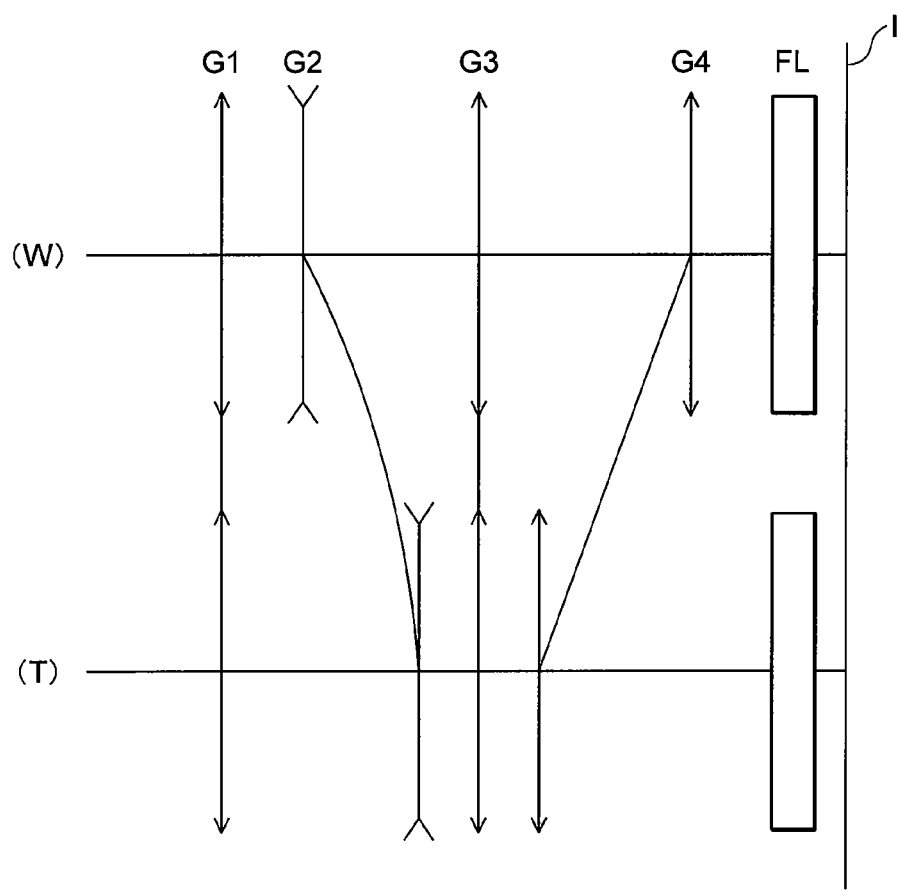
FIG. 3 is a diagram showing power distribution of the zoom lens system according to an embodiment of the present application together with a zoom trajectory of each lens group upon varying a focal length from a wide-angle end state (W) to a telephoto end state (T).

FIG. 3 is a diagram showing power distribution of the zoom lens system according to each embodiment of the present application together with a zoom trajectory of each lens group upon varying a focal length from a wide-angle end state (W) to a telephoto end state (T).

As shown in FIG. 3, a zoom lens system according to each example of the present application is composed of, in order from an object along an optical axis, a first lens group G1 having positive refractive power, a second lens group G2 having negative refractive power, a third lens group G3 having positive refractive power, a fourth lens group G4 having positive refractive power, and a filter group FL composed of a low-pass filter, a infrared light blocking filter, and the like. Upon varying a focal length from a wide-angle end state W to a telephoto end state T, which is so-called zooming, the first lens group G1 and the third lens group G3 are fixed with respect to an image plane I, a distance between the first lens group G1 and the second lens group G2 increases, a distance between the second lens group G2 and the third lens group G3 decreases, and a distance between the third lens group G3 and the fourth lens group G4 decreases.

In the following each Example according to each embodiment, an aspherical surface is exhibited by the following expression:

$$S(y)=(y^2/r)/[1+[1-\kappa(y^2/r^2)]^{1/2}]+C4 \times y^4+C6 \times y^6+C8 \times y^8+C10 \times y^{10}$$

where y denotes a vertical height from the optical axis, S(y) denotes a sag amount which is a distance along the optical axis from the tangent surface at the vertex of the aspherical surface to the aspherical surface at the vertical height y from the optical axis, r denotes a radius of curvature of a reference sphere (paraxial radius of curvature), $\kappa$ denotes a conical coefficient, Cn denotes an aspherical coefficient of n-th order.

In each Example, an aspherical coefficient of second order C2 is 0. In Table of each example, an aspherical surface is notified by attaching "*" to the left side of the surface number.

Example 1

Figure 4:
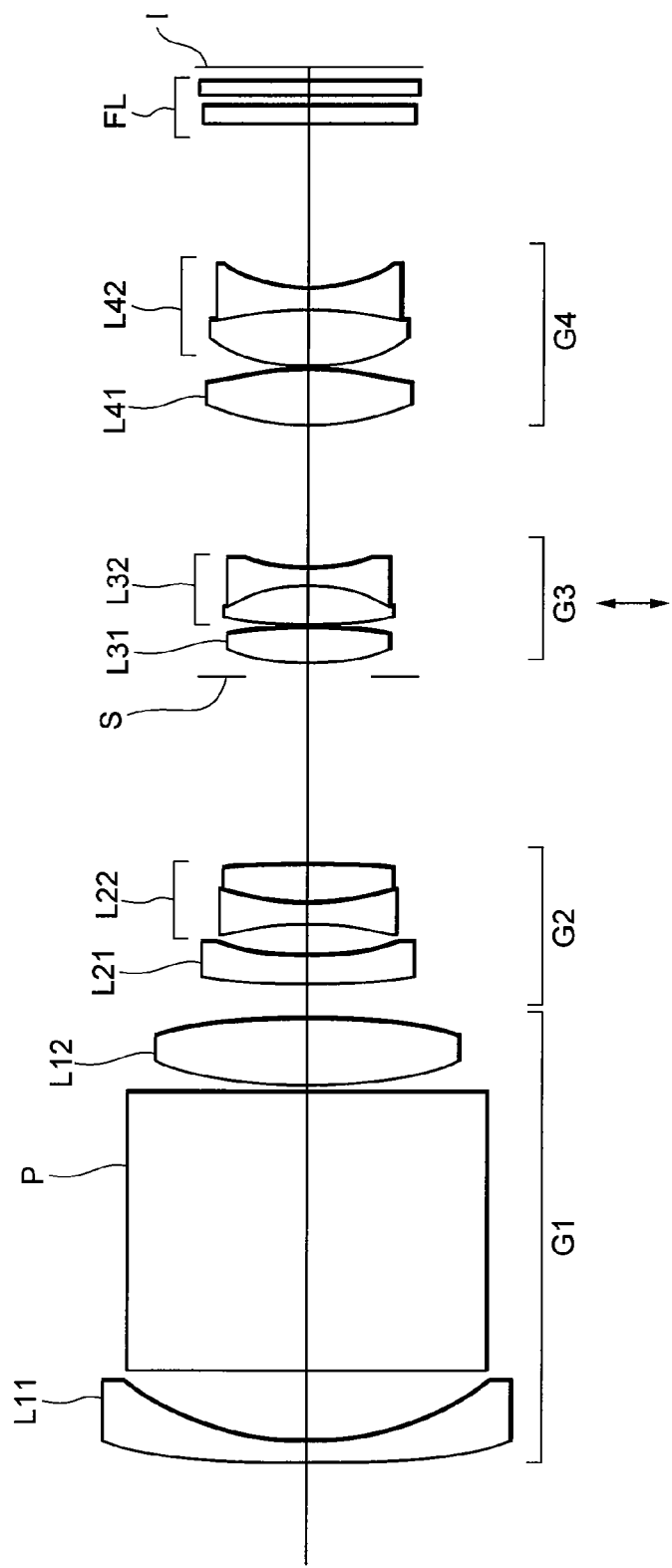
FIG. 4 is a diagram showing lens configuration of a zoom lens system according to Example 1 of a first embodiment extended along an optical axis.

FIG. 4 is diagram showing lens configuration of a zoom lens system according to Example 1 of a first embodiment extended along an optical axis.

In FIG. 4, the first lens group G1 is composed of, in order from the object along the optical axis, a negative meniscus lens L11 having a convex surface facing the object, a rectangular prism P for bending the optical path by substantially 90 degrees, and a double convex positive lens L12 having an aspherical surface facing the object.

The second lens group G2 is composed of, in order from the object along the optical axis, a negative meniscus lens L21 having a convex surface facing the object and an aspherical surface facing the image plane I side, and a cemented negative lens L22 constructed by a double concave negative lens cemented with a positive meniscus lens having a convex surface facing the object.

The third lens group G3 is composed of, in order from the object along the optical axis, a double convex positive lens L31 having an aspherical surface facing the object, and a cemented negative lens L32 constructed by a double convex positive lens cemented with a double concave negative lens. Vibration reduction is carried out by shifting the third lens group G3 in a direction perpendicular to the optical axis so as to shift the image on the image plane I upon generating a camera shake.

The fourth lens group G4 is composed of, in order from the object along the optical axis, a double convex positive lens L41 having an aspherical surface facing the image plane I side, and a cemented negative lens L42 constructed by a double convex positive lens cemented with a double concave negative lens.

The filter group FL is composed of a low-pass filter, an infrared light blocking filter, and the like.

The image plane I is formed on an imaging device, which is unillustrated. The imaging device is constructed by a CCD, or a CMOS (the same is applied to the following each Example).

The aperture stop S is disposed to the most object side of the third lens group G3 and fixed with respect to the image plane I upon zooming from the wide-angle end state W to the telephoto end state T.

Various values associated with the zoom lens system according to Example 1 of the present application are listed in Table 1.

In [Specifications], W denotes a wide-angle end state, M denotes an intermediate focal length state, T denotes a telephoto end state, f denotes a focal length, FNO denotes an f-number, 2ω denotes an angle of view (unit: degrees), and Bf denotes a back focal length.

In [Lens Data], surface number "N" shows the lens surface number counted in order from the object side, "r" shows a radius of curvature of each lens surface, "d" shows a distance to the next surface, "nd" and "vd" respectively show a refractive index and an Abbe number at d-line (wavelength λ=587.6 nm).

Moreover, r=0.0000 denotes a plane surface. Refractive index of the air nd=1.000000 is omitted from the Lens Data. In [Aspherical Data], surface number, conical coefficient κ, and aspherical coefficients C4 through C10 are shown. "E-n" (n: integer) denotes "×10$^{-n}$".

In [Variable Distances], a focal length f, each variable distance, and a back focal length Bf are shown.

In the tables for various values, "mm" is generally used for the unit of length such as a focal length f, a radius of curvature r, a surface distance d and the like. However, since similar optical performance can be obtained by an optical system proportionally enlarged or reduced its dimension, the unit is not necessarily to be limited to "mm", and any other suitable unit can be used. The explanation of reference symbols is the same in the other Examples, so that duplicated explanations are omitted.

TABLE 1

[Specifications]

|  | W | M | T |
|---|---|---|---|
| f = | 6.49 | 13.00 | 18.35 |
| FNO = | 3.25 | 3.92 | 4.44 |
| 2ω = | 63.46 | 31.68 | 22.52 |

[Lens Data]

| N | r | d | nd | vd |
|---|---|---|---|---|
| 1 | 30.0000 | 0.80 | 1.92286 | 18.90 |
| 2 | 10.8266 | 2.76 | | |
| 3 | 0.0000 | 10.50 | 1.88300 | 40.76 |
| 4 | 0.0000 | 0.20 | | |
| *5 | 17.6854 | 2.54 | 1.77377 | 47.18 |
| 6 | −24.9579 | (d6) | | |
| 7 | 49.4226 | 1.00 | 1.80610 | 40.88 |
| *8 | 10.1943 | 1.32 | | |
| 9 | −11.0741 | 0.70 | 1.77250 | 49.60 |
| 10 | 8.9104 | 1.40 | 1.92286 | 18.90 |
| 11 | 66.6471 | (d11) | | |
| 12 | 0.0000 | 0.50 | Aperture Stop S | |
| *13 | 8.0543 | 1.33 | 1.69350 | 53.20 |
| 14 | −23.6288 | 0.10 | | |
| 15 | 14.5229 | 1.55 | 1.65160 | 58.55 |
| 16 | −5.8631 | 0.70 | 1.83481 | 42.71 |
| 17 | 8.2446 | (d17) | | |
| 18 | 9.6258 | 2.04 | 1.58913 | 61.16 |
| *19 | −11.5184 | 0.10 | | |
| 20 | 6.9573 | 2.15 | 1.48749 | 70.23 |
| 21 | −18.4789 | 0.80 | 1.79504 | 28.54 |
| 22 | 5.7682 | (d22) | | |
| 23 | 0.0000 | 0.65 | 1.54437 | 70.51 |
| 24 | 0.0000 | 0.40 | | |
| 25 | 0.0000 | 0.50 | 1.51633 | 64.14 |
| 26 | 0.0000 | (Bf) | | |

TABLE 1-continued

[Aspherical Data]

Surface Number: 5

κ = −1.8966
C4 = +3.3740E−5
C6 = −2.5195E−7
C8 = +2.9256E−9
C10 = −2.3805E−11

Surface Number: 8

κ = −8.9802
C4 = +1.2224E−3
C6 = −3.6939E−5
C8 = +1.5818E−6
C10 = −1.8716E−8

Surface Number: 13

κ = +0.3629
C4 = +2.1443E−5
C6 = +9.5031E−6
C8 = −4.2244E−7
C10 = +3.9902E−8

Surface Number: 19

κ = +5.7565
C4 = +7.8405E−4
C6 = +1.7280E−5
C8 = −2.5355E−7
C10 = +2.9997E−8

[Variable Distances]

|  | W | M | T |
|---|---|---|---|
| f | 6.4900 | 12.9997 | 18.3499 |
| d6 | 1.3662 | 5.9198 | 7.7019 |
| d11 | 7.3857 | 2.8321 | 1.0500 |
| d17 | 5.4454 | 2.6465 | 1.1000 |
| d22 | 6.1696 | 8.9684 | 10.5150 |
| Bf | 0.5900 | 0.5900 | 0.5900 |

[Values for Conditional Expressions]

(1): βbt × (1 − βat) = 0.94264
(2): fw/f3 = 0.37025
(3): f4/f3 = 0.71550
(4): ndp = 1.88300
(5): nd1 = 1.92286
(6): f1/(−f2) = 2.49132

Figure 5A:
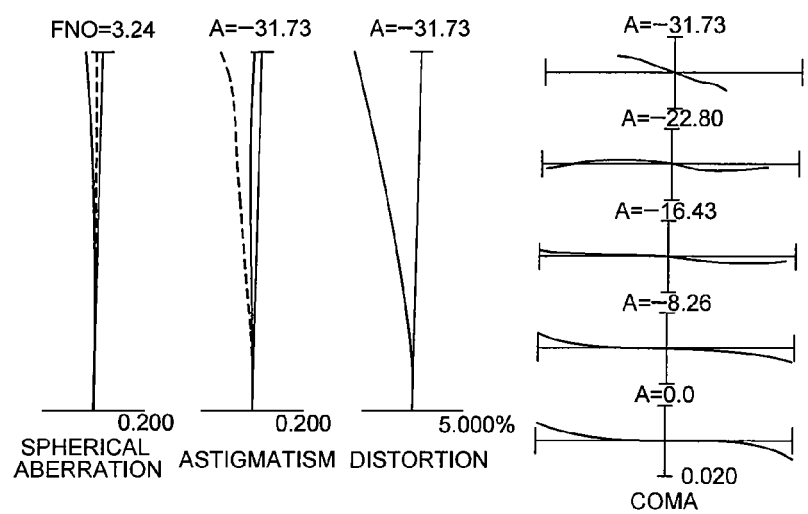
Figure 5B:
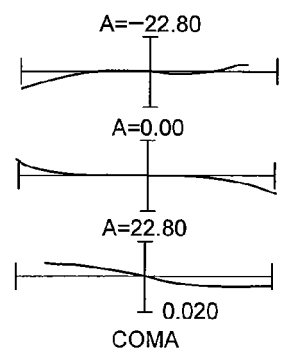
Figure 6A:
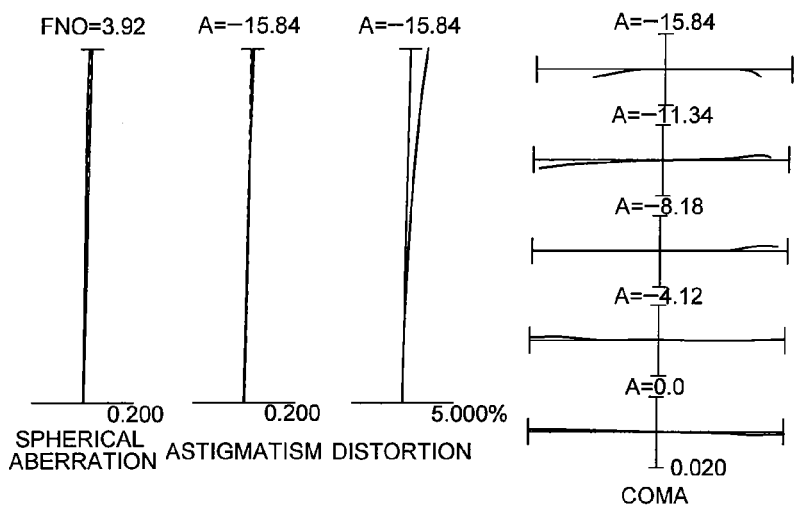
Figure 6B:
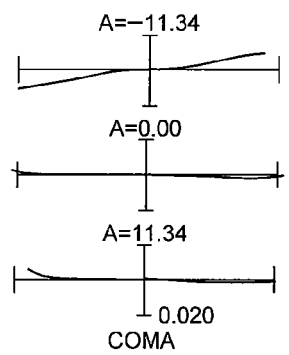
Figure 7A:
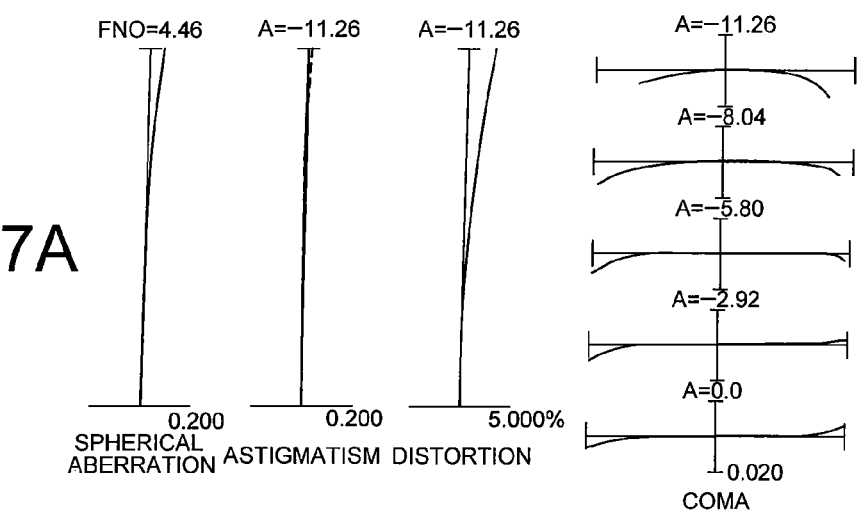
Figure 7B:
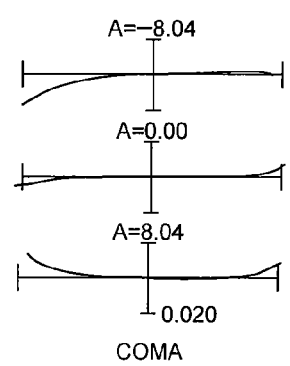

FIGS. 5A and 5B through FIGS. 7A and 7B are graphs showing various aberrations of the zoom lens system according to Example 1 of the first embodiment at d-line (λ=587.6 nm) upon focusing on infinity, in which FIG. 5A shows various aberrations in the wide-angle end state (f=6.49 mm) without a lens shift, and FIG. 5B shows coma in the wide-angle end state with a lens shift. FIG. 6A shows various aberrations in the intermediate focal length state (f=12.42 mm) without a lens shift, and FIG. 6B shows coma in the intermediate focal length state with a lens shift. FIG. 7A shows various aberrations in the telephoto end state (f=18.35 mm) without a lens shift, and FIG. 7B shows coma in the telephoto end state with a lens shift.

In respective graphs, FNO denotes an f-number, A denotes a half angle of view (unit: degrees). In graphs showing astigmatism, a solid line indicates a sagittal image plane, and a broken line indicates a meridional image plane. In graphs showing spherical aberration, a solid line indicates spherical aberration, and a broken line indicates sine condition. The above-described explanation regarding various aberration graphs is the same as the other Examples, so that duplicated explanations are omitted.

As is apparent from the respective graphs, the zoom lens system according to Example 1 shows superb optical performance as a result of good corrections to various aberrations from the wide-angle end state to the telephoto end state and even upon shifting the shift lens group.

Example 2

FIG. 8 is diagram showing lens configuration of a zoom lens system according to Example 2 of the first embodiment extended along an optical axis.

In FIG. 8, the first lens group G1 is composed of, in order from the object along the optical axis, a negative meniscus lens L11 having a convex surface facing the object, a rectangular prism P for bending the optical path by substantially 90 degrees, and a double convex positive lens L12 having an aspherical surface facing the object.

The second lens group G2 is composed of, in order from the object along the optical axis, a negative meniscus lens L21 having a convex surface facing the object and an aspherical surface facing the image plane I side, and a cemented negative lens L22 constructed by a double concave negative lens cemented with a double convex positive lens.

The third lens group G3 is composed of, in order from the object along the optical axis, a double convex positive lens L31 having an aspherical surface facing the object, and a cemented negative lens L32 constructed by a double convex positive lens cemented with a double concave negative lens. Vibration reduction is carried out by shifting the third lens group G3 in a direction perpendicular to the optical axis so as to shift the image on the image plane I upon generating a camera shake.

The fourth lens group G4 is composed of, in order from the object along the optical axis, a double convex positive lens L41 having an aspherical surface facing the image side, and a cemented negative lens L42 constructed by a double convex positive lens cemented with a double concave negative lens.

The filter group FL is composed of a low-pass filter, an infrared light blocking filter, and the like.

The aperture stop S is disposed to the most object side of the third lens group G3 and fixed with respect to the image plane I upon zooming from the wide-angle end state W to the telephoto end state T.

Various values associated with the zoom lens system according to Example 2 of the present application are listed in Table 2.

TABLE 2

[Specifications]

|  | W | M | T |
|---|---|---|---|
| f = | 6.49 | 12.42 | 18.35 |
| FNO = | 3.28 | 3.89 | 4.40 |
| 2ω = | 63.45 | 33.20 | 22.52 |

[Lens Data]

| N | r | d | nd | νd |
|---|---|---|---|---|
| 1 | 24.5000 | 0.80 | 1.92286 | 18.90 |
| 2 | 9.9772 | 2.95 | | |
| 3 | 0.0000 | 8.50 | 1.83481 | 42.71 |
| 4 | 0.0000 | 0.20 | | |
| *5 | 16.6000 | 2.63 | 1.77377 | 47.18 |
| 6 | −24.8401 | (d6) | | |
| 7 | 74.7674 | 1.00 | 1.82080 | 42.71 |
| *8 | 9.4961 | 1.39 | | |
| 9 | −10.0785 | 0.70 | 1.78800 | 47.37 |
| 10 | 11.0108 | 1.35 | 1.92286 | 18.90 |
| 11 | −140.1574 | (d11) | | |
| 12 | 0.0000 | 0.50 | Aperture Stop S | |
| *13 | 7.2743 | 1.39 | 1.69350 | 53.20 |
| 14 | −26.2141 | 0.15 | | |
| 15 | 13.0403 | 1.59 | 1.65160 | 58.55 |
| 16 | −5.7472 | 0.70 | 1.83481 | 42.71 |
| 17 | 7.0000 | (d17) | | |
| 18 | 9.8799 | 1.69 | 1.58913 | 61.16 |
| *19 | −11.2538 | 0.10 | | |
| 20 | 6.8394 | 2.19 | 1.48749 | 70.23 |
| 21 | −15.4997 | 0.80 | 1.79504 | 28.54 |
| 22 | 6.0883 | (d22) | | |
| 23 | 0.0000 | 0.65 | 1.54437 | 70.51 |
| 24 | 0.0000 | 0.40 | | |
| 25 | 0.0000 | 0.50 | 1.51633 | 64.14 |
| 26 | 0.0000 | (Bf) | | |

[Aspherical Data]

Surface Number: 5

$\kappa = -1.5215$
$C4 = +3.9133E-5$
$C6 = -1.9315E-7$
$C8 = +3.1162E-9$
$C10 = -3.5747E-11$ Surface Number: 8

$\kappa = -9.0000$
$C4 = +1.4631E-3$
$C6 = -4.9164E-5$
$C8 = +2.1048E-6$
$C10 = -2.6229E-8$ Surface Number: 13

$\kappa = +0.3110$
$C4 = +4.3394E-5$
$C6 = +1.0663E-5$
$C8 = -4.6198E-7$
$C10 = +4.5396E-8$ Surface Number: 19

$\kappa = -1.7610$
$C4 = +1.0693E-4$
$C6 = +6.5769E-6$
$C8 = -2.4528E-7$
$C10 = +8.6823E-10$

[Variable Distances]

|  | W | M | T |
|---|---|---|---|
| f | 6.4900 | 12.4200 | 18.3500 |
| d6 | 1.3733 | 5.6158 | 7.7020 |
| d11 | 7.3787 | 3.1362 | 1.0500 |
| d17 | 5.0253 | 2.6114 | 1.1000 |
| d22 | 5.9477 | 8.3616 | 9.8730 |
| Bf | 0.6000 | 0.6000 | 0.6000 |

[Values for Conditional Expressions]

(1): $\beta bt \times (1 - \beta at) = 0.89966$
(2): fw/f3 = 0.38073
(3): f4/f3 = 0.70338
(4): ndp = 1.83481
(5): nd1 = 1.92286
(6): f1/(−f2) = 2.51707

Figure 9A:
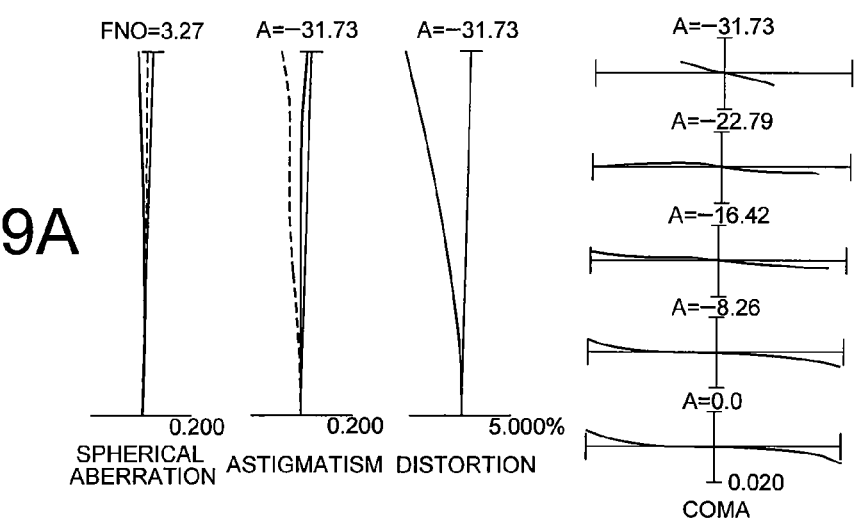
Figure 9B:
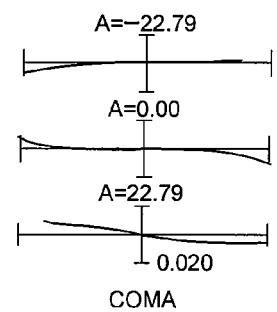
Figure 10A:
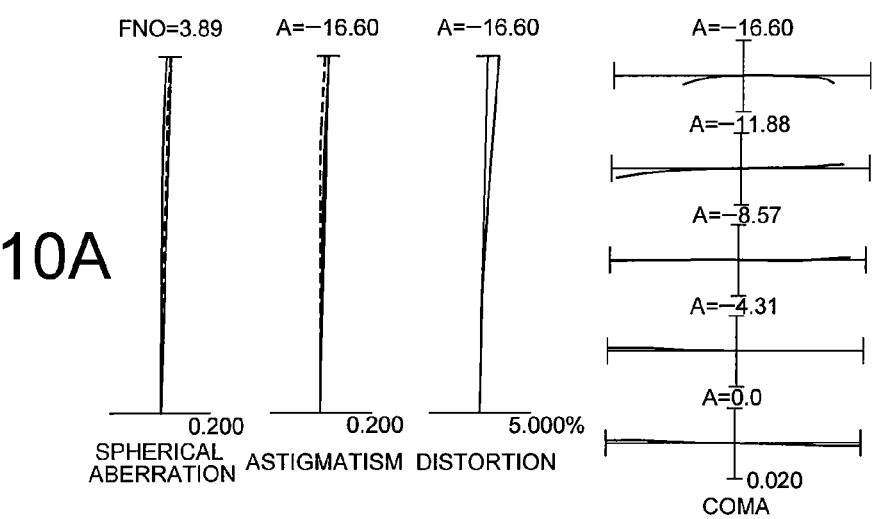
Figure 10B:
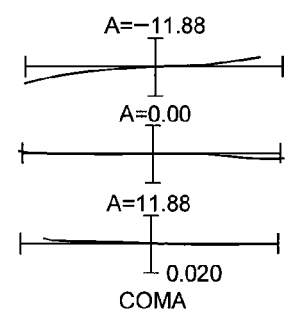
Figure 11A:
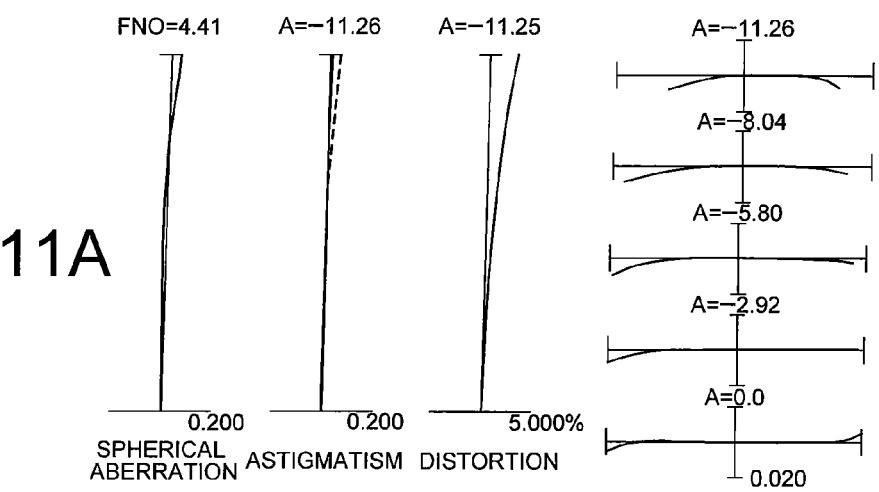
Figure 11B:
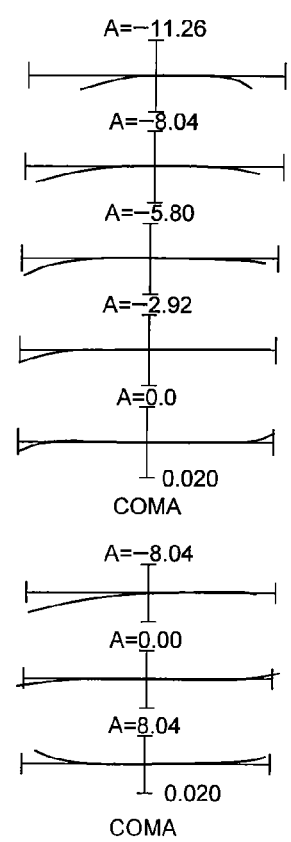

FIGS. 9A and 9B through FIGS. 11A and 11B are graphs showing various aberrations of the zoom lens system according to Example 2 of the first embodiment at d-line ($\lambda$=587.6 nm) upon focusing on infinity, in which FIG. 9A shows various aberrations in the wide-angle end state (f=6.49 mm) without a lens shift, and FIG. 9B shows coma in the wide-angle end state with a lens shift. FIG. 10A shows various aberrations in the intermediate focal length state (f=12.42 mm) without a lens shift, and FIG. 10B shows coma in the intermediate focal length state with a lens shift. FIG. 11A shows various aberrations in the telephoto end state (f=18.35 mm) without a lens shift, and FIG. 11B shows coma in the telephoto end state with a lens shift.

As is apparent from the respective graphs, the zoom lens system according to Example 2 shows superb optical performance as a result of good corrections to various aberrations from the wide-angle end state to the telephoto end state and even upon shifting the shift lens group.

Example 3

Figure 12:
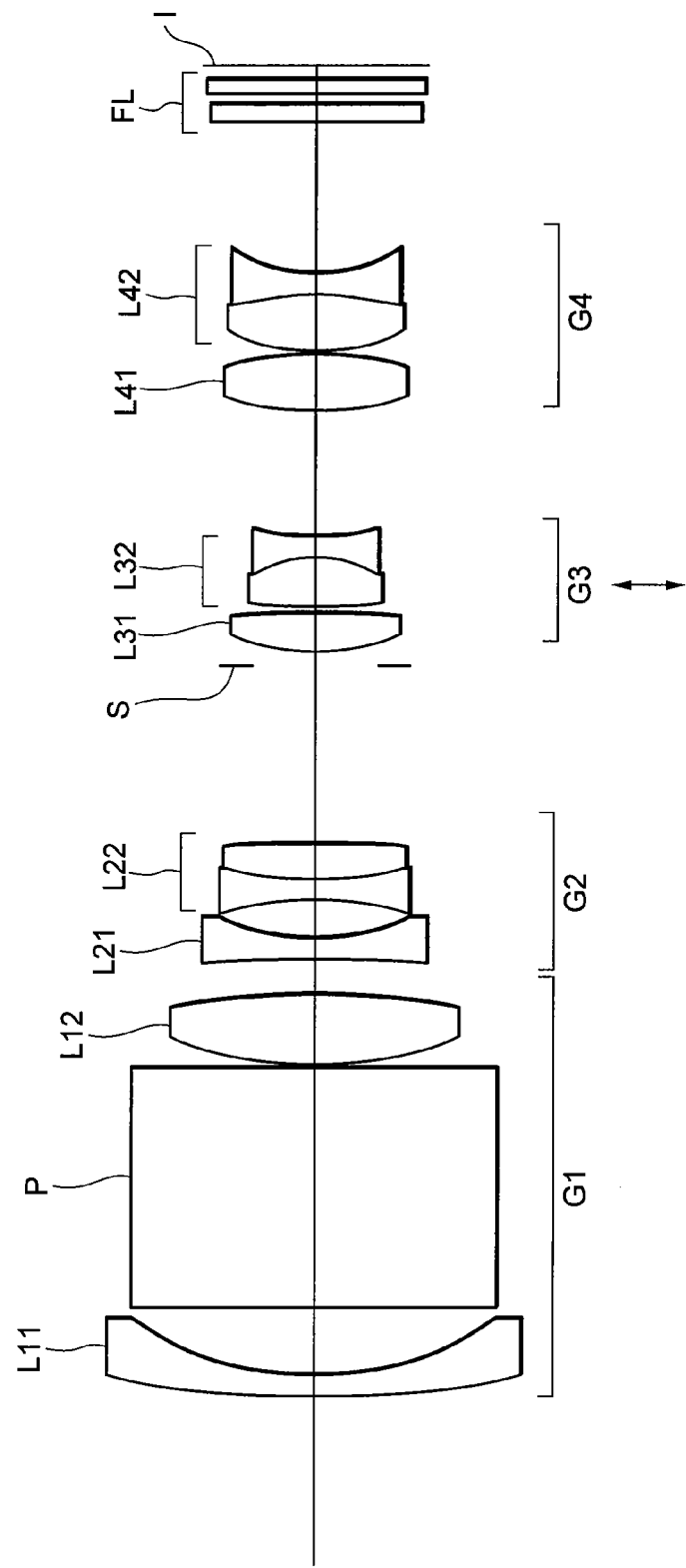
FIG. 12 is a diagram showing lens configuration of a zoom lens system according to Example 3 of the first embodiment extended along an optical axis.

FIG. 12 is diagram showing lens configuration of a zoom lens system according to Example 3 of the first embodiment extended along an optical axis.

In FIG. 12, the first lens group G1 is composed of, in order from the object along the optical axis, a negative meniscus lens L11 having a convex surface facing the object, a rectangular prism P for bending the optical path by substantially 90 degrees, and a double convex positive lens L12 having an aspherical surface facing the object.

The second lens group G2 is composed of, in order from the object along the optical axis, a double concave negative lens L21 having an aspherical surface facing the image plane I side, and a cemented negative lens L22 constructed by a double concave negative lens cemented with a double convex positive lens.

The third lens group G3 is composed of, in order from the object along the optical axis, a double convex positive lens L31 having an aspherical surface facing the object, and a cemented negative lens L32 constructed by a double convex positive lens cemented with a double concave negative lens. Vibration reduction is carried out by shifting the third lens group G3 in a direction perpendicular to the optical axis so as to shift the image on the image plane I upon generating a camera shake.

The fourth lens group G4 is composed of, in order from the object along the optical axis, a double convex positive lens L41 having an aspherical surface facing the image side, and a cemented negative lens L42 constructed by a double convex positive lens cemented with a double concave negative lens.

The filter group FL is composed of a low-pass filter, an infrared light blocking filter, and the like.

An aperture stop S is disposed to the most object side of the third lens group G3 and fixed with respect to the image plane I upon zooming from the wide-angle end state W to the telephoto end state T.

Various values associated with the zoom lens system according to Example 3 of the present application are listed in Table 3.

TABLE 3

[Specifications]

|   | W | M | T |
|---|---|---|---|
| f = | 6.49 | 12.42 | 18.35 |
| FNO = | 3.46 | 4.04 | 4.41 |
| 2ω = | 63.44 | 33.20 | 22.52 |

[Lens Data]

| N | r | d | nd | νd |
|---|---|---|---|---|
| 1 | 33.7718 | 0.80 | 1.94595 | 17.98 |
| 2 | 11.7461 | 2.50 | | |
| 3 | 0.0000 | 9.00 | 1.83481 | 42.71 |
| 4 | 0.0000 | 0.20 | | |
| *5 | 13.9344 | 2.60 | 1.77377 | 47.18 |
| 6 | −27.5986 | (d6) | | |
| 7 | −61.3807 | 0.90 | 1.82080 | 42.71 |

TABLE 3-continued

| *8 | 8.9234 | 1.40 | | |
|---|---|---|---|---|
| 9 | −12.0258 | 0.80 | 1.81600 | 46.62 |
| 10 | 11.6524 | 1.35 | 1.94595 | 17.98 |
| 11 | −97.7336 | (d11) | | |
| 12 | 0.0000 | 0.50 | Aperture Stop S | |
| *13 | 7.7058 | 1.50 | 1.68863 | 52.85 |
| 14 | −25.9720 | 0.15 | | |
| 15 | 13.8124 | 1.90 | 1.65160 | 58.55 |
| 16 | −4.5044 | 0.80 | 1.83481 | 42.71 |
| 17 | 9.1795 | (d17) | | |
| 18 | 10.2475 | 2.15 | 1.58913 | 61.16 |
| *19 | −10.8582 | 0.10 | | |
| 20 | 6.9779 | 2.15 | 1.48749 | 70.23 |
| 21 | −13.5284 | 0.80 | 1.79504 | 28.54 |
| 22 | 5.9758 | (d22) | | |
| 23 | 0.0000 | 0.65 | 1.54437 | 70.51 |
| 24 | 0.0000 | 0.40 | | |
| 25 | 0.0000 | 0.50 | 1.51633 | 64.14 |
| 26 | 0.0000 | (Bf) | | |

[Aspherical Data]

Surface Number: 5

κ = −1.5628
C4 = +5.9482E−5
C6 = −5.0922E−7
C8 = +3.3737E−9
C10 = −3.2731E−11

Surface Number: 8

κ = −9.0000
C4 = +1.6926E−3
C6 = −5.7910E−5
C8 = +6.6386E−7
C10 = +9.8033E−8

Surface Number: 13

κ = +0.4479
C4 = +1.1451E−4
C6 = +2.1327E−5
C8 = −1.1862E−6
C10 = +1.2675E−7

Surface Number: 19

κ = −9.0000
C4 = −5.6183E−4
C6 = +3.8657E−5
C8 = −1.1222E−6
C10 = +2.5253E−9

[Variable Distances]

|   | W | M | T |
|---|---|---|---|
| f | 6.4900 | 12.4198 | 18.3496 |
| d6 | 1.3281 | 5.1577 | 7.2028 |
| d11 | 6.9247 | 3.0950 | 1.0500 |
| d17 | 4.7633 | 2.4074 | 1.2377 |
| d22 | 5.7268 | 8.0827 | 9.2525 |
| Bf | 0.5998 | 0.5997 | 0.5997 |

[Values for Conditional Expressions]

(1): βbt × (1 − βat) = 1.03506
(2): fw/f3 = 0.42959
(3): f4/f3 = 0.85941
(4): ndp = 1.83481
(5): nd1 = 1.94595
(6): f1/(−f2) = 2.50823

Figure 13A:
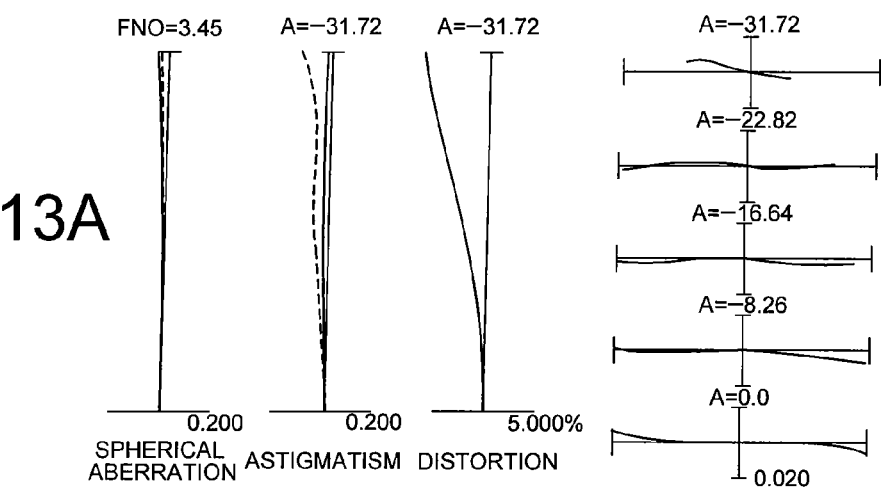
Figure 13B:
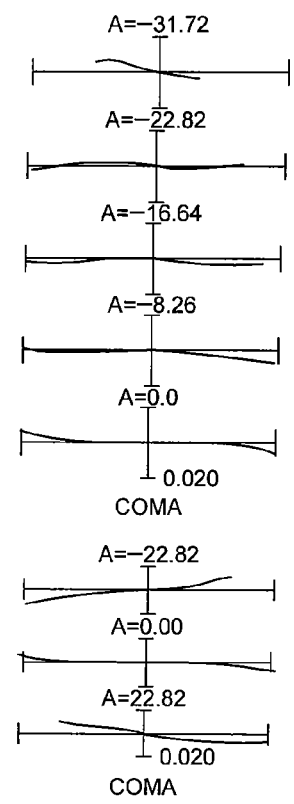
Figure 14A:
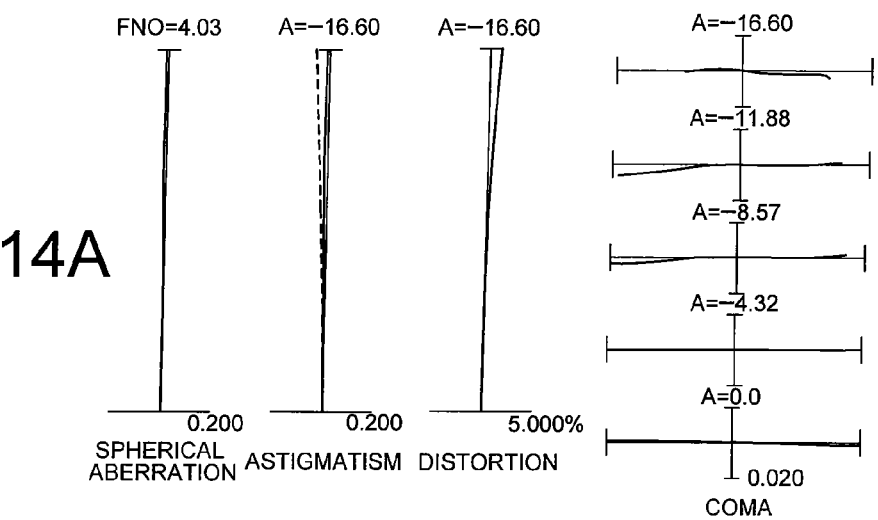
Figure 14B:
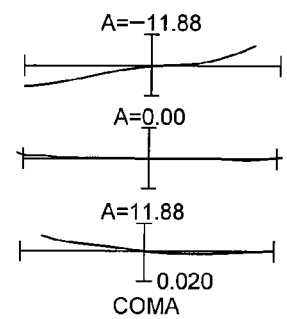

FIGS. 13A and 13B through FIGS. 15A and 15B are graphs showing various aberrations of the zoom lens system according to Example 3 of the first embodiment at d-line (λ=587.6 nm) upon focusing on infinity, in which FIG. 13A shows various aberrations in the wide-angle end state (f=6.49 mm) without a lens shift, and FIG. 13B shows coma in the wide-angle end state with a lens shift. FIG. 14A shows various aberrations in the intermediate focal length state (f=12.42 mm) without a lens shift, and FIG. 14B shows coma in the intermediate focal length state with a lens shift. FIG. 15A shows various aberrations in the telephoto end state (f=18.35 mm) without a lens shift, and FIG. 15B shows coma in the telephoto end state with a lens shift.

As is apparent from the respective graphs, the zoom lens system according to Example 3 shows superb optical performance as a result of good corrections to various aberrations from the wide-angle end state to the telephoto end state and even upon shifting the shift lens group.

Example 4

Figure 16:
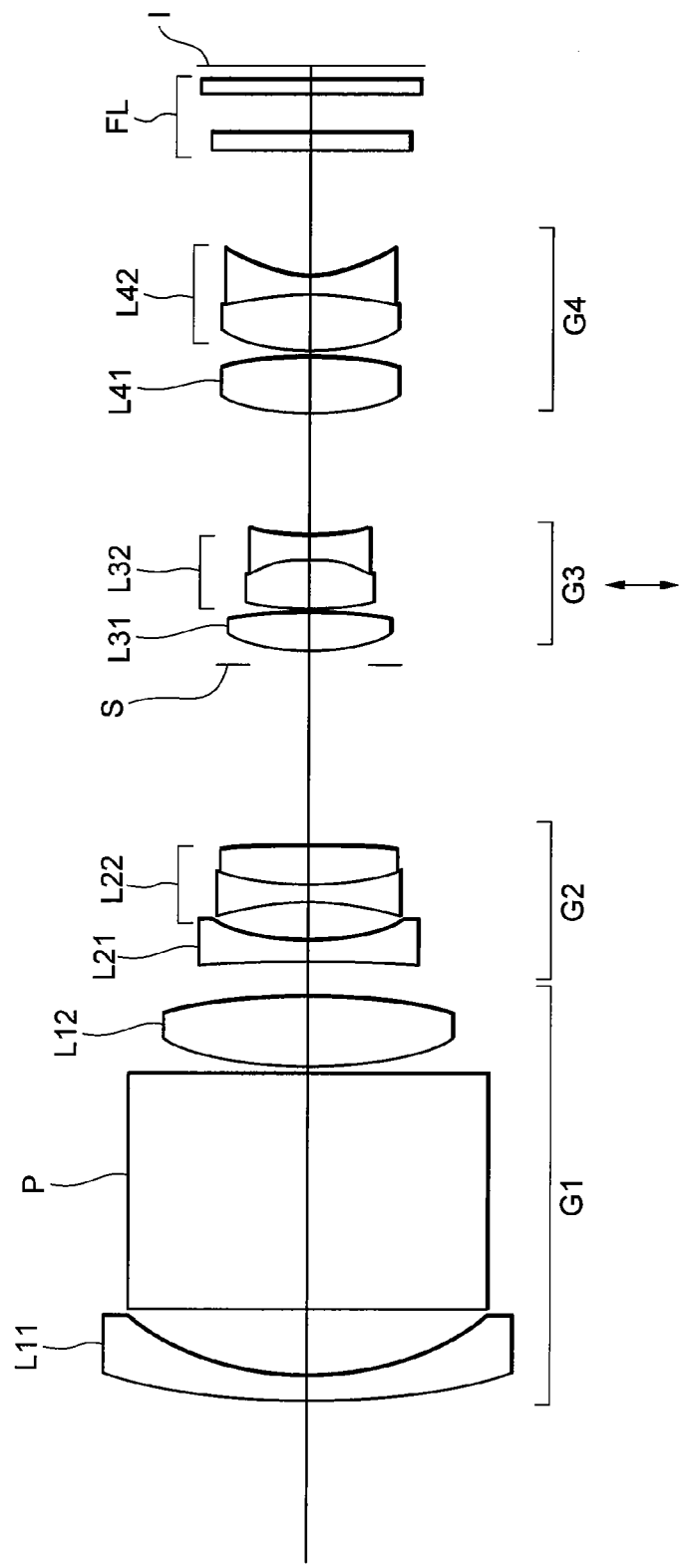
FIG. 16 is a diagram showing lens configuration of a zoom lens system according to Example 4 of the first embodiment extended along an optical axis.

FIG. 16 is diagram showing lens configuration of a zoom lens system according to Example 4 of the first embodiment extended along an optical axis.

In FIG. 16, the first lens group G1 is composed of, in order from the object along the optical axis, a negative meniscus lens L11 having a convex surface facing the object, a rectangular prism P for bending the optical path by substantially 90 degrees, and a double convex positive lens L12 having an aspherical surface facing the object.

The second lens group G2 is composed of, in order from the object along the optical axis, a double concave negative lens L21 having an aspherical surface facing the image plane I side, and a cemented negative lens L22 constructed by a double concave negative lens cemented with a double convex positive lens.

The third lens group G3 is composed of, in order from the object along the optical axis, a double convex positive lens L31 having an aspherical surface facing the object, and a cemented negative lens L32 constructed by a double convex positive lens cemented with a double concave negative lens. Vibration reduction is carried out by shifting the third lens group G3 in a direction perpendicular to the optical axis so as to shift the image on the image plane I upon generating a camera shake.

The fourth lens group G4 is composed of, in order from the object along the optical axis, a double convex positive lens L41 having an aspherical surface facing the image side, and a cemented negative lens L42 constructed by a double convex positive lens cemented with a double concave negative lens.

The filter group FL is composed of a low-pass filter, an infrared light blocking filter, and the like.

An aperture stop S is disposed to the most object side of the third lens group G3 and fixed with respect to the image plane I upon zooming from the wide-angle end state W to the telephoto end state T.

Various values associated with the zoom lens system according to Example 4 of the present application are listed in Table 4.

TABLE 4

[Specifications]

|  | W | M | T |
|---|---|---|---|
| f = | 6.49 | 12.42 | 18.35 |
| FNO = | 3.48 | 4.07 | 4.44 |
| 2ω = | 63.43 | 33.20 | 22.52 |

[Lens Data]

| N | r | d | nd | νd |
|---|---|---|---|---|
| 1 | 29.3816 | 0.85 | 1.94595 | 17.98 |
| 2 | 10.9980 | 2.45 | | |
| 3 | 0.0000 | 9.00 | 1.83481 | 42.71 |

TABLE 4-continued

| 4 | 0.0000 | 0.20 | | |
|---|---|---|---|---|
| *5 | 14.0983 | 2.60 | 1.77377 | 47.18 |
| 6 | −26.4642 | (d6) | | |
| 7 | −64.2210 | 0.90 | 1.82080 | 42.71 |
| *8 | 9.3699 | 1.40 | | |
| 9 | −12.3854 | 0.80 | 1.81600 | 46.62 |
| 10 | 10.6993 | 1.35 | 1.94595 | 17.98 |
| 11 | −299.4574 | (d11) | | |
| 12 | 0.0000 | 0.50 | Aperture Stop S | |
| *13 | 7.7797 | 1.45 | 1.68863 | 52.85 |
| 14 | −22.4777 | 0.20 | | |
| 15 | 14.8768 | 1.90 | 1.64000 | 60.09 |
| 16 | −4.8081 | 0.80 | 1.83481 | 42.71 |
| 17 | 9.2275 | (d17) | | |
| 18 | 9.8310 | 2.15 | 1.58913 | 61.16 |
| *19 | −11.1803 | 0.10 | | |
| 20 | 7.1100 | 2.15 | 1.48749 | 70.23 |
| 21 | −13.1759 | 0.80 | 1.79504 | 28.69 |
| 22 | 6.0262 | (d22) | | |
| 23 | 0.0000 | 0.65 | 1.54437 | 70.51 |
| 24 | 0.0000 | 1.40 | | |
| 25 | 0.0000 | 0.50 | 1.51633 | 64.14 |
| 26 | 0.0000 | (Bf) | | |

[Aspherical Data]

Surface Number: 5

$\kappa = -1.5628$
$C4 = +5.9061E-5$
$C6 = -4.2880E-7$
$C8 = +6.8266E-10$
$C10 = +2.1560E-11$ Surface Number: 8

$\kappa = -9.0000$
$C4 = +1.4768E-3$
$C6 = -4.2970E-5$
$C8 = +3.4527E-7$
$C10 = +8.8838E-8$ Surface Number: 13

$\kappa = +0.4479$
$C4 = +4.1008E-5$
$C6 = +2.5708E-5$
$C8 = -2.5079E-6$
$C10 = +1.8686E-7$ Surface Number: 19

$\kappa = -9.0000$
$C4 = -4.8117E-4$
$C6 = +3.5584E-5$
$C8 = -1.1993E-6$
$C10 = +1.2638E-8$

[Variable Distances]

|  | W | M | T |
|---|---|---|---|
| f | 6.4900 | 12.4198 | 18.3496 |
| d6 | 1.3281 | 5.1578 | 7.2028 |
| d11 | 7.0747 | 3.2450 | 1.2000 |
| d17 | 4.7632 | 2.4074 | 1.2377 |
| d22 | 4.6997 | 7.0555 | 8.2252 |
| Bf | 0.5997 | 0.5997 | 0.5997 |

[Values for Conditional Expressions]

(1): $\beta bt \times (1 - \beta at) = 1.03477$
(2): fw/f3 = 0.42960
(3): f4/f3 = 0.85941
(4): ndp = 1.83481
(5): nd1 = 1.94595
(6): f1/(−f2) = 2.50823

Figure 17A:
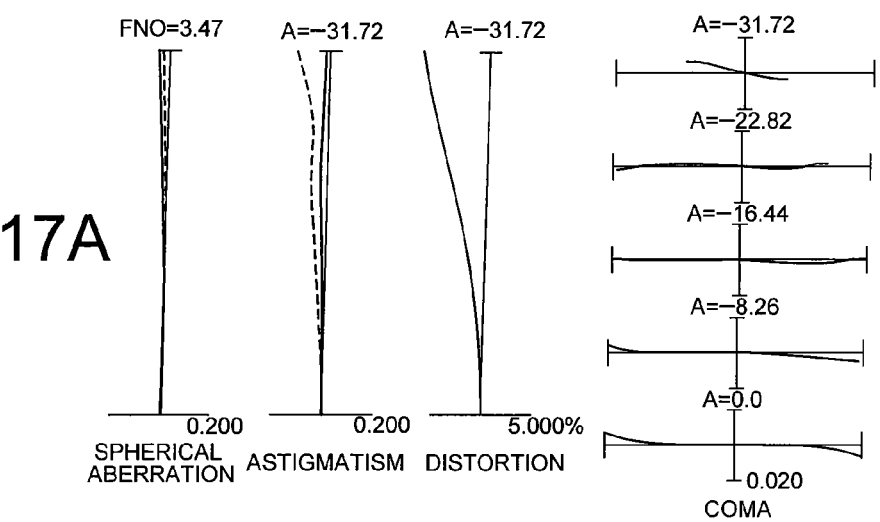
Figure 17B:
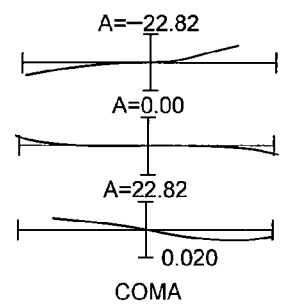
Figure 18A:
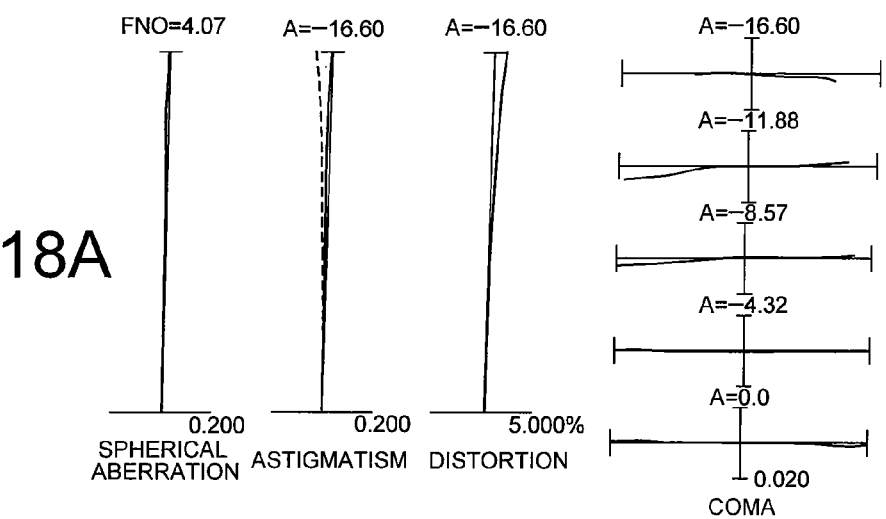
Figure 18B:
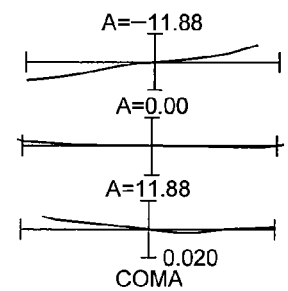
Figure 19A:
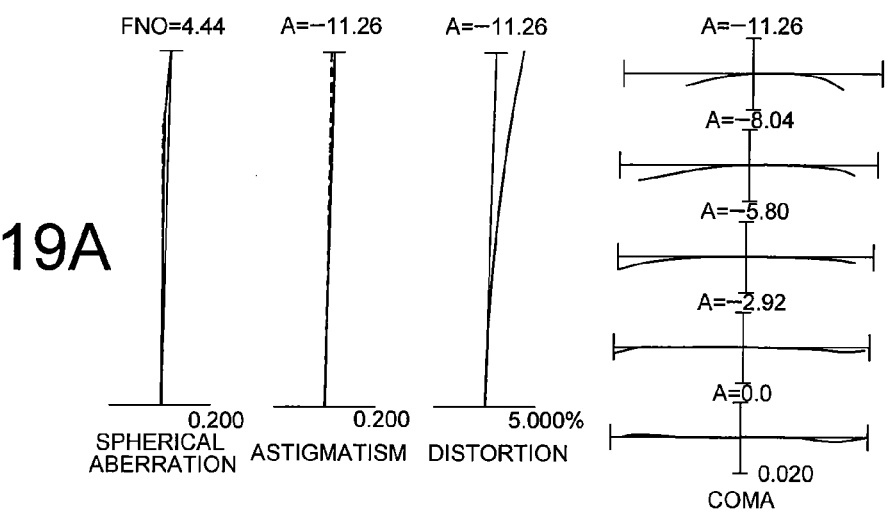
Figure 19B:
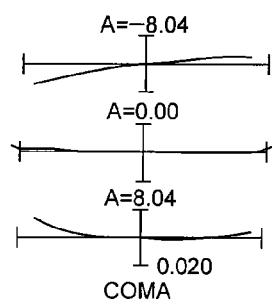

FIGS. 17A and 17B through FIGS. 19A and 19B are graphs showing various aberrations of the zoom lens system according to Example 4 of the first embodiment at d-line (λ=587.6 nm) upon focusing on infinity, in which FIG. 17A shows various aberrations in the wide-angle end state (f=6.49 mm) without a lens shift, and FIG. 17B shows coma in the wide-angle end state with a lens shift. FIG. 18A shows various aberrations in the intermediate focal length state (f=12.42 mm) without a lens shift, and FIG. 18B shows coma in the intermediate focal length state with a lens shift. FIG. 19A shows various aberrations in the telephoto end state (f=18.35 mm) without a lens shift, and FIG. 19B shows coma in the telephoto end state with a lens shift.

As is apparent from the respective graphs, the zoom lens system according to Example 4 shows superb optical performance as a result of good corrections to various aberrations from the wide-angle end state to the telephoto end state and even upon shifting the shift lens group.

SECOND EMBODIMENT

A zoom lens system according to a second embodiment of the present application includes, in order from an object along an optical path, a first lens group having positive refractive power and an optical path bending element, a second lens group having negative refractive power, a third lens group having positive refractive power, and a fourth lens group having positive refractive power. Upon varying a focal length from a wide-angle end state to a telephoto end state, the first lens group and the third lens group are fixed with respect to an image plane, a distance between the first lens group and the second lens group increases, a distance between the second lens group and third lens group decreases, and a distance between the third lens group and the fourth lens group decreases.

The first lens group has a function of bending the optical path by substantially 90 degrees and a function of converging a light flux. Upon varying a focal length from the wide-angle end state to the telephoto end state, the first lens group is always fixed. Accordingly, by fixing the largest and heaviest lens group in respective lens groups composing the zoom lens system, it becomes possible to simplify the construction.

The second lens group has a function of enlarging the object image formed by the first lens group. As a state of lens group positions varies from the wide-angle end state to the telephoto end state, the distance between the first lens group and the second lens group is made to be wider, so that an enlargement ratio is increased, and a focal length is varied.

The third lens group has a function of converging the light flux expanded by the second lens group. In order to accomplish high optical performance, the third lens group is constructed by a plurality of lenses, so that the third lens group is in a state spherical aberration, sine condition and Petzval sum are excellently corrected.

The fourth lens group has a function of further converging the light flux converged by the third lens group. Upon varying a focal length from the wide-angle end state to the telephoto end state variation in the image plane with respect to variation in the focal length can be suppressed by aggressively varying the distance between the third lens group and the fourth lens group.

With constructing the zoom lens system as described above, it becomes possible to accomplish a compact zoom lens system having excellent optical performance.

In a zoom lens system according to the first embodiment of the present application, in order to make the zoom lens system compact, it is preferable that the first lens group includes a negative lens, and the negative lens satisfies the following conditional expression (5):

$$1.900 < nd1 \quad (5)$$

where nd1 denotes a refractive index of the negative lens in the first lens group at d-line (wavelength λ=587.6 nm).

Conditional expression (5) defines a refractive index of the negative lens in the first lens group. However, it has been explained before, so that duplicated explanations are omitted.

In a zoom lens system according to the second embodiment, in order to make the system compact, the negative lens in the first lens group is preferably satisfied the following conditional expression (7):

$$21.00 < vd1 \quad (7)$$

where vd1 denotes an Abbe number of the negative lens in the first lens group.

Conditional expression (7) defines an Abbe number of the negative lens in the first lens group. When the value exceeds the upper limit of conditional expression (7), chromatic aberration generated independently in the first lens group becomes too large to be excellently corrected.

In order to secure the effect of the present application, it is preferable to set the upper limit of conditional expression (7) to 20.50 or 20.30. In order to further secure the effect of the present application, it is most preferable to set the upper limit of conditional expression (7) to 20.00.

In a zoom lens system according to the second embodiment of the present application, it is preferable that the third lens group excellently corrects spherical aberration produced independently in the third lens group, and is composed of a positive single lens and a cemented negative lens in order to make a position of the exit pupil further away from the image plane, so that the third lens group is preferably composed of, in order from the object along the optical axis, a positive lens having a convex surface facing the object, and a cemented negative lens constructed by a positive lens having a convex surface facing the object cemented with a negative lens having a concave surface facing the image.

With composing the third lens group as described above, off-axis light flux is converged and not left from the optical axis by the positive lens having a convex surface facing the object, so that the diameter of the lens can be small.

In a zoom lens system according to the second embodiment of the present application, it is preferable that the fourth lens group excellently corrects spherical aberration produced independently in the fourth lens group, and is composed of a positive single lens and a cemented negative lens in order to make a position of the exit pupil further away from the image plane, so that the fourth lens group is preferably composed of, in order from the object along the optical axis, a positive lens having a convex surface facing the object, and a cemented negative lens constructed by a positive lens having a convex surface facing the object cemented with a negative lens having a concave surface facing the image.

With composing the fourth lens group as described above, off-axis light flux is converged and not left from the optical axis by the positive lens having a convex surface facing the object, so that the diameter of the lens can be compact. Moreover, with having positive refractive power in the fourth lens group as a whole, it becomes possible to make the position of the exit pupil away from the image plane, so that it is suitable for an optical system using a solid-state imaging device as a light-sensitive element.

In a zoom lens system according to the second embodiment of the present application, the following conditional expression (3) is preferably satisfied:

$$0.5 < f4/f3 < 1.1 \quad (3)$$

where f3 denotes a focal length of the third lens group, and f4 denotes a focal length of the fourth lend group.

Conditional expression (3) defines an appropriate range of a ratio of the focal length of the fourth lens group to that of the third lens group.

However, conditional expression (3) has been explained before, so that duplicated explanations are omitted.

In a zoom lens system according to the second embodiment of the present application, in order to balance high optical performance with compactness, the negative lens in the first lens group is preferably a negative meniscus lens having a convex surface facing the object, so that the first lens group is preferably composed of, in order from the object along the optical axis, a negative meniscus lens, an optical path bending element, and a positive lens having a convex surface facing the object.

With composing the first lens group as described above, the first lens group can be structurally simple, so that it becomes possible to excellently correct spherical aberration and coma generated independently in the first lens group by the minimum number of elements.

In a zoom lens system according to the second embodiment of the present application, the optical path bending element is a rectangular prism, and the following conditional expression (4) is preferably satisfied:

$$1.800 < ndp \tag{4}$$

where ndp denotes a refractive index of the rectangular prism.

Conditional expression (4) defines an appropriate range of a refractive index of the rectangular prism for bending the optical path. However, conditional expression (4) has been explained before, so that duplicated explanations are omitted.

In a zoom lens system according to the second embodiment of the present application, the first lens group preferably includes at least one aspherical lens. With disposing an aspherical lens in the first lens group, variations in coma and astigmatism generated upon varying a focal length from the wide-angle end state to the telephoto end state can be excellently corrected. Moreover, it contributes to make the lens diameter of the first lens group compact.

In a zoom lens system according to the second embodiment of the present application, in order to balance high optical performance with compactness, the second lens group is preferably composed of, in order from the object along the optical axis, a negative lens having a concave surface facing the image, and a cemented negative lens constructed by a negative lens having a concave surface facing the object cemented with a positive lens.

With constructing the second lens group as described above, coma and lateral chromatic aberration generated independently in the second lens group can be excellently corrected by the simple construction.

In a zoom lens system according to the second embodiment of the present application, in order to obtain further higher optical performance, it is preferable that at least one aspherical lens is disposed in the second lens group. With disposing an aspherical lens in the second lens group, variation in coma generated upon varying a focal length from the wide-angle end state to the telephoto end state can be excellently corrected.

In a zoom lens system according to the second embodiment of the present application, focusing from infinity to a close object is preferably carried out by moving the second lens group along the optical axis. In a zoom lens system according to the present application, although the distance between the first lens group and the second lens group becomes small in the wide-angle end state, since the moving amount of the second lens group for focusing is extremely small, it becomes possible to prevent the lens or mechanical parts for holding the lens from interfering with each other. Over entire focal length range from the wide-angle end state to the telephoto end state, it becomes possible to secure the moving amount of the second lens group, so that so-called macro photography can be performed.

On the other hand, focusing from infinity to a close object may be carried out by moving the fourth lens group. However, since the fourth lens group and the third lens group become close in the telephoto end state, it becomes difficult to secure a sufficient moving amount. Moreover, when the distance between the third lens group and the fourth lens group is widened in the telephoto end state, deterioration in spherical aberration and curvature of field becomes large, so that it is undesirable.

In a zoom lens system according to the second embodiment of the present application, the following conditional expression (8) is preferably satisfied:

$$0.8 < (-f2)/fw < 1.3 \tag{8}$$

where f2 denotes a focal length of the second lens group, fw denotes a focal length of the zoom lens system in the wide-angle end state.

Conditional expression (8) defines an appropriate range of the focal length of the second lens group.

When the value exceeds the upper limit of conditional expression (8), refractive power of the second lens group becomes strong, coma generated independently in the second lens group becomes too large, and variation in optical performance upon focusing on a close object becomes large, so that it is undesirable. As a result, it becomes difficult to shorten the minimum shooting distance.

When the value falls below the lower limit of conditional expression (8), refractive power of the second lens group becomes weak, a moving amount for focusing becomes large, mechanical parts of driving mechanism necessary upon moving becomes large, so that there is a danger to interfere with other parts. Moreover, when the system is tried to be compact, spherical aberration becomes worse. Accordingly, it becomes difficult to save a space upon installing in a camera.

In order to secure the effect of the present application, it is preferable to set the upper limit of conditional expression (8) to 1.25. In order to further secure the effect of the present application, it is most preferable to set the upper limit of conditional expression (8) to 1.20. In order to secure the effect of the present application, it is preferable to set the lower limit of conditional expression (8) to 0.85. In order to further secure the effect of the present application, it is most preferable to set the lower limit of conditional expression (8) to 0.90.

In a zoom lens system according to the second embodiment of the present application, the following conditional expression (6) is preferably satisfied:

$$1.5 < f1/(-f2) < 4.0 \tag{6}$$

where f1 denotes a focal length of the first lens group, and f2 denotes a focal length of the second lens group.

Conditional expression (6) defines an appropriate range of a ratio of the focal length of the first lens group to that of the second lens group. However, it has been explained above, so that duplicated explanations are omitted.

In a zoom lens system according to the second embodiment of the present application, in order to pursue higher optical performance, at least one aspherical lens is preferably disposed in the third lens group. With disposing an aspherical lens in the third lens group, variations in spherical aberration and coma generated upon varying a focal length from the wide-angle end state to the telephoto end state can excellently be corrected.

In a zoom lens system according to the second embodiment of the present application, in order to pursue higher optical performance, at least one aspherical lens is preferably disposed in the fourth lens group. With disposing an aspherical lens in the fourth lens group, variation in curvature of field generated upon varying a focal length from the wide-angle end state to the telephoto end state can excellently be corrected.

A method for varying a focal length of a zoom lens system according to a second embodiment of the present application preferably comprises steps of:

providing the zoom lens system comprising, in order from an object along an optical axis, a first lens group having positive refractive power and an optical path bending element, a second lens group having negative refractive power, a third lens group having positive refractive power, and a fourth lens group having positive refractive power, the first lens group including at least one negative lens, the negative lens satisfying the following conditional expression (5):

$$1.900 < nd1 \qquad (5)$$

where nd1 denotes a refractive index of the negative lens at d-line (wavelength λ=587.6 nm); and moving the second lens group and the fourth lens group along the optical axis such that upon varying a focal length from a wide-angle end state to a telephoto end state, the first lens group and the third lens group are fixed with respect to the image plane, a distance between the first lens group and the second lens group increases, a distance between the second lens group and the third lens group decreases, and a distance between the third lens group and the fourth lens group decreases.

With adopting the method for varying a focal length as described above, the number of movable lens groups can be fewer, so that driving mechanism can be simple.

A method for focusing a zoom lens system according to a second embodiment of the present application comprises steps of:

providing the zoom lens system comprising, in order from an object along an optical axis, a first lens group having positive refractive power and an optical path bending element, a second lens group having negative refractive power, a third lens group having positive refractive power, and a fourth lens group having positive refractive power, upon varying a focal length from a wide-angle end state to a telephoto end state, the first lens group and the third lens group being fixed with respect to the image plane, a distance between the first lens group and the second lens group increasing, a distance between the second lens group and the third lens group decreasing, and a distance between the third lens group and the fourth lens group decreasing, the first lens group including at least one negative lens, and the negative lens satisfying the following conditional expression:

$$1.900 < nd1$$

where nd1 denotes a refractive index of the negative lens at d-line (wavelength λ=587.6 nm); and moving the second lens group along the optical axis to the object side to carry out focusing from infinity to a close object.

With adopting the method for focusing as described above, since the second lens group, whose amount of moving upon focusing is small, is used, it becomes possible to prevent the lens or mechanical parts for holding lenses from interfering with each other, and over entire focal length range from the wide-angle end state to the telephoto end state, it becomes possible to secure the moving amount of the second lens group, so that so-called macro photography can be performed.

In a zoom lens system according to the second embodiment of the present application, in order to prevent a failure in taking a picture by an image blur caused by a camera shake liable to happen to a high zoom ratio zoom lens, a camera shake detector for detecting a camera shake and a driver is combined to the zoom lens system, a lens group or a portion of a lens group composing the zoom lens system is decentered with respect to the optical axis as a shift lens group, the driver drives the shift lens group so as to correct an image blur (variation in the image position) caused by a camera shake detected by the camera shake detector, and the image on the image plane is shifted, so that the image blur can be corrected. As described above, a zoom lens system according to the present application can function as a so-called vibration reduction optical system.

Examples

A zoom lens system according to each example of the second embodiment of the present application is explained below with reference to accompanying drawings.

FIG. 3 is a diagram showing power distribution of the zoom lens system according to an embodiment of the present application together with a zoom trajectory of each lens group upon varying a focal length from a wide-angle end state (W) to a telephoto end state (T). As shown in FIG. 3, a zoom lens system according to each example of the present application is composed of, in order from an object along an optical axis, a first lens group G1 having positive refractive power, a second lens group G2 having negative refractive power, a third lens group G3 having positive refractive power, a fourth lens group G4 having positive refractive power, and a filter group FL composed of a low-pass filter, a infrared light blocking filter, and the like. Upon varying a focal length from a wide-angle end state W to a telephoto end state T, which is so-called zooming, the first lens group G1 and the third lens group G3 are fixed with respect to an image plane I, a distance between the first lens group G1 and the second lens group G2 increases, a distance between the second lens group G2 and the third lens group G3 decreases, and a distance between the third lens group G3 and the fourth lens group G4 decreases.

Example 5

Figure 20:
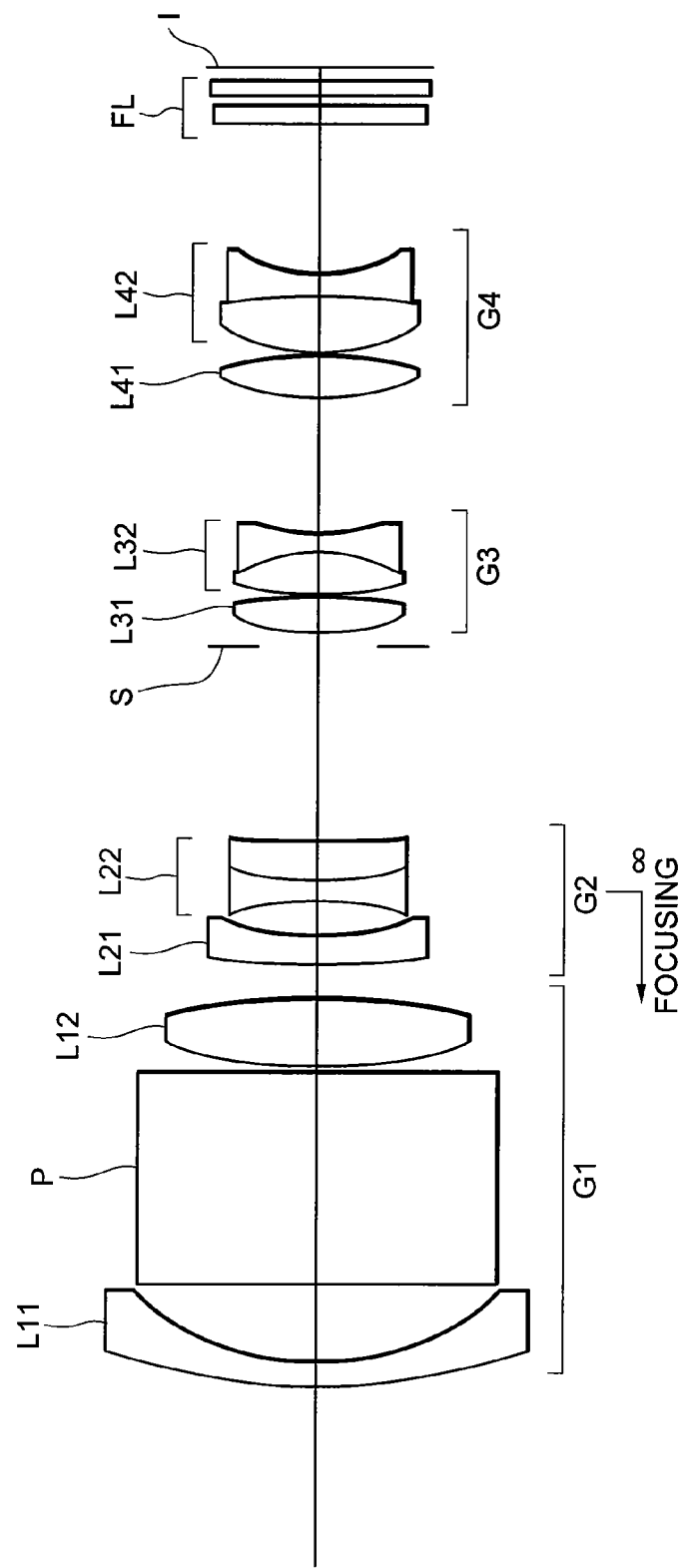
FIG. 20 is a diagram showing lens configuration of a zoom lens system according to Example 5 of a second embodiment extended along an optical axis.

FIG. 20 is diagram showing lens configuration of a zoom lens system according to Example 5 of a second embodiment extended along an optical axis.

In FIG. 20, the first lens group G1 is composed of, in order from the object along the optical axis, a negative meniscus lens L11 having a convex surface facing the object, a rectangular prism P for bending the optical path by substantially 90 degrees, and a double convex positive lens L12 having an aspherical surface facing the object.

The second lens group G2 is composed of, in order from the object along the optical axis, a negative meniscus lens L21 having a convex surface facing the object and an aspherical surface facing the image plane I side, and a cemented negative lens L22 constructed by a double concave negative lens cemented with a positive meniscus lens having a convex surface facing the object.

The third lens group G3 is composed of, in order from the object along the optical axis, a double convex positive lens L31 having an aspherical surface facing the object, and a cemented negative lens L32 constructed by a double convex positive lens cemented with a double concave negative lens.

The fourth lens group G4 is composed of, in order from the object along the optical axis, a double convex positive lens L41 having an aspherical surface facing the image side, and a cemented negative lens L42 constructed by a double convex positive lens cemented with a double concave negative lens.

Focusing from infinity to a close object is carried out by moving the second lens group along the optical axis to the object.

The filter group FL is composed of a low-pass filter, an infrared light blocking filter, and the like.

The image plane I is formed on an imaging device, which is unillustrated. The imaging device is constructed by a CCD, or a CMOS (the same is applied to the following each Example).

An aperture stop S is disposed between the second lens group G2 and the third lens group G3, and fixed with respect to the image plane I upon zooming from the wide-angle end state W to the telephoto end state T.

Various values associated with the zoom lens system according to Example 5 of the present application are listed in Table 5.

TABLE 5

[Specifications]

|   | W | M | T |
|---|---|---|---|
| f = | 6.49 | 13.00 | 18.35 |
| FNO = | 3.23 | 3.88 | 4.36 |
| 2ω= | 63.45 | 31.73 | 22.52 |

[Lens Data]

| N | r | d | nd | νd |
|---|---|---|---|---|
| 1 | 25.0000 | 0.80 | 1.92286 | 18.90 |
| 2 | 10.1687 | 2.92 | | |
| 3 | 0.0000 | 8.00 | 1.83481 | 42.71 |
| 4 | 0.0000 | 0.20 | | |
| *5 | 16.5591 | 2.59 | 1.77377 | 47.18 |
| 6 | −26.6813 | (d6) | | |
| 7 | 43.1399 | 1.00 | 1.80610 | 40.88 |
| *8 | 9.6052 | 1.42 | | |
| 9 | −10.6311 | 0.70 | 1.78800 | 47.37 |
| 10 | 9.2523 | 1.54 | 1.92286 | 18.90 |
| 11 | 139.6780 | (d11) | | |
| 12 | 0.0000 | 0.50 | Aperture Stop S | |
| *13 | 7.9234 | 1.32 | 1.69350 | 53.20 |
| 14 | −27.4529 | 0.20 | | |
| 15 | 11.7142 | 1.57 | 1.65160 | 58.55 |
| 16 | −6.2105 | 0.70 | 1.83481 | 42.71 |
| 17 | 7.4146 | (d17) | | |
| 18 | 10.0252 | 1.55 | 1.58913 | 61.16 |
| *19 | −11.6786 | 0.10 | | |
| 20 | 6.5080 | 2.28 | 1.48749 | 70.23 |
| 21 | −18.1248 | 0.75 | 1.79504 | 28.54 |
| 22 | 5.7167 | (d22) | | |
| 23 | 0.0000 | 0.65 | 1.54437 | 70.51 |
| 24 | 0.0000 | 0.40 | | |
| 25 | 0.0000 | 0.50 | 1.51633 | 64.14 |
| 26 | 0.0000 | (Bf) | | |

[Aspherical Data]

Surface Number: 5

$\kappa = -1.4495$
$C4 = +4.2291E-5$
$C6 = -1.2508E-7$
$C8 = +3.0136E-9$
$C10 = -4.1299E-11$ TABLE 5-continued Surface Number: 8

$\kappa = -9.0000$
$C4 = +1.4000E-3$
$C6 = -3.9508E-5$
$C8 = +1.3308E-6$
$C10 = -4.6579E-9$ Surface Number: 13

$\kappa = +0.3527$
$C4 = +1.7586E-5$
$C6 = +1.2242E-5$
$C8 = -8.6518E-7$
$C10 = +5.7865E-8$ Surface Number: 19

$\kappa = +5.6263$
$C4 = +7.1091E-4$
$C6 = +1.4030E-5$
$C8 = -1.5418E-7$
$C10 = +2.2411E-8$

[Variable Distances]

|   | W | M | T |
|---|---|---|---|
| f | 6.4900 | 13.0000 | 18.3500 |
| d6 | 1.3806 | 6.0114 | 7.8333 |
| d11 | 7.5027 | 2.8719 | 1.0500 |
| d17 | 5.2220 | 2.5639 | 1.1150 |
| d22 | 5.6760 | 8.3341 | 9.7830 |
| Bf | 0.5900 | 0.5900 | 0.5900 |

[Values for Conditional Expressions]

(3): f4/f3 = 0.74169
(4): ndp = 1.83481
(5): nd1 = 1.92286
(6): f1/(−f2) = 2.65137
(7): νd1 = 18.90
(8): (−f2)/fw = 1.13206

Figure 21A:
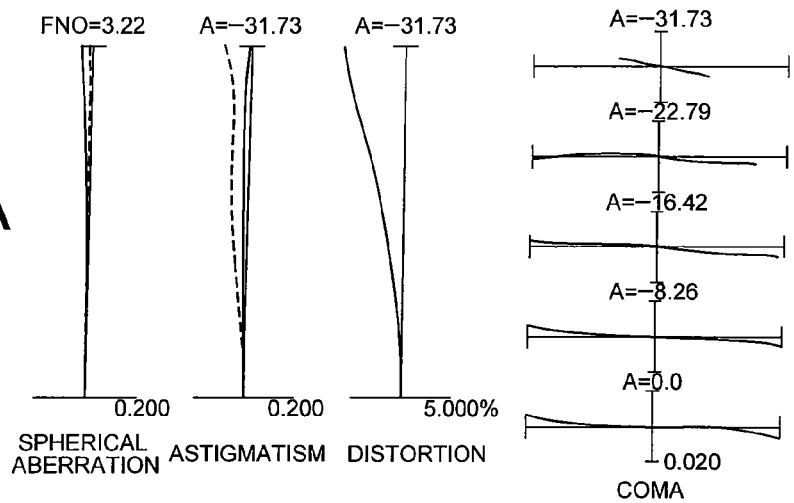
Figure 21B:
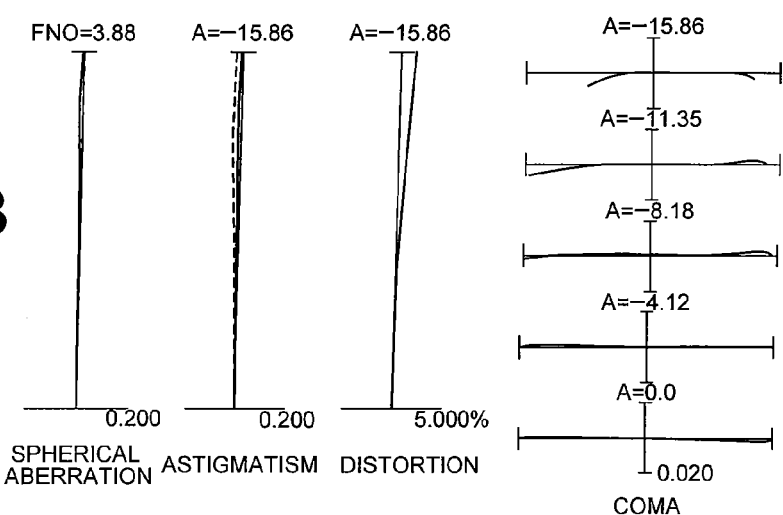
Figure 21C:
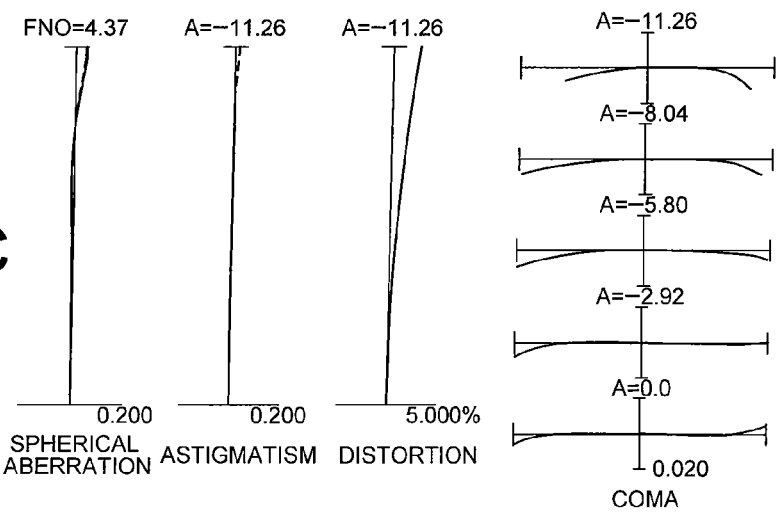

FIGS. 21A, 21B and 21C are graphs showing various aberrations of the zoom lens system according to Example 5 of the second embodiment at d-line (λ=587.6 nm) upon focusing on infinity, in which FIG. 21A shows in the wide-angle end state (f=6.49 mm), FIG. 21B shows in the intermediate focal length state (f=13.00 mm), and FIG. 21C shows in the telephoto end state (f=18.35 mm).

As is apparent from the respective graphs, the zoom lens system according to Example 5 shows superb optical performance as a result of good corrections to various aberrations from the wide-angle end state to the telephoto end state.

Example 6

Figure 22:
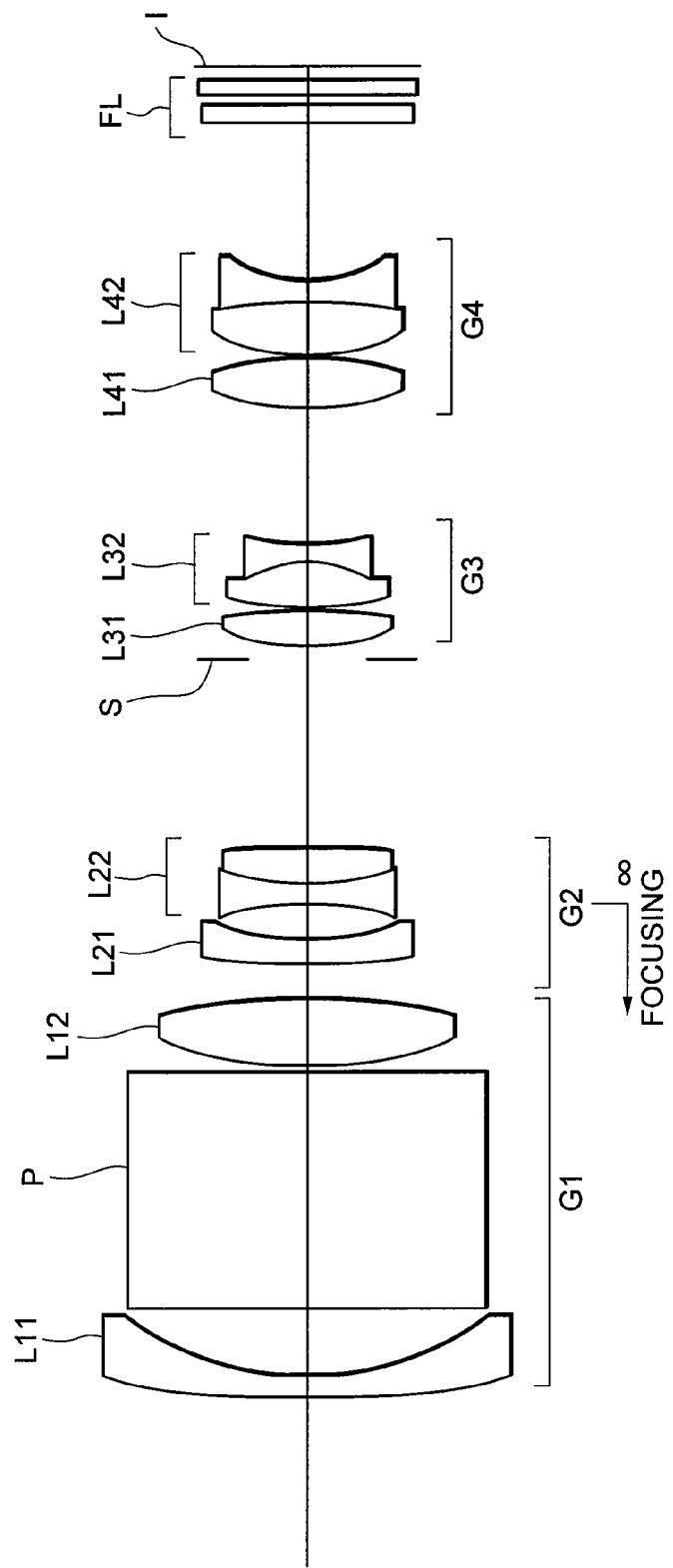
FIG. 22 is a diagram showing lens configuration of a zoom lens system according to Example 6 of the second embodiment extended along an optical axis.

FIG. 22 is diagram showing lens configuration of a zoom lens system according to Example 6 of the second embodiment extended along an optical axis.

In FIG. 22, the first lens group G1 is composed of, in order from the object along the optical axis, a negative meniscus lens L11 having a convex surface facing the object, a rectangular prism P for bending the optical path by substantially 90 degrees, and a double convex positive lens L12 having an aspherical surface facing the object.

The second lens group G2 is composed of, in order from the object along the optical axis, a negative meniscus lens L21 having a convex surface facing the object and an aspherical surface facing the image plane I side, and a cemented negative lens L22 constructed by a double concave negative lens cemented with a double convex positive lens.

The third lens group G3 is composed of, in order from the object along the optical axis, a double convex positive lens L31 having an aspherical surface facing the object, and a cemented negative lens L32 constructed by a double convex positive lens cemented with a double concave negative lens.

The fourth lens group G4 is composed of, in order from the object along the optical axis, a double convex positive lens L41 having an aspherical surface facing the image side, and a cemented negative lens L42 constructed by a double convex positive lens cemented with a double concave negative lens.

Focusing from infinity to a close object is carried out by moving the second lens group along the optical axis to the object.

The filter group FL is composed of a low-pass filter, an infrared light blocking filter, and the like.

An aperture stop S is disposed between the second lens group G2 and the third lens group G3, and fixed with respect to the image plane I upon zooming from the wide-angle end state W to the telephoto end state T.

Various values associated with the zoom lens system according to Example 6 of the present application are listed in Table 6.

TABLE 6

[Specifications]

|  | W | M | T |
|---|---|---|---|
| f = | 6.49 | 12.42 | 18.35 |
| FNO = | 3.29 | 3.89 | 4.40 |
| 2ω= | 63.45 | 33.16 | 22.52 |

[Lens Data]

| N | r | d | nd | νd |
|---|---|---|---|---|
| 1 | 37.3815 | 0.80 | 1.92286 | 18.90 |
| 2 | 11.4743 | 2.50 | | |
| 3 | 0.0000 | 9.00 | 1.80420 | 46.50 |
| 4 | 0.0000 | 0.20 | | |
| *5 | 15.6194 | 2.52 | 1.77377 | 47.18 |
| 6 | −26.0835 | (d6) | | |
| 7 | 33.9415 | 0.90 | 1.82080 | 42.71 |
| *8 | 8.3923 | 1.47 | | |
| 9 | −9.3559 | 0.70 | 1.80400 | 46.57 |
| 10 | 10.5119 | 1.31 | 1.92286 | 18.90 |
| 11 | −104.7189 | (d11) | | |
| 12 | 0.0000 | 0.50 | Aperture Stop S | |
| *13 | 7.2921 | 1.40 | 1.69350 | 53.20 |
| 14 | −24.0200 | 0.15 | | |
| 15 | 12.7408 | 1.68 | 1.65160 | 58.55 |
| 16 | −4.9883 | 0.70 | 1.83481 | 42.71 |
| 17 | 7.2495 | (d17) | | |
| 18 | 9.8677 | 1.86 | 1.58913 | 61.16 |
| *19 | −11.3223 | 0.10 | | |
| 20 | 7.1768 | 2.06 | 1.49700 | 81.54 |
| 21 | −21.5501 | 0.80 | 1.79504 | 28.54 |
| 22 | 5.9728 | (d22) | | |
| 23 | 0.0000 | 0.65 | 1.54437 | 70.51 |
| 24 | 0.0000 | 0.40 | | |
| 25 | 0.0000 | 0.50 | 1.51633 | 64.14 |
| 26 | 0.0000 | (Bf) | | |

[Aspherical Data]

Surface Number: 5

$\kappa = -1.2861$
C4 = +2.7530E−5
C6 = −1.9665E−7
C8 = +6.3806E−10
C10 = −1.9119E−12
Surface Number: 8

$\kappa = -9.0000$
C4 = +2.0979E−3
C6 = −9.3712E−5

TABLE 6-continued

C8 = +4.3205E−6
C10 = −6.7633E−8
Surface Number: 13

$\kappa = +0.4009$
C4 = +7.1395E−5
C6 = +1.4244E−5
C8 = −4.5095E−7
C10 = +6.1718E−8
Surface Number: 19

$\kappa = -9.0000$
C4 = −4.4999E−4
C6 = +3.2020E−5
C8 = −1.0016E−6
C10 = +1.0650E−8

[Variable Distances]

|  | W | M | T |
|---|---|---|---|
| f | 6.4900 | 12.4200 | 18.3500 |
| d6 | 1.3518 | 5.5097 | 7.5388 |
| d11 | 7.2370 | 3.0791 | 1.0500 |
| d17 | 5.2070 | 2.6787 | 1.1000 |
| d22 | 5.8964 | 8.4247 | 10.0034 |
| Bf | 0.6000 | 0.6000 | 0.6000 |

[Values for Conditional Expressions]

(3): f4/f3 = 0.77620
(4): ndp = 1.80420
(5): nd1 = 1.92286
(6): f1/(−f2) = 2.52762
(7): νd1 = 18.90
(8): (−f2)/fw = 1.08310

Figure 23A:
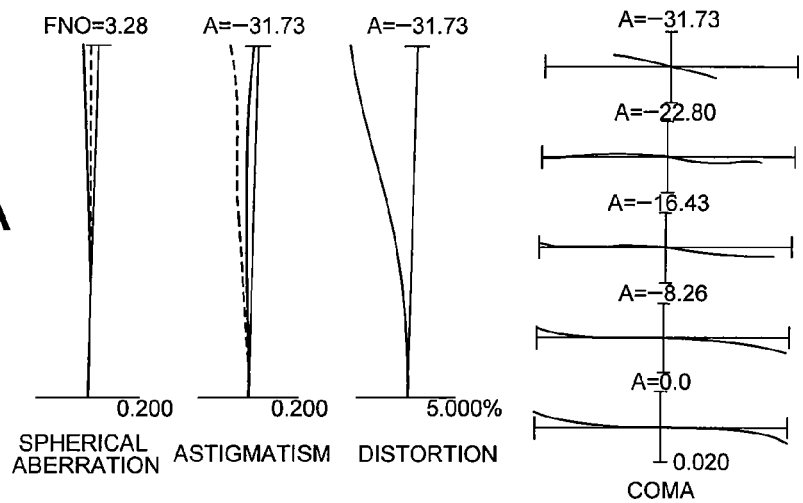
Figure 23B:
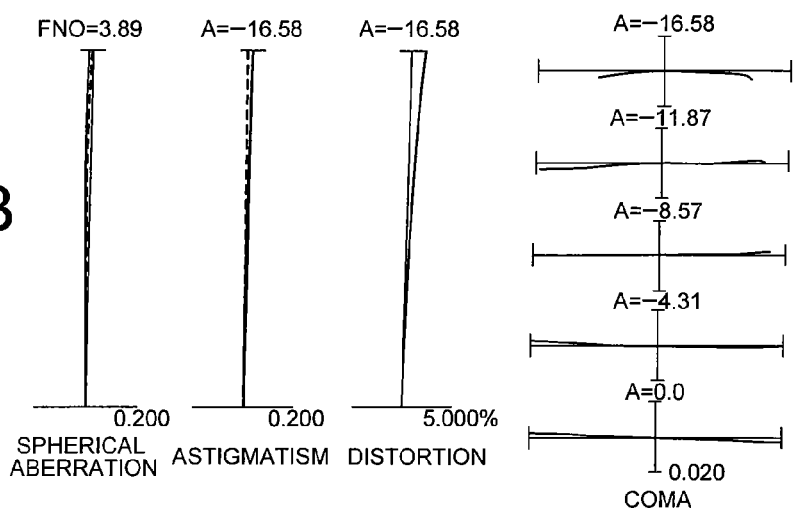
Figure 23C:
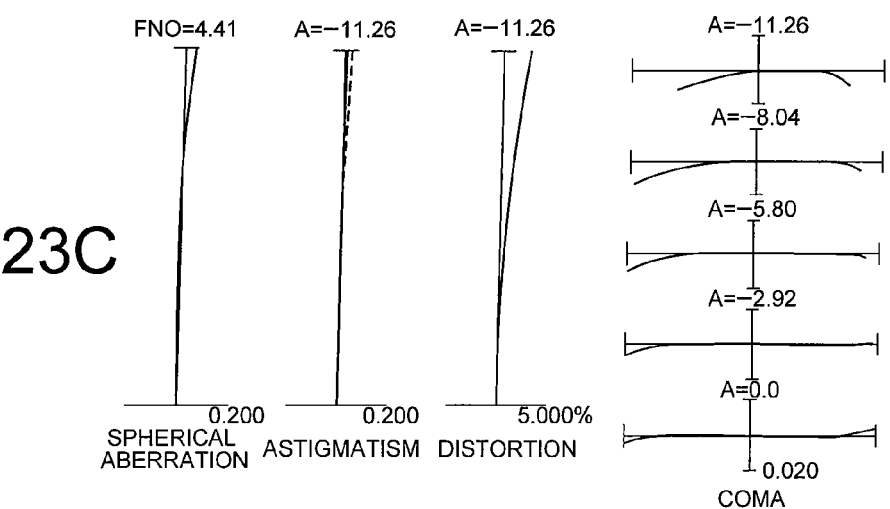

FIGS. 23A, 23B and 23C are graphs showing various aberrations of the zoom lens system according to Example 6 of the second embodiment at d-line (λ=587.6 nm) upon focusing on infinity, in which FIG. 23A shows in the wide-angle end state (f=6.49 mm), FIG. 23B shows in the intermediate focal length state (f=12.42 mm), and FIG. 23C shows in the telephoto end state (f=18.35 mm).

As is apparent from the respective graphs, the zoom lens system according to Example 6 shows superb optical performance as a result of good corrections to various aberrations from the wide-angle end state to the telephoto end state.

Example 7

Figure 24:
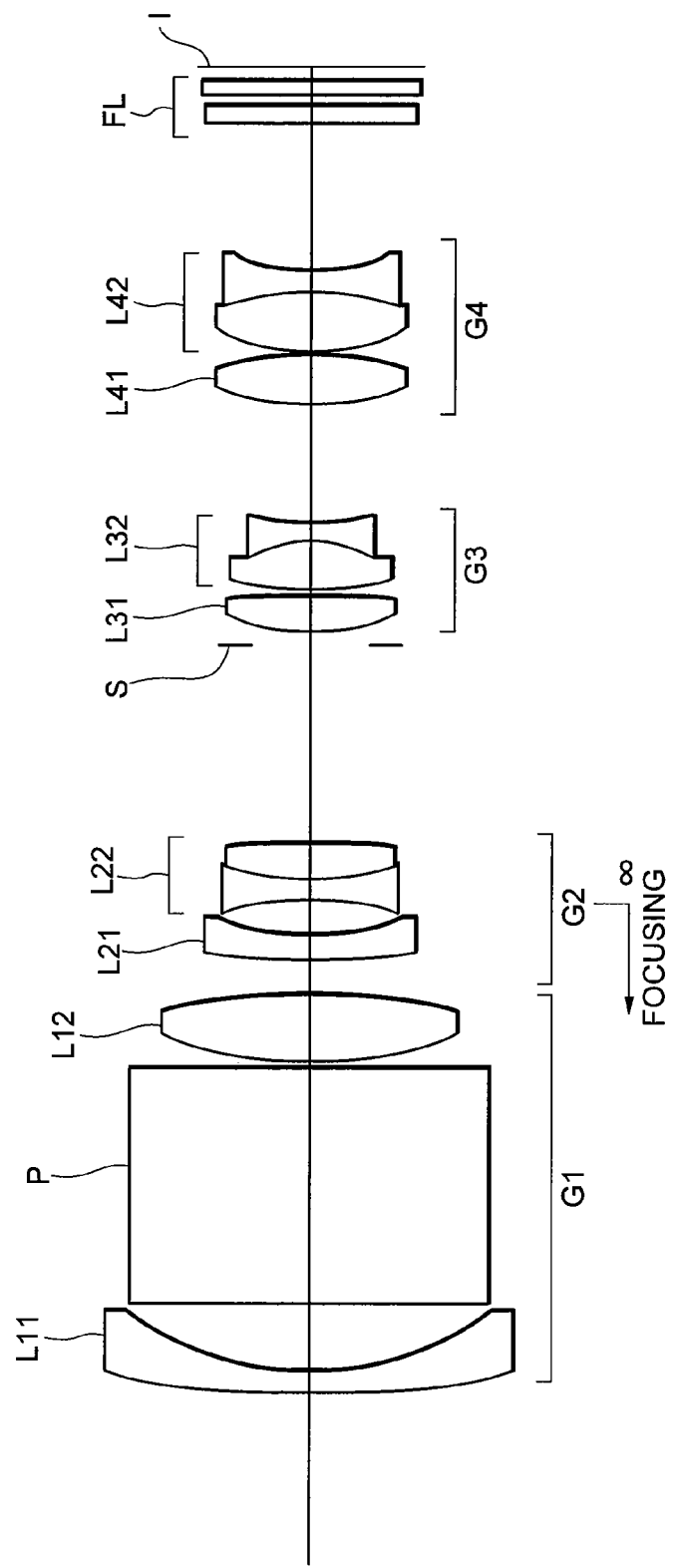
FIG. 24 is a diagram showing lens configuration of a zoom lens system according to Example 7 of the second embodiment extended along an optical axis.

FIG. 24 is diagram showing lens configuration of a zoom lens system according to Example 7 of the second embodiment extended along an optical axis.

In FIG. 24, the first lens group G1 is composed of, in order from the object along the optical axis, a negative meniscus lens L11 having a convex surface facing the object, a rectangular prism P for bending the optical path by substantially 90 degrees, and a double convex positive lens L12 having an aspherical surface facing the object.

The second lens group G2 is composed of, in order from the object along the optical axis, a negative meniscus lens L21 having a convex surface facing the object and an aspherical surface facing the image plane I side, and a cemented negative lens L22 constructed by a double concave negative lens cemented with a double convex positive lens.

The third lens group G3 is composed of, in order from the object along the optical axis, a double convex positive lens L31 having an aspherical surface facing the object, and a cemented negative lens L32 constructed by a double convex positive lens cemented with a double concave negative lens.

The fourth lens group G4 is composed of, in order from the object along the optical axis, a double convex positive lens L41 having an aspherical surface facing the image plane I side, and a cemented negative lens L42 constructed by a double convex positive lens cemented with a double concave negative lens.

Focusing from infinity to a close object is carried out by moving the second lens group along the optical axis to the object.

The filter group FL is composed of a low-pass filter, an infrared light blocking filter, and the like.

An aperture stop S is disposed between the second lens group G2 and the third lens group G3, and fixed with respect to the image plane I upon zooming from the wide-angle end state W to the telephoto end state T.

Various values associated with the zoom lens system according to Example 7 of the present application are listed in Table 7.

TABLE 7

[Specifications]

|  | W | M | T |
|---|---|---|---|
| f = | 6.49 | 12.42 | 18.35 |
| FNO = | 3.46 | 4.03 | 4.40 |
| 2ω = | 63.45 | 33.21 | 22.52 |

[Lens Data]

| N | r | d | nd | vd |
|---|---|---|---|---|
| 1 | 37.2624 | 0.90 | 1.92286 | 18.90 |
| 2 | 11.1482 | 2.45 | | |
| 3 | 0.0000 | 9.00 | 1.83481 | 42.71 |
| 4 | 0.0000 | 0.20 | | |
| *5 | 15.1979 | 2.57 | 1.77377 | 47.18 |
| 6 | −25.3799 | (d6) | | |
| 7 | 41.2336 | 0.90 | 1.82080 | 42.71 |
| *8 | 8.4256 | 1.50 | | |
| 9 | −9.2831 | 0.70 | 1.78800 | 47.37 |
| 10 | 12.0522 | 1.30 | 1.92286 | 18.90 |
| 11 | −68.6250 | (d11) | | |
| 12 | 0.0000 | 0.50 | Aperture Stop S | |
| *13 | 7.6045 | 1.45 | 1.69350 | 53.20 |
| 14 | −34.1354 | 0.15 | | |
| 15 | 10.6131 | 1.87 | 1.65160 | 58.55 |
| 16 | −5.3841 | 0.70 | 1.83481 | 42.71 |
| 17 | 7.0835 | (d17) | | |
| 18 | 10.0717 | 1.99 | 1.58913 | 61.16 |
| *19 | −10.9249 | 0.10 | | |
| 20 | 7.5031 | 2.19 | 1.48749 | 70.23 |
| 21 | −11.3937 | 0.80 | 1.79504 | 28.54 |
| 22 | 6.7316 | (d22) | | |
| 23 | 0.0000 | 0.65 | 1.54437 | 70.51 |
| 24 | 0.0000 | 0.40 | | |
| 25 | 0.0000 | 0.50 | 1.51633 | 64.14 |
| 26 | 0.0000 | (Bf) | | |

[Aspherical Data]

Surface Number: 5

$\kappa = -5.8159$
$C4 = +1.8991E-4$
$C6 = -2.5581E-6$
$C8 = +2.9511E-8E-8$
$C10 = -2.0089E-10$ Surface Number: 8

$\kappa = -9.0000$
$C4 = +2.0520E-3$
$C6 = -8.7500E-5$
$C8 = +3.6741E-6$
$C10 = -4.7536E-8$ TABLE 7-continued Surface Number: 13

$\kappa = +0.4028$
$C4 = +8.0510E-5$
$C6 = +1.5444E-5$
$C8 = -9.1869E-7$
$C10 = +7.2852E-8$ Surface Number: 19

$\kappa = -9.0000$
$C4 = -5.8178E-4$
$C6 = +3.4645E-5$
$C8 = -1.1500E-6$
$C10 = +1.5550E-8$

[Variable Distances]

|  | W | M | T |
|---|---|---|---|
| f | 6.4900 | 12.4200 | 18.3500 |
| d6 | 1.3774 | 5.6717 | 7.9738 |
| d11 | 7.6464 | 3.3521 | 1.0500 |
| d17 | 4.4527 | 2.2134 | 1.1000 |
| d22 | 5.6029 | 7.8422 | 8.9556 |
| Bf | 0.5999 | 0.6000 | 0.6000 |

[Values for Conditional Expressions]

(3): f4/f3 = 0.79595
(4): ndp = 1.83481
(5): nd1 = 1.92286
(6): f1/(−f2) = 2.42205
(7): vd1 = 18.90
(8): (−f2)/fw = 1.10029

Figure 25A:
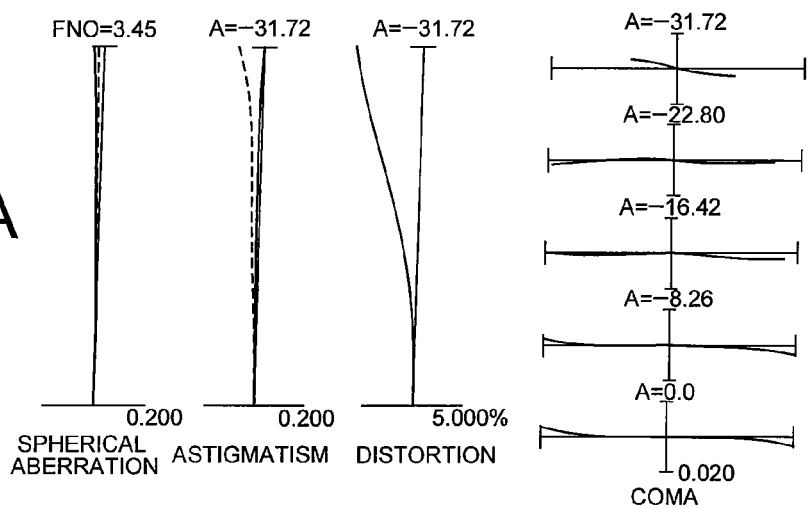
Figure 25B:
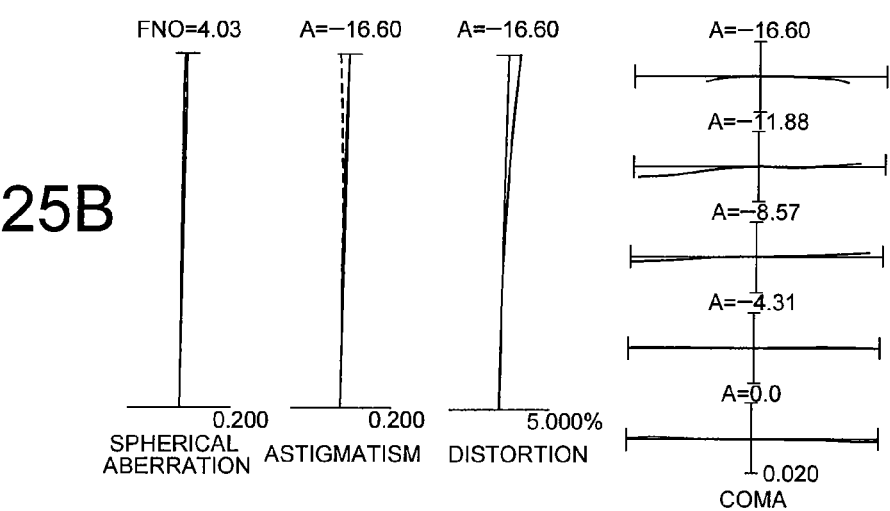
Figure 25C:
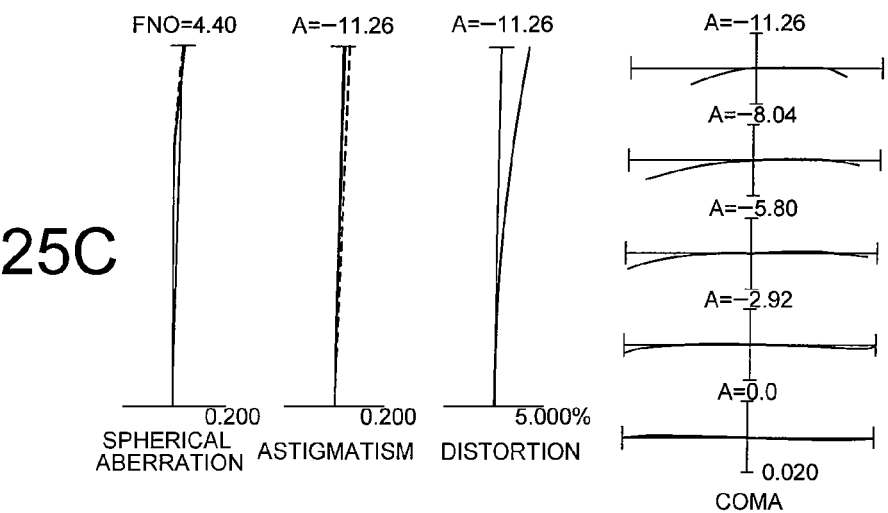

FIGS. 25A, 25B and 25C are graphs showing various aberrations of the zoom lens system according to Example 7 of the second embodiment at d-line (λ=587.6 nm) upon focusing on infinity, in which FIG. 25A shows in the wide-angle end state (f=6.49 mm), FIG. 25B shows in the intermediate focal length state (f=12.42 mm), and FIG. 25C shows in the telephoto end state (f=18.35 mm).

As is apparent from the respective graphs, the zoom lens system according to Example 7 shows superb optical performance as a result of good corrections to various aberrations from the wide-angle end state to the telephoto end state.

Example 8

Figure 26:
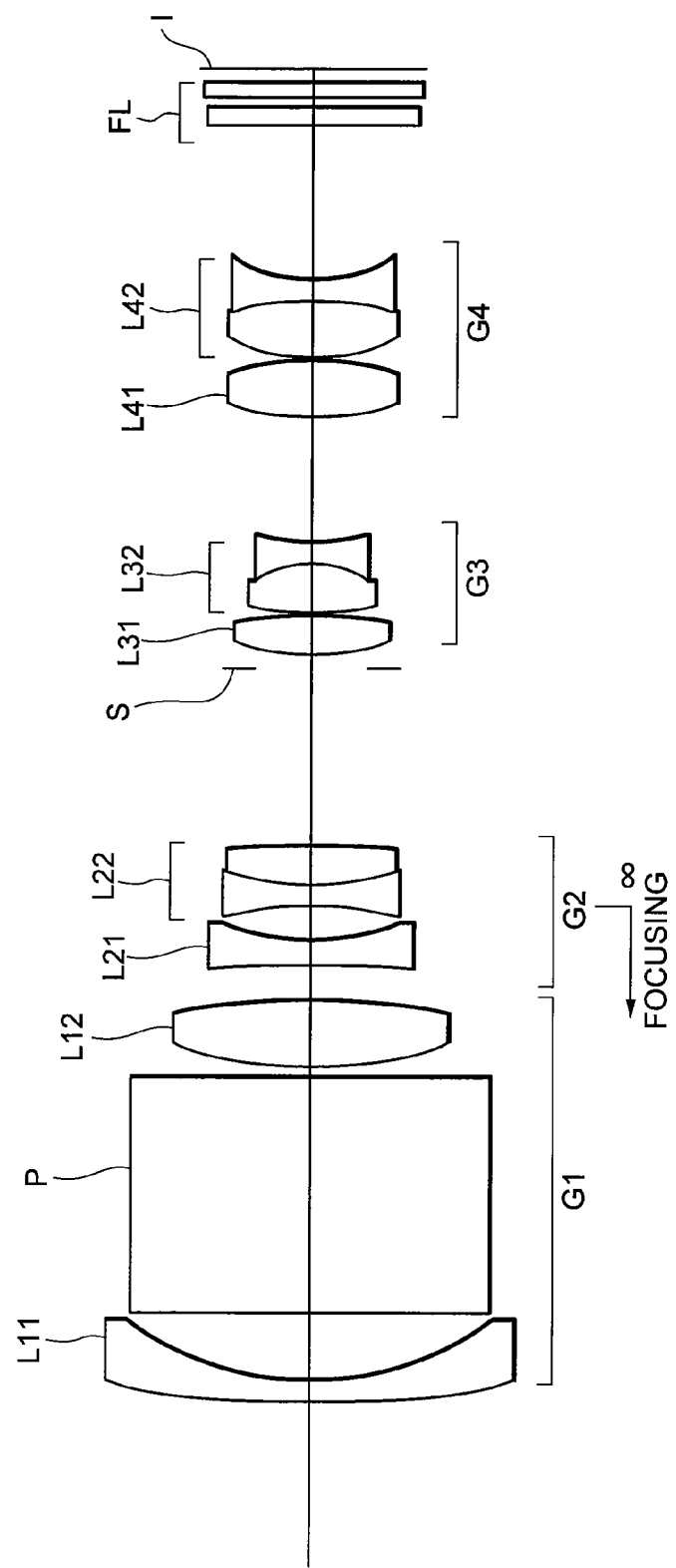
FIG. 26 is a diagram showing lens configuration of a zoom lens system according to Example 8 of the second embodiment extended along an optical axis.

FIG. 26 is diagram showing lens configuration of a zoom lens system according to Example 8 of the second embodiment extended along an optical axis.

In FIG. 26, the first lens group G1 is composed of, in order from the object along the optical axis, a negative meniscus lens L11 having a convex surface facing the object, a rectangular prism P for bending the optical path by substantially 90 degrees, and a double convex positive lens L12 having an aspherical surface facing the object.

The second lens group G2 is composed of, in order from the object along the optical axis, a double concave negative lens L21 having an aspherical surface facing the image plane I side, and a cemented negative lens L22 constructed by a double concave negative lens cemented with a double convex positive lens.

The third lens group G3 is composed of, in order from the object along the optical axis, a double convex positive lens L31 having an aspherical surface facing the object, and a cemented negative lens L32 constructed by a double convex positive lens cemented with a double concave negative lens.

The fourth lens group G4 is composed of, in order from the object along the optical axis, a double convex positive lens L41 having an aspherical surface facing the image plane I side, and a cemented negative lens L42 constructed by a double convex positive lens cemented with a double concave negative lens.

Focusing from infinity to a close object is carried out by moving the second lens group along the optical axis to the object.

The filter group FL is composed of a low-pass filter, an infrared light blocking filter, and the like.

An aperture stop S is disposed between the second lens group G2 and the third lens group G3, and fixed with respect to the image plane I upon zooming from the wide-angle end state W to the telephoto end state T.

Various values associated with the zoom lens system according to Example 8 of the present application are listed in Table 8.

TABLE 8

[Specifications]

|  | W | M | T |
|---|---|---|---|
| f = | 6.49 | 12.42 | 18.35 |
| FNO = | 3.46 | 4.04 | 4.41 |
| 2ω= | 63.44 | 33.20 | 22.52 |

[Lens Data]

| N | r | d | nd | vd |
|---|---|---|---|---|
| 1 | 33.7718 | 0.80 | 1.94595 | 17.98 |
| 2 | 11.7461 | 2.50 |  |  |
| 3 | 0.0000 | 9.00 | 1.83481 | 42.71 |
| 4 | 0.0000 | 0.20 |  |  |
| *5 | 13.9344 | 2.60 | 1.77377 | 47.18 |
| 6 | −27.5986 | (d6) |  |  |
| 7 | −61.3807 | 0.90 | 1.82080 | 42.71 |
| *8 | 8.9234 | 1.40 |  |  |
| 9 | −12.0258 | 0.80 | 1.81600 | 46.62 |
| 10 | 11.6524 | 1.35 | 1.94595 | 17.98 |
| 11 | −97.7336 | (d11) |  |  |
| 12 | 0.0000 | 0.50 | Aperture Stop S | |
| *13 | 7.7058 | 1.50 | 1.68863 | 52.85 |
| 14 | −25.9720 | 0.15 |  |  |
| 15 | 13.8124 | 1.90 | 1.65160 | 58.55 |
| 16 | −4.5044 | 0.80 | 1.83481 | 42.71 |
| 17 | 9.1795 | (d17) |  |  |
| 18 | 10.2475 | 2.15 | 1.58913 | 61.16 |
| *19 | −10.8582 | 0.10 |  |  |
| 20 | 6.9779 | 2.15 | 1.48749 | 70.23 |
| 21 | −13.5284 | 0.80 | 1.79504 | 28.54 |
| 22 | 5.9758 | (d22) |  |  |
| 23 | 0.0000 | 0.65 | 1.54437 | 70.51 |
| 24 | 0.0000 | 0.40 |  |  |
| 25 | 0.0000 | 0.50 | 1.51633 | 64.14 |
| 26 | 0.0000 | (Bf) |  |  |

[Aspherical Data]

Surface Number: 5

$\kappa = -1.5628$
$C4 = +5.9482E-5$
$C6 = -5.0922E-7$
$C8 = +3.3737E-9$
$C10 = -3.2731E-11$ Surface Number: 8

$\kappa = -9.0000$
$C4 = +1.6926E-3$
$C6 = -5.7910E-5$
$C8 = +6.6386E-7$
$C10 = +9.8033E-8$ Surface Number: 13

$\kappa = +0.4479$
$C4 = +1.1451E-4$

TABLE 8-continued $C6 = +2.1327E-5$
$C8 = -1.1862E-6$
$C10 = +1.2675E-7$

Surface Number: 19

$\kappa = -9.0000$
$C4 = -5.6183E-4$
$C6 = +3.8657E-5$
$C8 = -1.1222E-6$
$C10 = +2.5253E-9$

[Variable Distances]

|  | W | M | T |
|---|---|---|---|
| f | 6.4900 | 12.4198 | 18.3496 |
| d6 | 1.3281 | 5.1577 | 7.2028 |
| d11 | 6.9247 | 3.0950 | 1.0500 |
| d17 | 4.7633 | 2.4074 | 1.2377 |
| d22 | 5.7268 | 8.0827 | 9.2525 |
| Bf | 0.5998 | 0.5997 | 0.5997 |

[Values for Conditional Expressions]

(3): f4/f3 = 0.85941
(4): ndp = 1.83481
(5): nd1 = 1.94595
(6): f1/(−f2) = 2.50823
(7): vd1 = 17.98
(8): (−f2)/fw = 0.97871

Figure 27A:
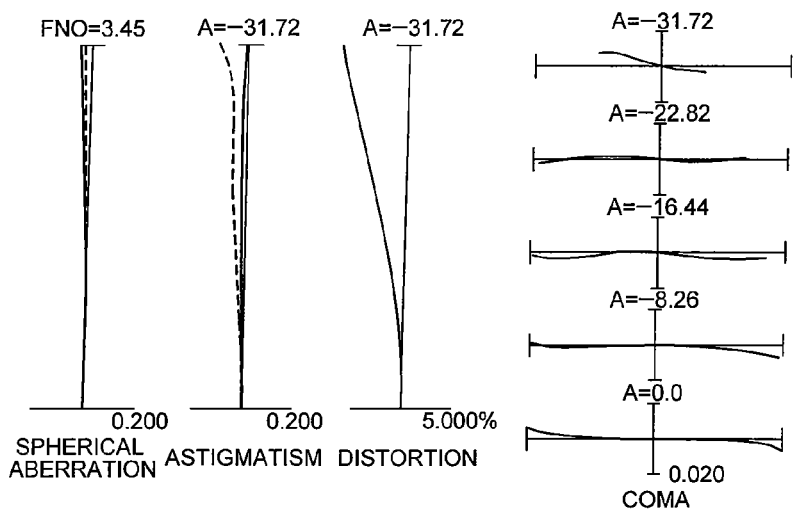
Figure 27B:
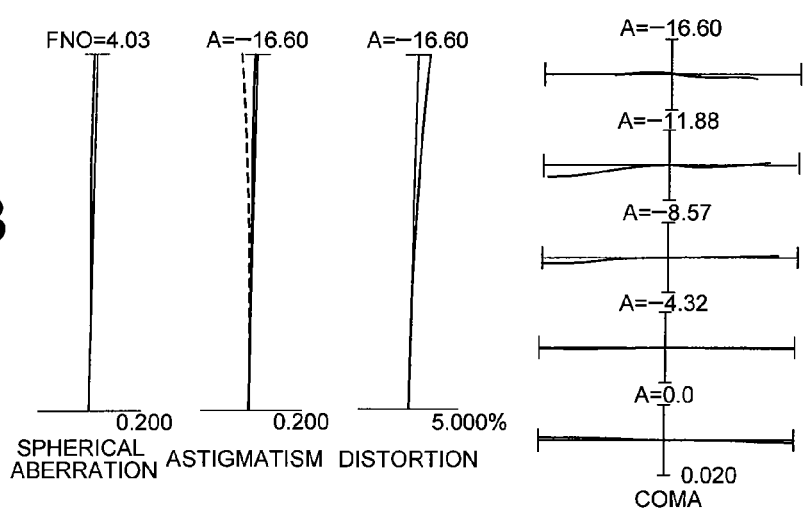
Figure 27C:
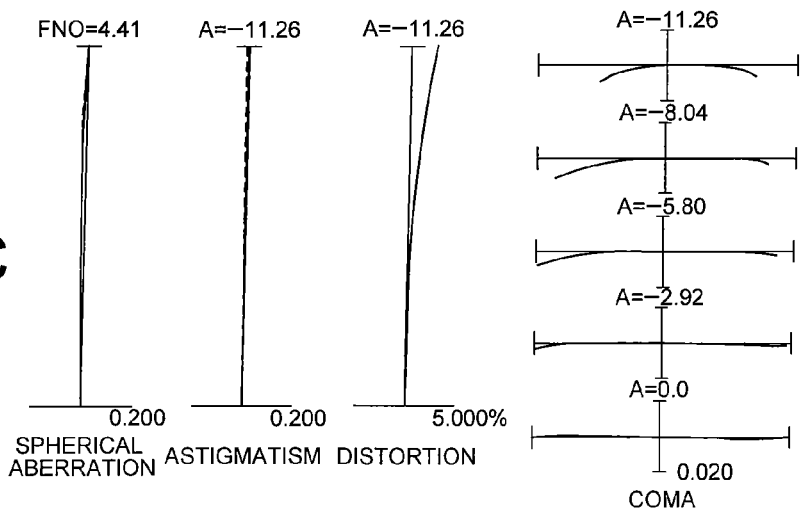

FIGS. 27A, 27B and 27C are graphs showing various aberrations of the zoom lens system according to Example 8 of the second embodiment at d-line ($\lambda$=587.6 nm) upon focusing on infinity, in which FIG. 27A shows in the wide-angle end state (f=6.49 mm), FIG. 27B shows in the intermediate focal length state (f=12.42 mm), and FIG. 27C shows in the telephoto end state (f=18.35 mm).

As is apparent from the respective graphs, the zoom lens system according to Example 8 shows superb optical performance as a result of good corrections to various aberrations from the wide-angle end state to the telephoto end state.

Example 9

Figure 28:
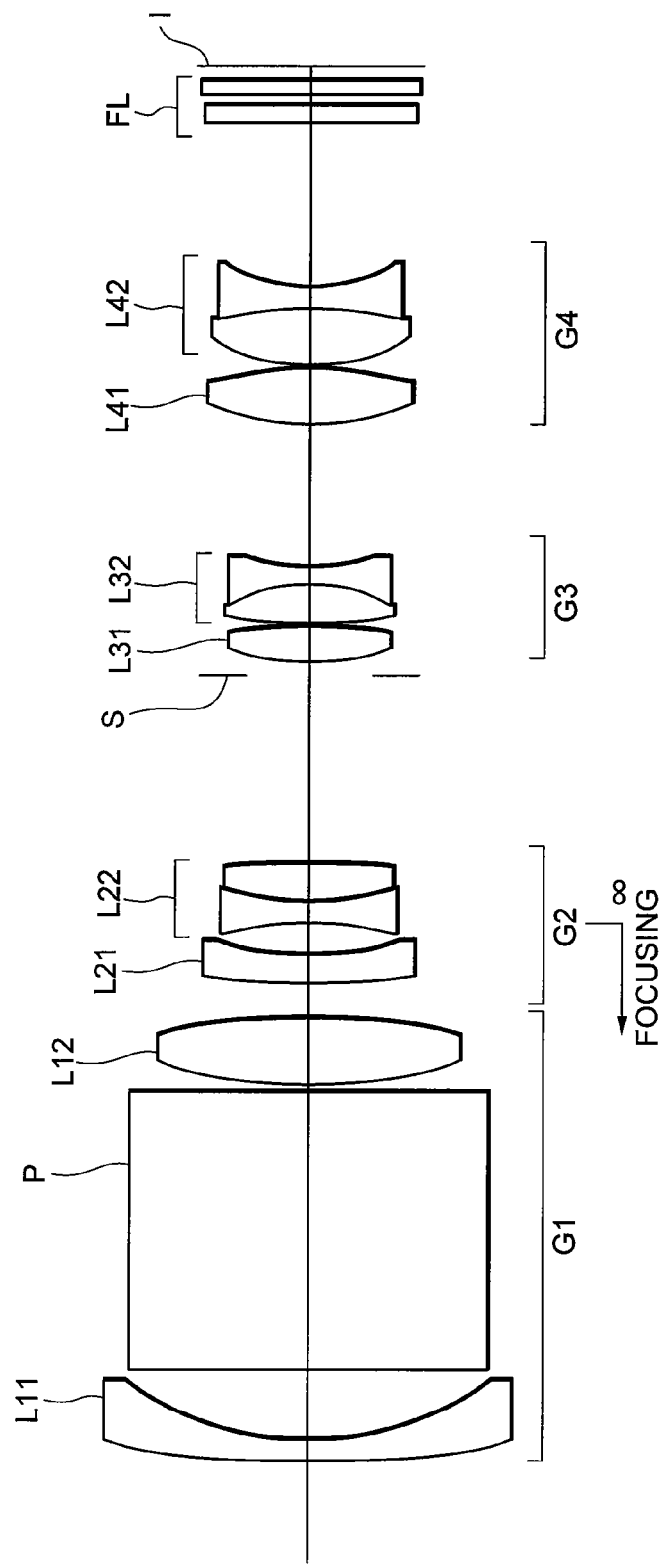
FIG. 28 is a diagram showing lens configuration of a zoom lens system according to Example 9 of the second embodiment extended along an optical axis.

FIG. 28 is diagram showing lens configuration of a zoom lens system according to Example 9 of the second embodiment extended along an optical axis.

In FIG. 28, the first lens group G1 is composed of, in order from the object along the optical axis, a negative meniscus lens L11 having a convex surface facing the object, a rectangular prism P for bending the optical path by substantially 90 degrees, and a double convex positive lens L12 having an aspherical surface facing the object.

The second lens group G2 is composed of, in order from the object along the optical axis, a negative meniscus lens L21 having a convex surface facing the object and an aspherical surface facing the image plane I side, and a cemented negative lens L22 constructed by a double concave negative lens cemented with a positive meniscus lens having a convex surface facing the object.

The third lens group G3 is composed of, in order from the object along the optical axis, a double convex positive lens L31 having an aspherical surface facing the object, and a cemented negative lens L32 constructed by a double convex positive lens cemented with a double concave negative lens.

The fourth lens group G4 is composed of, in order from the object along the optical axis, a double convex positive lens L41 having an aspherical surface facing the image plane I side, and a cemented negative lens L42 constructed by a double convex positive lens cemented with a double concave negative lens.

Focusing from infinity to a close object is carried out by moving the second lens group along the optical axis to the object.

The filter group FL is composed of a low-pass filter, an infrared light blocking filter, and the like.

An aperture stop S is disposed to the most object side of the third lens group G3, and fixed with respect to the image plane I upon zooming from the wide-angle end state W to the telephoto end state T.

Various values associated with the zoom lens system according to Example 9 of the present application are listed in Table 9.

TABLE 9

[Specifications]

|   | W | M | T |
|---|---|---|---|
| f = | 6.49 | 13.00 | 18.35 |
| FNO = | 3.25 | 3.92 | 4.44 |
| 2ω = | 63.46 | 31.68 | 22.52 |

[Lens Data]

| N | r | d | nd | vd |
|---|---|---|---|---|
| 1 | 30.0000 | 0.80 | 1.92286 | 18.90 |
| 2 | 10.8266 | 2.76 | | |
| 3 | 0.0000 | 10.50 | 1.88300 | 40.76 |
| 4 | 0.0000 | 0.20 | | |
| *5 | 17.6854 | 2.54 | 1.77377 | 47.18 |
| 6 | −24.9579 | (d6) | | |
| 7 | 49.4226 | 1.00 | 1.80610 | 40.88 |
| *8 | 10.1943 | 1.32 | | |
| 9 | −11.0741 | 0.70 | 1.77250 | 49.60 |
| 10 | 8.9104 | 1.40 | 1.92286 | 18.90 |
| 11 | 66.6471 | (d11) | | |
| 12 | 0.0000 | 0.50 | Aperture Stop S | |
| *13 | 8.0543 | 1.33 | 1.69350 | 53.20 |
| 14 | −23.6288 | 0.10 | | |
| 15 | 14.5229 | 1.55 | 1.65160 | 58.55 |
| 16 | −5.8631 | 0.70 | 1.83481 | 42.71 |
| 17 | 8.2446 | (d17) | | |
| 18 | 9.6258 | 2.04 | 1.58913 | 61.16 |
| *19 | −11.5184 | 0.10 | | |
| 20 | 6.9573 | 2.15 | 1.48749 | 70.23 |
| 21 | −18.4789 | 0.80 | 1.79504 | 28.54 |
| 22 | 5.7682 | (d22) | | |
| 23 | 0.0000 | 0.65 | 1.54437 | 70.51 |
| 24 | 0.0000 | 0.40 | | |
| 25 | 0.0000 | 0.50 | 1.51633 | 64.14 |
| 26 | 0.0000 | (Bf) | | |

[Aspherical Data]

Surface Number: 5

κ = −1.8966
C4 = +3.3740E−5
C6 = −2.5195E−7
C8 = +2.9256E−9
C10 = −2.3805E−11

Surface Number: 8

κ = −8.9802
C4 = +1.2224E−3
C6 = −3.6939E−5
C8 = +1.5818E−6
C10 = −1.8716E−8

Surface Number: 13

κ = +0.3629
C4 = +2.1443E−5
C6 = +9.5031E−6

TABLE 9-continued

C8 = −4.2244E−7
C10 = +3.9902E−8

Surface Number: 19

κ = +5.7565
C4 = +7.8405E−4
C6 = +1.7280E−5
C8 = −2.5355E−7
C10 = +2.9997E−8

[Variable Distances]

|   | W | M | T |
|---|---|---|---|
| f | 6.4900 | 12.9997 | 18.3499 |
| d6 | 1.3662 | 5.9198 | 7.7019 |
| d11 | 7.3857 | 2.8321 | 1.0500 |
| d17 | 5.4454 | 2.6465 | 1.1000 |
| d22 | 6.1696 | 8.9684 | 10.5150 |
| Bf | 0.5900 | 0.5900 | 0.5900 |

[Values for Conditional Expressions]

(3): f4/f3 = 0.71550
(4): ndp = 1.88300
(5): nd1 = 1.92286
(6): f1/(−f2) = 2.49132
(7): vd1 = 18.90
(8): (−f2)/fw = 1.14409

Figure 29:
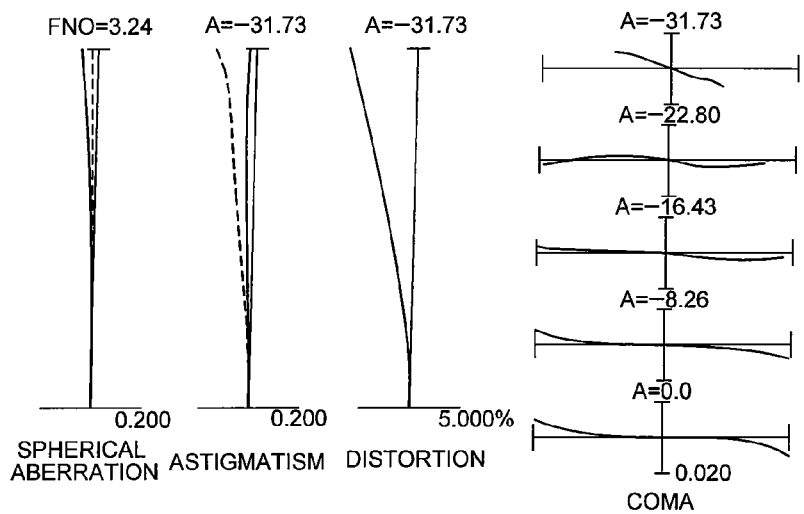
FIG. 29 shows graphs of various aberrations of the zoom lens system according to Example 9 of the second embodiment at d-line ($\lambda$=587.6 nm) upon focusing on infinity in the wide-angle end state (f=6.49 mm).
Figure 30:
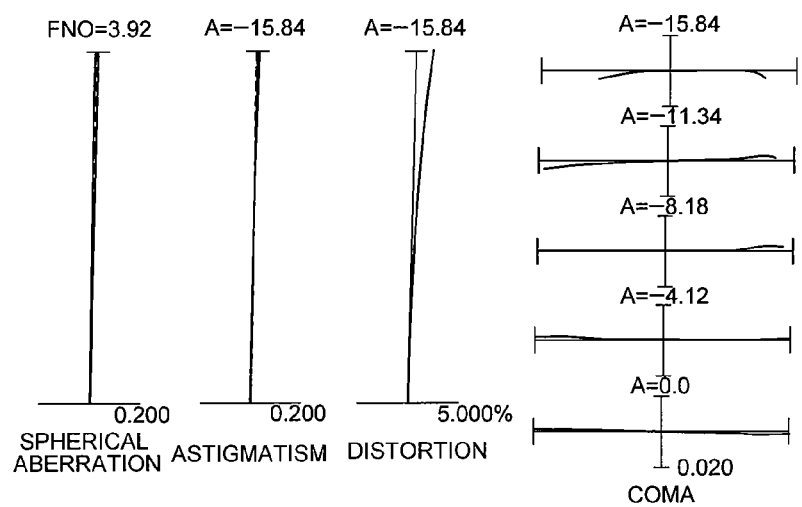
FIG. 30 shows graphs of various aberrations of the zoom lens system according to Example 9 of the second embodiment at d-line ($\lambda$=587.6 nm) upon focusing on infinity in the intermediate focal length state (f=13.00 mm).
Figure 31:
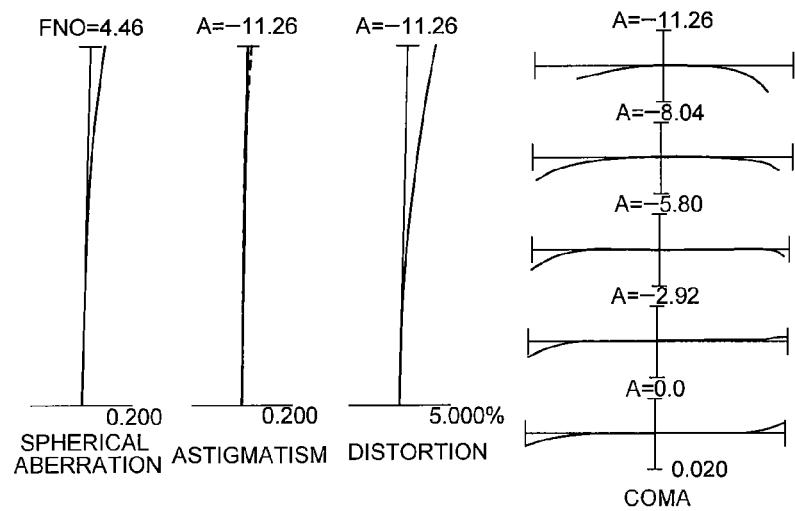
FIG. 31 shows graphs of various aberrations of the zoom lens system according to Example 9 of the second embodiment at d-line ($\lambda$=587.6 nm) upon focusing on infinity in the telephoto end state (f=18.35 mm).

FIGS. 29 through 31 show graphs of various aberrations of the zoom lens system according to Example 9 of the second embodiment at d-line (λ=587.6 nm) upon focusing on infinity, in which FIG. 29 is in the wide-angle end state (f=6.49 mm), FIG. 30 is in the intermediate focal length state (f=13.00 mm), and FIG. 31 is in the telephoto end state (f=18.35 mm).

As is apparent from the respective graphs, the zoom lens system according to Example 9 shows superb optical performance as a result of good corrections to various aberrations from the wide-angle end state to the telephoto end state.

Example 10

Figure 32:
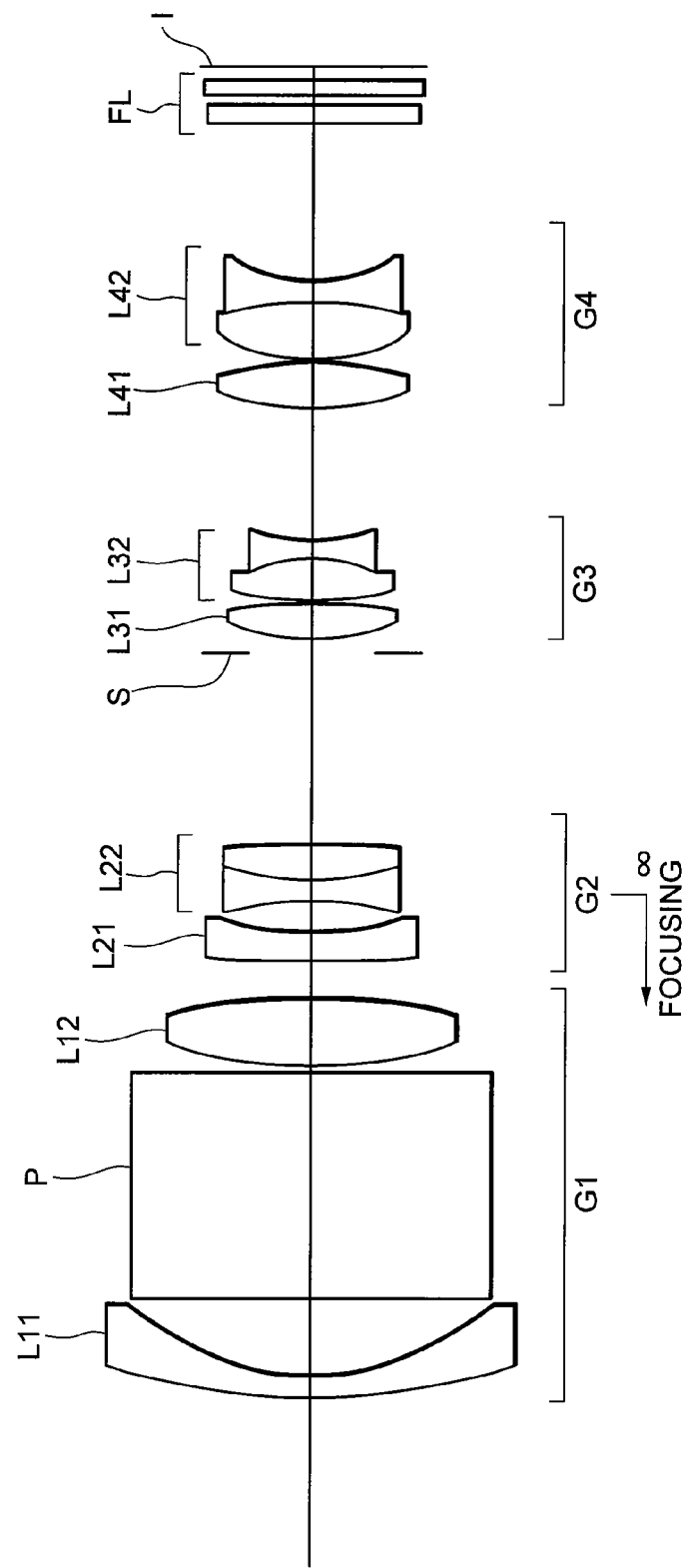
FIG. 32 is a diagram showing lens configuration of a zoom lens system according to Example 10 of the second embodiment extended along an optical axis.

FIG. 32 is diagram showing lens configuration of a zoom lens system according to Example 10 of the second embodiment extended along an optical axis.

In FIG. 32, the first lens group G1 is composed of, in order from the object along the optical axis, a negative meniscus lens L11 having a convex surface facing the object, a rectangular prism P for bending the optical path by substantially 90 degrees, and a double convex positive lens L12 having an aspherical surface facing the object.

The second lens group G2 is composed of, in order from the object along the optical axis, a negative meniscus lens L21 having a convex surface facing the object and an aspherical surface facing the image plane I side, and a cemented negative lens L22 constructed by a double concave negative lens cemented with a double convex positive lens.

The third lens group G3 is composed of, in order from the object along the optical axis, a double convex positive lens L31 having an aspherical surface facing the object, and a cemented negative lens L32 constructed by a double convex positive lens cemented with a double concave negative lens.

The fourth lens group G4 is composed of, in order from the object along the optical axis, a double convex positive lens L41 having an aspherical surface facing the image plane I side, and a cemented negative lens L42 constructed by a double convex positive lens cemented with a double concave negative lens.

Focusing from infinity to a close object is carried out by moving the second lens group along the optical axis to the object.

The filter group FL is composed of a low-pass filter, an infrared light blocking filter, and the like.

An aperture stop S is disposed to the most object side of the third lens group G3, and fixed with respect to the image plane I upon zooming from the wide-angle end state W to the telephoto end state T.

Various values associated with the zoom lens system according to Example 10 of the present application are listed in Table 10.

TABLE 10

[Specifications]

|  | W | M | T |
|---|---|---|---|
| f = | 6.49 | 12.42 | 18.35 |
| FNO = | 3.28 | 3.89 | 4.40 |
| 2ω= | 63.45 | 33.20 | 22.52 |

[Lens Data]

| N | r | d | nd | νd |
|---|---|---|---|---|
| 1 | 24.5000 | 0.80 | 1.92286 | 18.90 |
| 2 | 9.9772 | 2.95 | | |
| 3 | 0.0000 | 8.50 | 1.83481 | 42.71 |
| 4 | 0.0000 | 0.20 | | |
| *5 | 16.6000 | 2.63 | 1.77377 | 47.18 |
| 6 | −24.8401 | (d6) | | |
| 7 | 74.7674 | 1.00 | 1.82080 | 42.71 |
| *8 | 9.4961 | 1.39 | | |
| 9 | −10.0785 | 0.70 | 1.78800 | 47.37 |
| 10 | 11.0108 | 1.35 | 1.92286 | 18.90 |
| 11 | −140.1574 | (d11) | | |
| 12 | 0.0000 | 0.50 | Aperture Stop S | |
| *13 | 7.2743 | 1.39 | 1.69350 | 53.20 |
| 14 | −26.2141 | 0.15 | | |
| 15 | 13.0403 | 1.59 | 1.65160 | 58.55 |
| 16 | −5.7472 | 0.70 | 1.83481 | 42.71 |
| 17 | 7.0000 | (d17) | | |
| 18 | 9.8799 | 1.69 | 1.58913 | 61.16 |
| *19 | −11.2538 | 0.10 | | |
| 20 | 6.8394 | 2.19 | 1.48749 | 70.23 |
| 21 | −15.4997 | 0.80 | 1.79504 | 28.54 |
| 22 | 6.0883 | (d22) | | |
| 23 | 0.0000 | 0.65 | 1.54437 | 70.51 |
| 24 | 0.0000 | 0.40 | | |
| 25 | 0.0000 | 0.50 | 1.51633 | 64.14 |
| 26 | 0.0000 | (Bf) | | |

[Aspherical Data]

Surface Number: 5

κ = −1.5215
C4 = +3.9133E−5
C6 = −1.9315E−7
C8 = +3.1162E−9
C10 = −3.5747E−11

Surface Number: 8

κ = −9.0000
C4 = +1.4631E−3
C6 = −4.9164E−5
C8 = +2.1048E−6
C10 = −2.6229E−8

Surface Number: 13

κ = +0.3110
C4 = +4.3394E−5
C6 = +1.0663E−5
C8 = −4.6198E−7
C10 = +4.5396E−8

TABLE 10-continued

Surface Number: 19

κ = −1.7610
C4 = +1.0693E−4
C6 = +6.5769E−6
C8 = −2.4528E−7
C10 = +8.6823E−10

[Variable Distances]

|  | W | M | T |
|---|---|---|---|
| f | 6.4900 | 12.4200 | 18.3500 |
| d6 | 1.3733 | 5.6158 | 7.7020 |
| d11 | 7.3787 | 3.1362 | 1.0500 |
| d17 | 5.0253 | 2.6114 | 1.1000 |
| d22 | 5.9477 | 8.3616 | 9.8730 |
| Bf | 0.6000 | 0.6000 | 0.6000 |

[Values for Conditional Expressions]

(3): f4/f3 = 0.70338
(4): ndp = 1.83481
(5): nd1 = 1.92286
(6): f1/(−f2) = 2.51707
(7): νd1 = 18.90
(8): (−f2)/fw = 1.11448

Figure 33:
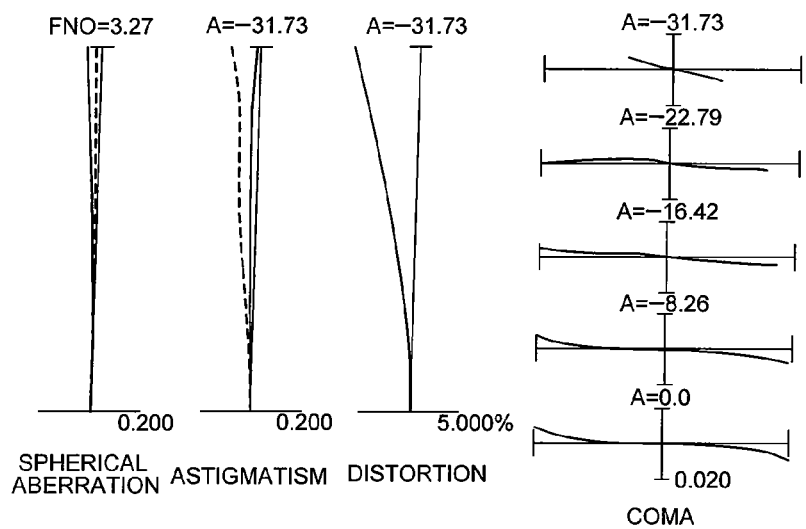
FIG. 33 shows graphs of various aberrations of the zoom lens system according to Example 10 of the second embodiment at d-line ($\lambda$=587.6 nm) upon focusing on infinity in the wide-angle end state (f=6.49 mm).
Figure 34:
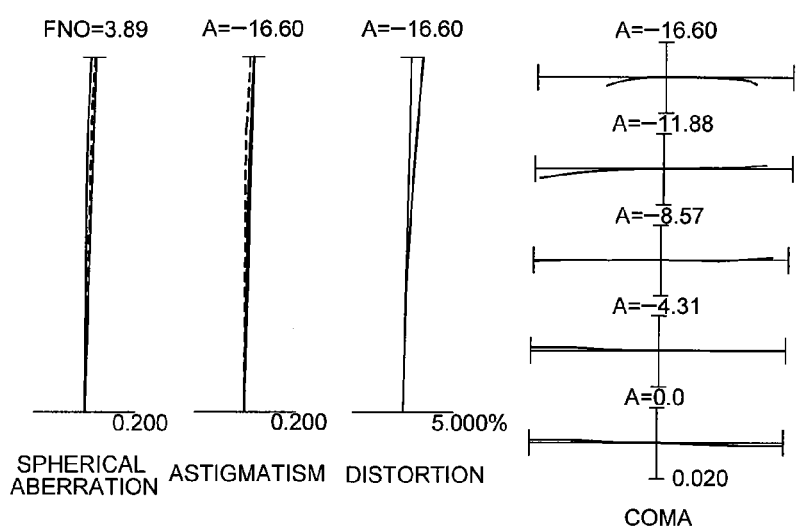
FIG. 34 shows graphs of various aberrations of the zoom lens system according to Example 10 of the second embodiment at d-line ($\lambda$=587.6 nm) upon focusing on infinity in the intermediate focal length state (f=12.42 mm).
Figure 35:
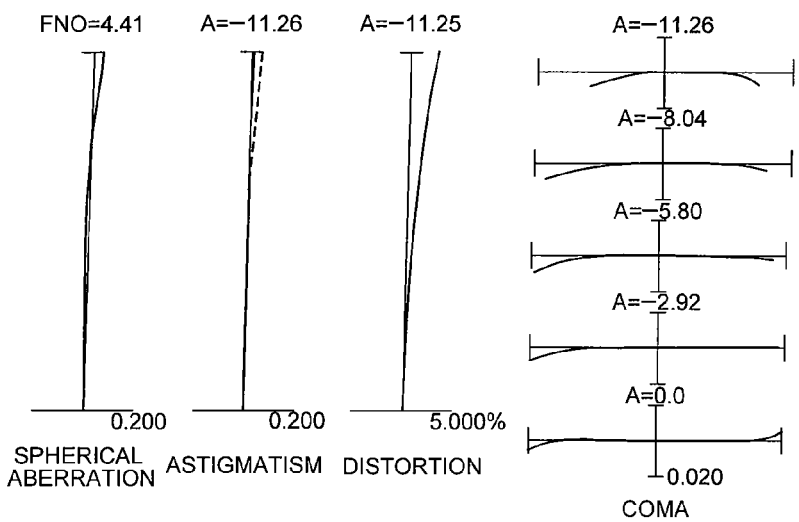
FIG. 35 shows graphs of various aberrations of the zoom lens system according to Example 10 of the second embodiment at d-line ($\lambda$=587.6 nm) upon focusing on infinity in the telephoto end state (f=18.35 mm).

FIGS. 33 through 35 show graphs of various aberrations of the zoom lens system according to Example 10 of the second embodiment at d-line (λ=587.6 nm) upon focusing on infinity, in which FIG. 33 is in the wide-angle end state (f=6.49 mm), FIG. 34 is in the intermediate focal length state (f=12.42 mm), and FIG. 35 is in the telephoto end state (f=18.35 mm).

As is apparent from the respective graphs, the zoom lens system according to Example 10 shows superb optical performance as a result of good corrections to various aberrations from the wide-angle end state to the telephoto end state.

Example 11

Figure 36:
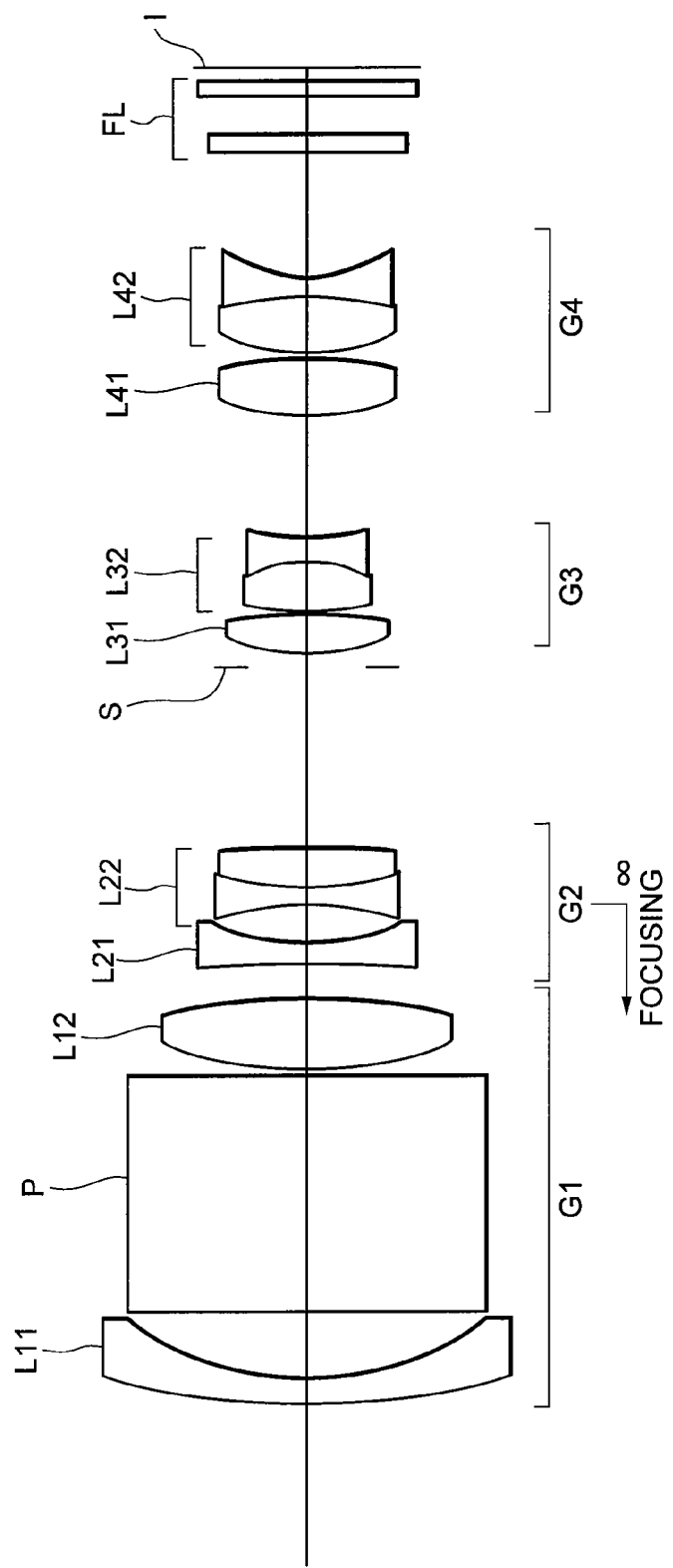
FIG. 36 is a diagram showing lens configuration of a zoom lens system according to Example 11 of the second embodiment extended along an optical axis.

FIG. 36 is diagram showing lens configuration of a zoom lens system according to Example 11 of the second embodiment extended along an optical axis.

In FIG. 36, the first lens group G1 is composed of, in order from the object along the optical axis, a negative meniscus lens L11 having a convex surface facing the object, a rectangular prism P for bending the optical path by substantially 90 degrees, and a double convex positive lens L12 having an aspherical surface facing the object.

The second lens group G2 is composed of, in order from the object along the optical axis, a double concave negative lens L21 having an aspherical surface facing the image plane I side, and a cemented negative lens L22 constructed by a double concave negative lens cemented with a double convex positive lens.

The third lens group G3 is composed of, in order from the object along the optical axis, a double convex positive lens L31 having an aspherical surface facing the object, and a cemented negative lens L32 constructed by a double convex positive lens cemented with a double concave negative lens.

The fourth lens group G4 is composed of, in order from the object along the optical axis, a double convex positive lens L41 having an aspherical surface facing the image plane I side, and a cemented negative lens L42 constructed by a double convex positive lens cemented with a double concave negative lens.

Focusing from infinity to a close object is carried out by moving the second lens group along the optical axis to the object.

The filter group FL is composed of a low-pass filter, an infrared light blocking filter, and the like.

An aperture stop S is disposed to the most object side of the third lens group G3, and fixed with respect to the image plane I upon zooming from the wide-angle end state W to the telephoto end state T.

Various values associated with the zoom lens system according to Example 11 of the present application are listed in Table 11.

TABLE 11

[Specifications]

|  | W | M | T |
|---|---|---|---|
| f = | 6.49 | 12.42 | 18.35 |
| FNO = | 3.48 | 4.07 | 4.44 |
| 2ω= | 63.43 | 33.20 | 22.52 |

[Lens Data]

| N | r | d | nd | vd |
|---|---|---|---|---|
| 1 | 29.3816 | 0.85 | 1.94595 | 17.98 |
| 2 | 10.9980 | 2.45 | | |
| 3 | 0.0000 | 9.00 | 1.83481 | 42.71 |
| 4 | 0.0000 | 0.20 | | |
| *5 | 14.0983 | 2.60 | 1.77377 | 47.18 |
| 6 | −26.4642 | (d6) | | |
| 7 | −64.2210 | 0.90 | 1.82080 | 42.71 |
| *8 | 9.3699 | 1.40 | | |
| 9 | −12.3854 | 0.80 | 1.81600 | 46.62 |
| 10 | 10.6993 | 1.35 | 1.94595 | 17.98 |
| 11 | −299.4574 | (d11) | | |
| 12 | 0.0000 | 0.50 | Aperture Stop S | |
| *13 | 7.7797 | 1.45 | 1.68863 | 52.85 |
| 14 | −22.4777 | 0.20 | | |
| 15 | 14.8768 | 1.90 | 1.64000 | 60.09 |
| 16 | −4.8081 | 0.80 | 1.83481 | 42.71 |
| 17 | 9.2275 | (d17) | | |
| 18 | 9.8310 | 2.15 | 1.58913 | 61.16 |
| *19 | −11.1803 | 0.10 | | |
| 20 | 7.1100 | 2.15 | 1.48749 | 70.23 |
| 21 | −13.1759 | 0.80 | 1.79504 | 28.69 |
| 22 | 6.0262 | (d22) | | |
| 23 | 0.0000 | 0.65 | 1.54437 | 70.51 |
| 24 | 0.0000 | 1.40 | | |
| 25 | 0.0000 | 0.50 | 1.51633 | 64.14 |
| 26 | 0.0000 | (Bf) | | |

[Aspherical Data]

Surface Number: 5

$\kappa = -1.5628$
$C4 = +5.9061E-5$
$C6 = -4.2880E-7$
$C8 = +6.8266E-10$
$C10 = +2.1560E-11$ Surface Number: 8

$\kappa = -9.0000$
$C4 = +1.4768E-3$
$C6 = -4.2970E-5$
$C8 = +3.4527E-7$
$C10 = +8.8838E-8$ Surface Number: 13

$\kappa = +0.4479$
$C4 = +4.1008E-5$
$C6 = +2.5708E-5$
$C8 = -2.5079E-6$
$C10 = +1.8686E-7$ Surface Number: 19

$\kappa = -9.0000$
$C4 = -4.8117E-4$
$C6 = +3.5584E-5$

TABLE 11-continued $C8 = -1.1993E-6$
$C10 = +1.2638E-8P$

[Variable Distances]

|  | W | M | T |
|---|---|---|---|
| f | 6.4900 | 12.4198 | 18.3496 |
| d6 | 1.3281 | 5.1578 | 7.2028 |
| d11 | 7.0747 | 3.2450 | 1.2000 |
| d17 | 4.7632 | 2.4074 | 1.2377 |
| d22 | 4.6997 | 7.0555 | 8.2252 |
| Bf | 0.5997 | 0.5997 | 0.5997 |

[Values for Conditional Expressions]

(3): f4/f3 = 0.85941
(4): ndp = 1.83481
(5): nd1 = 1.94595
(6): f1/(−f2) = 2.50823
(7): vd1 = 17.98
(8): (−f2)/fw = 0.97868

Figure 37:
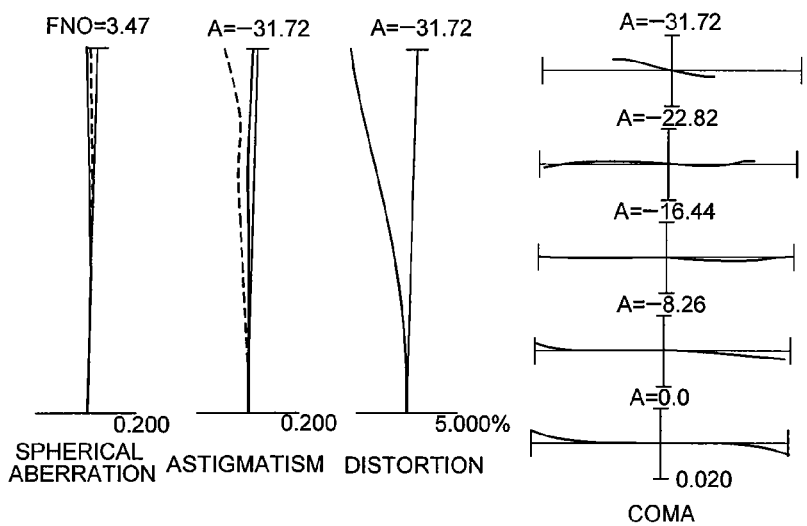
FIG. 37 shows graphs of various aberrations of the zoom lens system according to Example 11 of the second embodiment at d-line ($\lambda$=587.6 nm) upon focusing on infinity in the wide-angle end state (f=6.49 mm).
Figure 38:
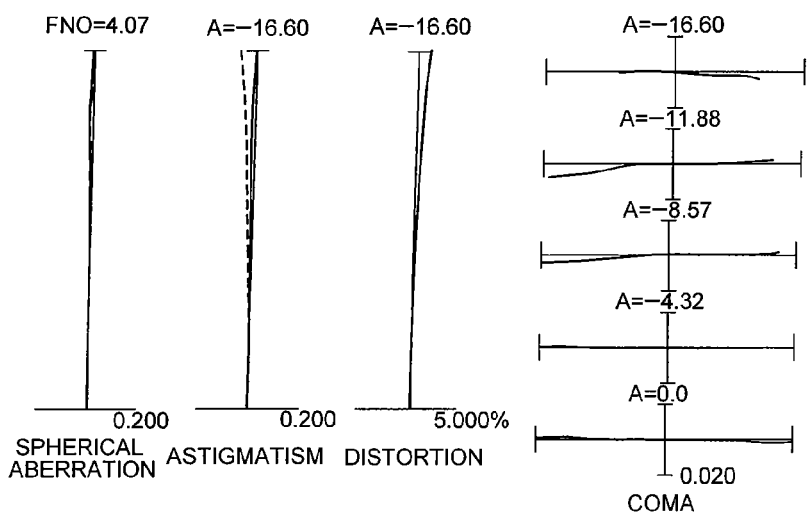
FIG. 38 shows graphs of various aberrations of the zoom lens system according to Example 11 of the second embodiment at d-line ($\lambda$=587.6 nm) upon focusing on infinity in the intermediate focal length state (f=12.42 mm).
Figure 39:
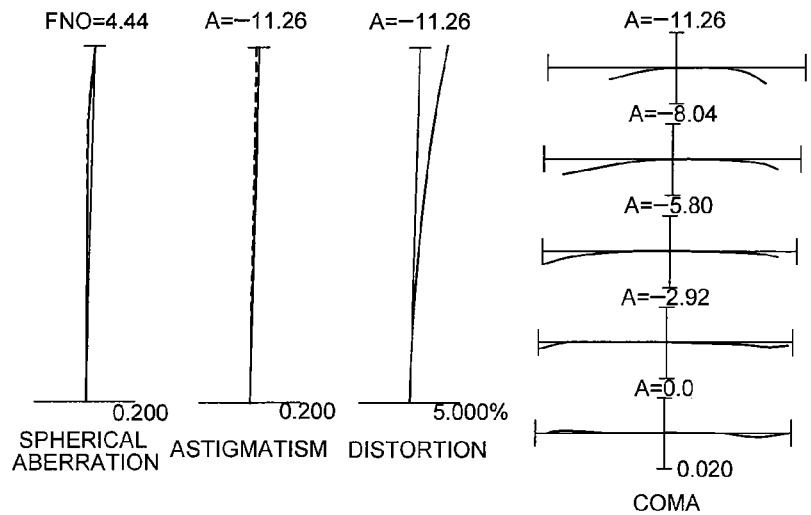
FIG. 39 shows graphs of various aberrations of the zoom lens system according to Example 11 of the second embodiment at d-line ($\lambda$=587.6 nm) upon focusing on infinity in the telephoto end state (f=18.35 mm).

FIGS. 37 through 39 show graphs of various aberrations of the zoom lens system according to Example 11 of the second embodiment at d-line (λ=587.6 nm) upon focusing on infinity, in which FIG. 37 is in the wide-angle end state (f=6.49 mm), FIG. 38 is in the intermediate focal length state (f=12.42 mm), and FIG. 39 is in the telephoto end state (f=18.35 mm).

As is apparent from the respective graphs, the zoom lens system according to Example 11 shows superb optical performance as a result of good corrections to various aberrations from the wide-angle end state to the telephoto end state.

As described above, the present application makes it possible to provide a zoom lens system suitable for a video camera, a digital still camera, and the like using a solid-state imaging device, capable of being disposed in a limited space, capable of shifting an image, and having a zoom ratio of about three, and excellent optical performance, and to provide an optical apparatus such as a camera equipped with the zoom lens system.

Incidentally, the following description may suitably be applied within limits that do not deteriorate optical performance.

The zoom lens system according to the present embodiment having a four-lens-group configuration can be a zoom lens system having a five-lens-group configuration by adding a lens group to the most image side. In this case, the fifth lens group to be added may be either a one having positive refractive power or a one having negative refractive power. The fifth lens group to be added may be fixed or moved upon zooming. In the zoom lens system having a five-lens-group configuration, at least one of the third lens group and the fifth lens group may be shifted in a direction substantially perpendicular to the optical axis as a shift lens group.

In order to carry out focusing from infinity to a close object, a portion of a lens group, a single lens group, or a plurality of lens groups may be moved along the optical axis. The focusing lens group(s) may be used for auto focus, and suitable for being driven by a motor such as an ultrasonic motor. It is preferable that the second lens group or the fourth lens group is used for the focusing lens group.

In a zoom lens system according to the present embodiment, although the third lens group is used as a shift lens group, other lens group or a portion of lens group may be used as a shift lens group. In a zoom lens system according to the present embodiment, since the third lens group is fixed upon zooming, it is preferable that the third lens group is used as a shift lens group. However, the second lens group may be used as a shift lens group. The shift lens group has at least two single lenses, and preferably has a cemented lens constructed by two single lenses cemented with each other.

Moreover, any lens surface composing the high zoom ratio zoom lens system according to the present application may be an aspherical surface. The aspherical surface may be fabricated by a fine grinding process, a glass molding process that a glass material is formed into an aspherical shape by a mold, or a compound type process that a resin material is formed into an aspherical shape on a glass surface.

An antireflection coating having high transmittance over a broad wavelength range may be applied to each lens surface to reduce flare or ghost images, so that high optical performance with a high contrast can be attained.

The above described each example only shows a specific example, and the present application is not limited to the above-described construction or configuration, so that suitable modification and alteration may be made without departing from the spirit or scope of the invention.

The invention claimed is:

1. A zoom lens system consisting of, in order from an object along an optical axis:
a first lens group having positive refractive power and an optical path bending element;
a second lens group having negative refractive power;
a third lens group having positive refractive power; and
a fourth lens group having positive refractive power;
upon varying a focal length from a wide-angle end state to a telephoto end state, the first lens group being fixed with respect to an image plane, a distance between the first lens group and the second lens group increasing, a distance between the second lens group and third lens group decreasing, and a distance between the third lens group and the fourth lens group decreasing,
the first lens group including at least one negative lens, and the following conditional expression being satisfied:

$$1.900 < nd1$$

where nd1 denotes a refractive index of the negative lens at d-line (wavelength λ=587.6 nm),
wherein at least one of the third lens group and the fourth lens group consists of, in order from the object along the optical axis, a positive lens having a convex surface facing the object, and a cemented negative lens constructed by a positive lens having a convex surface facing the object cemented with a negative lens having a concave surface facing the image.

2. The zoom lens system according to claim 1, wherein the third lens group is fixed with respect to the image plane upon varying a focal length from the wide-angle end state to the telephoto end state.

3. The zoom lens system according to claim 1, wherein the first lens group includes at least one negative lens, and the following conditional expression is satisfied:

$$1.940 < nd1$$

where nd1 denotes a refractive index of the negative lens at d-line (wavelength λ=587.6 nm).

4. The zoom lens system according to claim 1, wherein the first lens group includes at least one negative lens, and the following conditional expression is satisfied:

$$vd1 < 21.00$$

where vd1 denotes an Abbe number of the negative lens at d-line (wavelength λ=587.6 nm).

5. The zoom lens system according to claim 1, wherein the first lens group includes at least one negative lens, and the following conditional expression is satisfied:

$$vd1 < 20.50$$

where vd1 denotes an Abbe number of the negative lens at d-line (wavelength λ=587.6 nm).

6. The zoom lens system according to claim 1, wherein the third lens group includes at least one cemented lens.

7. The zoom lens system according to claim 1, wherein the following conditional expression is satisfied:

$$0.5 < f4/f3 < 1.1$$

where f3 denotes a focal length of the third lens group, and f4 denotes a focal length of the fourth lens group.

8. The zoom lens system according to claim 1, wherein the first lens group includes at least one negative lens, the negative lens in the first lens group is a negative meniscus lens having a convex surface facing the object, and the first lens group consists of, in order from the object along the optical axis, the negative meniscus lens, the optical path bending element, and a positive lens having a convex surface facing the object.

9. The zoom lens system according to claim 1, wherein the optical path bending element is a rectangular prism and the following conditional expression is satisfied:

$$1.800 < ndp$$

where ndp denotes a refractive index of the rectangular prism at d-line (wavelength λ=587.6 nm).

10. The zoom lens system according to claim 1, wherein the first lens group includes at least one aspherical lens.

11. The zoom lens system according to claim 1, wherein the second lens group consists of, in order from the object along the optical axis, a negative lens having a concave surface facing the image, and a cemented negative lens constructed by a negative lens having a concave surface facing the object cemented with a positive lens.

12. The zoom lens system according to claim 1, wherein the second lens group includes at least one aspherical lens.

13. The zoom lens system according to claim 1, wherein the following conditional expression is satisfied:

$$0.8 < (-f2)/fw < 1.3$$

where fw denotes a focal length of the zoom lens system in the wide-angle end state, and f2 denotes a focal length of the second lens group.

14. The zoom lens system according to claim 1, wherein focusing from infinity to a close object is carried out by moving the second lens group along the optical axis to the object side.

15. The zoom lens system according to claim 1, wherein the following conditional expression is satisfied:

$$1.5 < f1/(-f2) < 4.0$$

where f1 denotes a focal length of the first lens group, and f2 denotes a focal length of the second lens group.

16. The zoom lens system according to claim 1, wherein the third lens group includes at least one aspherical lens.

17. The zoom lens system according to claim 1, wherein the fourth lens group includes at least one aspherical lens.

18. The zoom lens system according to claim 1, wherein an aperture stop is disposed between the second lens group and the third lens group, and the aperture stop is located adjacent to the object side of the third lens group.

19. A zoom lens system comprising, in order from an object along an optical axis:

a first lens group having positive refractive power and an optical path bending element;
a second lens group having negative refractive power;
a third lens group having positive refractive power; and
a fourth lens group having positive refractive power;
upon varying a focal length from a wide-angle end state to a telephoto end state, the first lens group being fixed with respect to an image plane, a distance between the first lens group and the second lens group increasing, a distance between the second lens group and third lens group decreasing, and a distance between the third lens group and the fourth lens group decreasing, and
an image on the image plane being able to be shifted by shifting the third lens group or a portion of the third lens group as a shift lens group in a direction substantially perpendicular to the optical axis,
wherein at least one of the third lens group and the fourth lens group consists of, in order from the object along the optical axis, a positive lens having a convex surface facing the object, and a cemented negative lens constructed by a positive lens having a convex surface facing the object cemented with a negative lens having a concave surface facing the image,
wherein the first lens group includes at least one negative lens, and the following conditional expression is satisfied:

$$1.900 < nd1$$

where nd1 denotes a refractive index of the negative lens in the first lens group at d-line (wavelength λ=587.6 nm).

20. A zoom lens system comprising, in order from an object along an optical axis:
a first lens group having positive refractive power and an optical path bending element;
a second lens group having negative refractive power;
a third lens group having positive refractive power; and
a fourth lens group having positive refractive power;
upon varying a focal length from a wide-angle end state to a telephoto end state, the first lens group being fixed with respect to an image plane, a distance between the first lens group and the second lens group increasing, a distance between the second lens group and third lens group decreasing, and a distance between the third lens group and the fourth lens group decreasing, and
an image on the image plane being able to be shifted by shifting the third lens group or a portion of the third lens group as a shift lens group in a direction substantially perpendicular to the optical axis,
wherein at least one of the third lens group and the fourth lens group consists of, in order from the object along the optical axis, a positive lens having a convex surface facing the object, and a cemented negative lens constructed by a positive lens having a convex surface facing the object cemented with a negative lens having a concave surface facing the image,
wherein the following conditional expression is satisfied:

$$0.75 < \beta bt \times (1-(3-\beta at)) < 1.2$$

where βat denotes lateral magnification of the third lens group in the telephoto end state, and βbt denotes lateral magnification of a lens system locating between the third lens group and the image plane in the telephoto end state.

21. The zoom lens system according to claim 20, wherein the following conditional expression is satisfied:

$$0.3 < fw/f3 < 0.5$$

where f3 denotes a focal length of the third lens group, and fw denotes a focal length of the zoom lens system in the wide-angle end state.

22. An optical apparatus equipped with the zoom lens system according to any one of claims 1-21.

23. A method for varying a focal length of a zoom lens system comprising steps of:
providing the zoom lens system consisting of, in order from an object along an optical axis, a first lens group having positive refractive power and an optical path bending element, a second lens group having negative refractive power, a third lens group having positive refractive power, and a fourth lens group having positive refractive power, the first lens group including at least one negative lens, the negative lens satisfying the following conditional expression:

$$1.900 < nd1$$

where nd1 denotes a refractive index of the negative lens at d-line (wavelength λ=587.6 nm), wherein at least one of the third lens group and the fourth lens group consists of, in order from the object along the optical axis, a positive lens having a convex surface facing the object, and a cemented negative lens constructed by a positive lens having a convex surface facing the object cemented with a negative lens having a concave surface facing the image; and
moving the second lens group and the fourth lens group along the optical axis such that upon varying a focal length from a wide-angle end state to a telephoto end state, the first lens group is fixed with respect to the image plane, a distance between the first lens group and the second lens group increases, a distance between the second lens group and the third lens group decreases, and a distance between the third lens group and the fourth lens group decreases.

24. A method for focusing a zoom lens system comprising steps of:
providing the zoom lens system consisting of, in order from an object along an optical axis, a first lens group having positive refractive power and an optical path bending element, a second lens group having negative refractive power, a third lens group having positive refractive power, and a fourth lens group having positive refractive power, upon varying a focal length from a wide-angle end state to a telephoto end state, the first lens group being fixed with respect to the image plane, a distance between the first lens group and the second lens group increasing, a distance between the second lens group and the third lens group decreasing, and a distance between the third lens group and the fourth lens group decreasing, the first lens group including at least one negative lens, and the negative lens satisfying the following conditional expression:

$$1.900 < nd1$$

where nd1 denotes a refractive index of the negative lens at d-line (wavelength λ=587.6 nm), wherein at least one of the third lens group and the fourth lens group consists of, in order from the object along the optical axis, a positive lens having a convex surface facing the object, and a cemented negative lens constructed by a positive lens having a convex surface facing the object cemented with a negative lens having a concave surface facing the image; and
moving the second lens group along the optical axis to the object side to carry out focusing from infinity to a close object.

25. A zoom lens system consisting of, in order from an object along an optical axis:

a first lens group having positive refractive power and an optical path bending element;
a second lens group having negative refractive power;
a third lens group having positive refractive power; and
a fourth lens group having positive refractive power;
upon varying a focal length from a wide-angle end state to a telephoto end state, the first lens group being fixed with respect to an image plane, a distance between the first lens group and the second lens group increasing, a distance between the second lens group and third lens group decreasing, and a distance between the third lens group and the fourth lens group decreasing,
the first lens group including at least one negative lens, and the following conditional expressions being satisfied:

$$1.900 < nd1$$

$$1.5 < f1/(-f2) < 4.0$$

where $nd1$ denotes a refractive index of the negative lens at d-line (wavelength $\lambda=587.6$ nm), f1 denotes a focal length of the first lens group, and f2 denotes a focal length of the second lens group.

* * * * *